US012003757B2

(12) United States Patent
Salehifar et al.

(10) Patent No.: US 12,003,757 B2
(45) Date of Patent: Jun. 4, 2024

(54) VIDEO SIGNAL PROCESSING METHOD AND DEVICE FOR PROCESSING MOTION VECTOR DIFFERENCE INFORMATION FOR INTER PREDICTION IN VIDEO SIGNAL

(71) Applicant: LG ELECTRONICS INC., Seoul (KR)

(72) Inventors: Mehdi Salehifar, Seoul (KR); Seunghwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 313 days.

(21) Appl. No.: 17/438,276

(22) PCT Filed: Mar. 10, 2020

(86) PCT No.: PCT/KR2020/003320
§ 371 (c)(1),
(2) Date: Sep. 10, 2021

(87) PCT Pub. No.: WO2020/184952
PCT Pub. Date: Sep. 17, 2020

(65) Prior Publication Data
US 2022/0159291 A1 May 19, 2022

Related U.S. Application Data
(60) Provisional application No. 62/816,200, filed on Mar. 10, 2019.

(51) Int. Cl.
*H04N 7/12* (2006.01)
*H04N 19/109* (2014.01)
(Continued)

(52) U.S. Cl.
CPC ........... *H04N 19/52* (2014.11); *H04N 19/109* (2014.11); *H04N 19/139* (2014.11); *H04N 19/176* (2014.11)

(58) Field of Classification Search
CPC .... H04N 19/52; H04N 19/109; H04N 19/139; H04N 19/176; H04N 19/70; H04N 19/91
(Continued)

(56) References Cited

U.S. PATENT DOCUMENTS

| 9,462,282 B2 | 10/2016 | Sasai et al. | |
| 2014/0098882 A1* | 4/2014 | Zhang | H04N 19/521 |
| | | | 375/240.16 |

(Continued)

FOREIGN PATENT DOCUMENTS

| KR | 1020100001078 | 1/2010 |
| KR | 1020180081716 | 7/2018 |
| WO | WO2018064524 | 4/2018 |

OTHER PUBLICATIONS

Paluri et al., "CE4: Generic Vector Coding of Motion Vector Difference (Tests 4.4.1.a and 4.4.1.b)," JVET-M0403, Presented at Joint Video Experts Team (JVET) of ITU-T SG 16 WP 3 and ISO/IEC JTC 1/SC 29/WG 11, 13th Meeting: Marrakesh, MA, Jan. 9-18, 2019, 9 pages.
(Continued)

*Primary Examiner* — Gims S Philippe
(74) *Attorney, Agent, or Firm* — Fish & Richardson P.C.

(57) ABSTRACT

Embodiments of the present specification provide a method and a device for processing motion vector difference (MVD) information for inter prediction in a video signal. A method for decoding MVD information comprises the steps of: acquiring a first flag indicating whether a MVD for predicting the current block is greater than a first value; on the basis of the first flag, acquiring a second flag indicating whether the MVD is greater than a second value; and decoding size information of the MVD on the basis of the second flag, wherein a step for acquiring the size information of the MVD comprises a step for, if the MVD is equal to or smaller than the second value, decoding the size information of the
(Continued)

MVD on the basis of a first difference value which corresponds to the difference between the second value and the first value.

11 Claims, 37 Drawing Sheets

(51) Int. Cl.
  *H04N 19/139* (2014.01)
  *H04N 19/176* (2014.01)
  *H04N 19/52* (2014.01)

(58) Field of Classification Search
  USPC .................................................. 375/240.16
  See application file for complete search history.

(56) References Cited

U.S. PATENT DOCUMENTS

| | | | |
|---|---|---|---|
| 2018/0091816 A1* | 3/2018 | Chien | H04N 19/91 |
| 2022/0021900 A1* | 1/2022 | Jeong | H04N 19/176 |
| 2022/0109834 A1* | 4/2022 | Jeong | H04N 19/119 |
| 2022/0267406 A1* | 8/2022 | Stauss | C07K 14/7051 |

OTHER PUBLICATIONS

PCT International Search Report in International Appln. No. PCT/KR2020/003320, dated Jun. 26, 2020, 5 pages.

* cited by examiner

[FIG. 1]
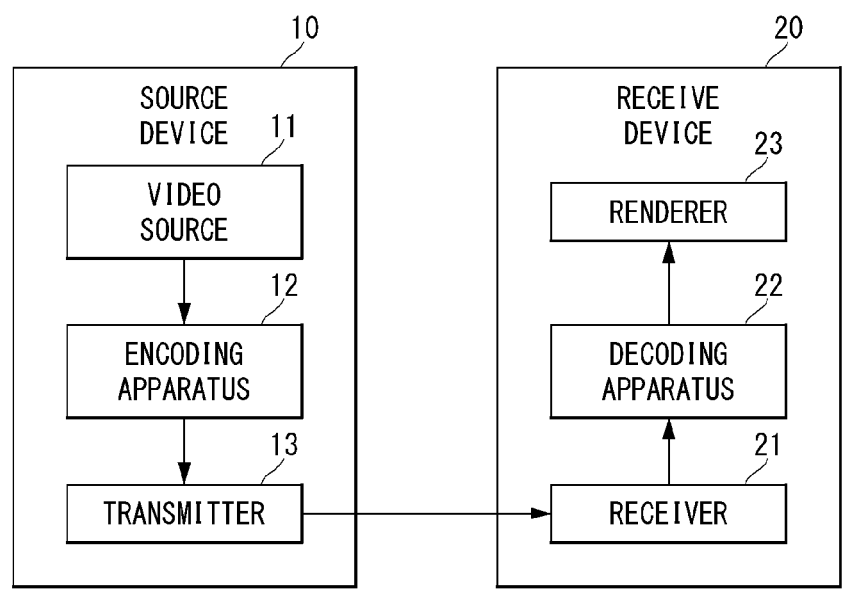

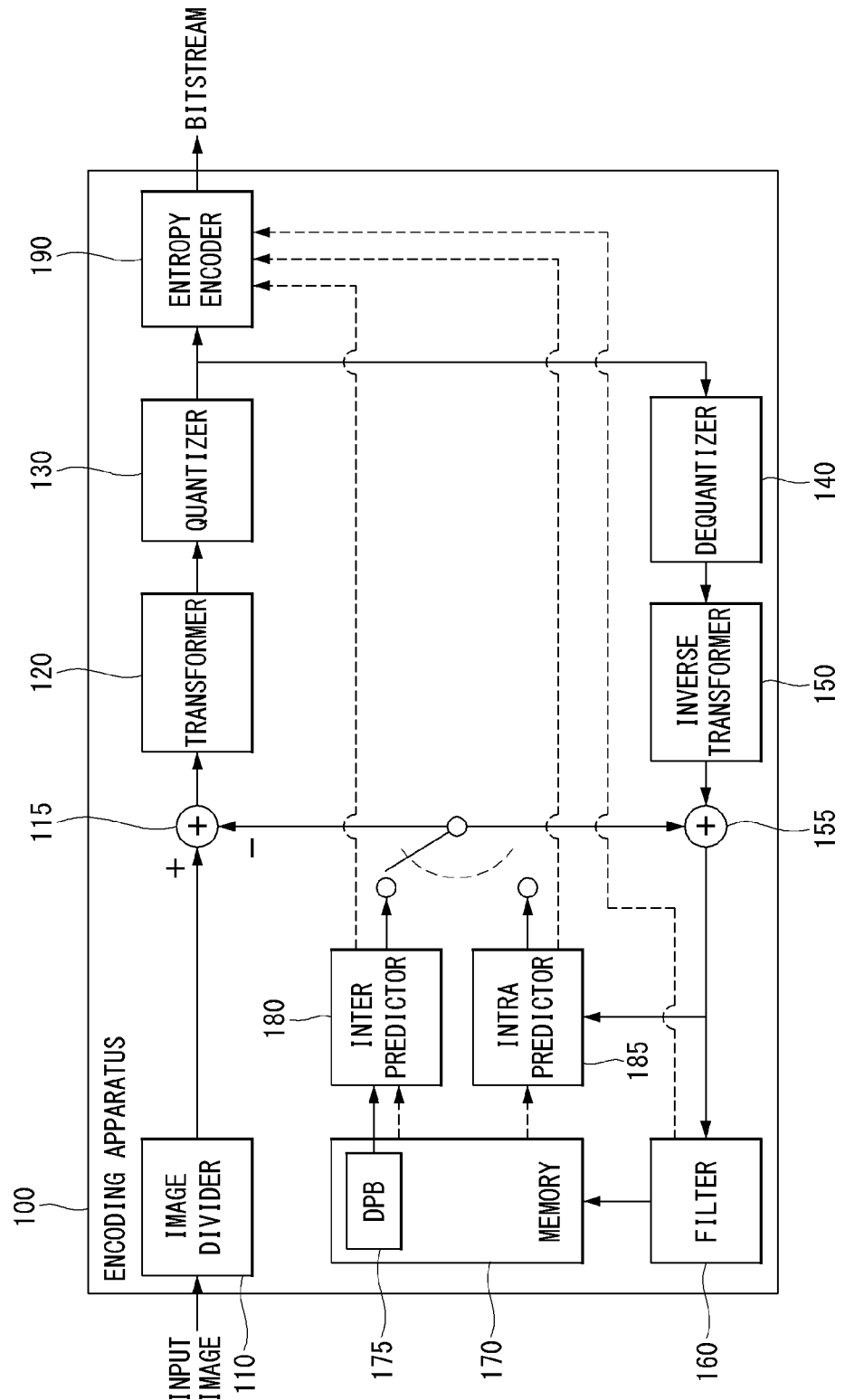
[FIG. 2]

[FIG. 3]
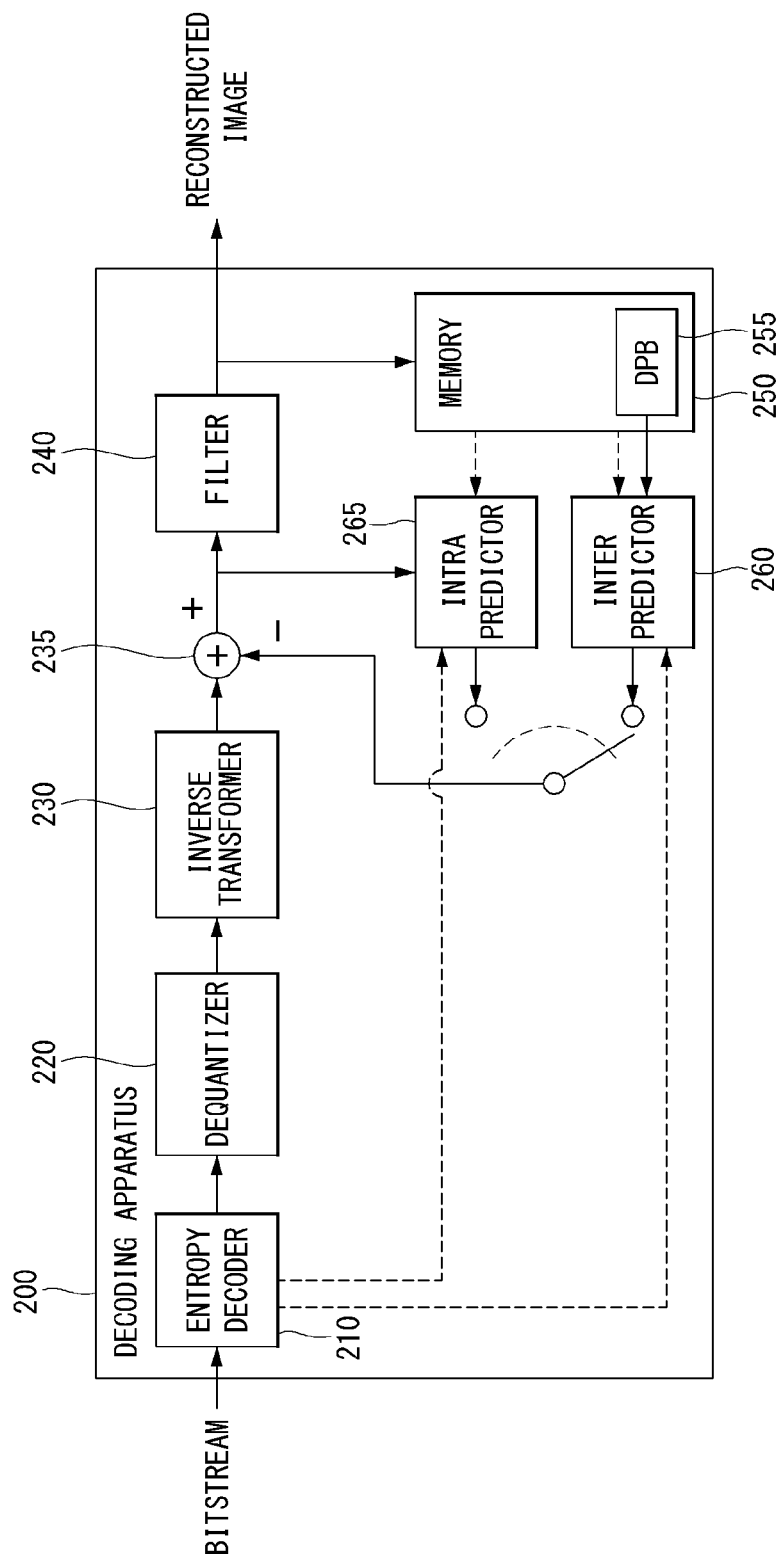

[FIG. 4]
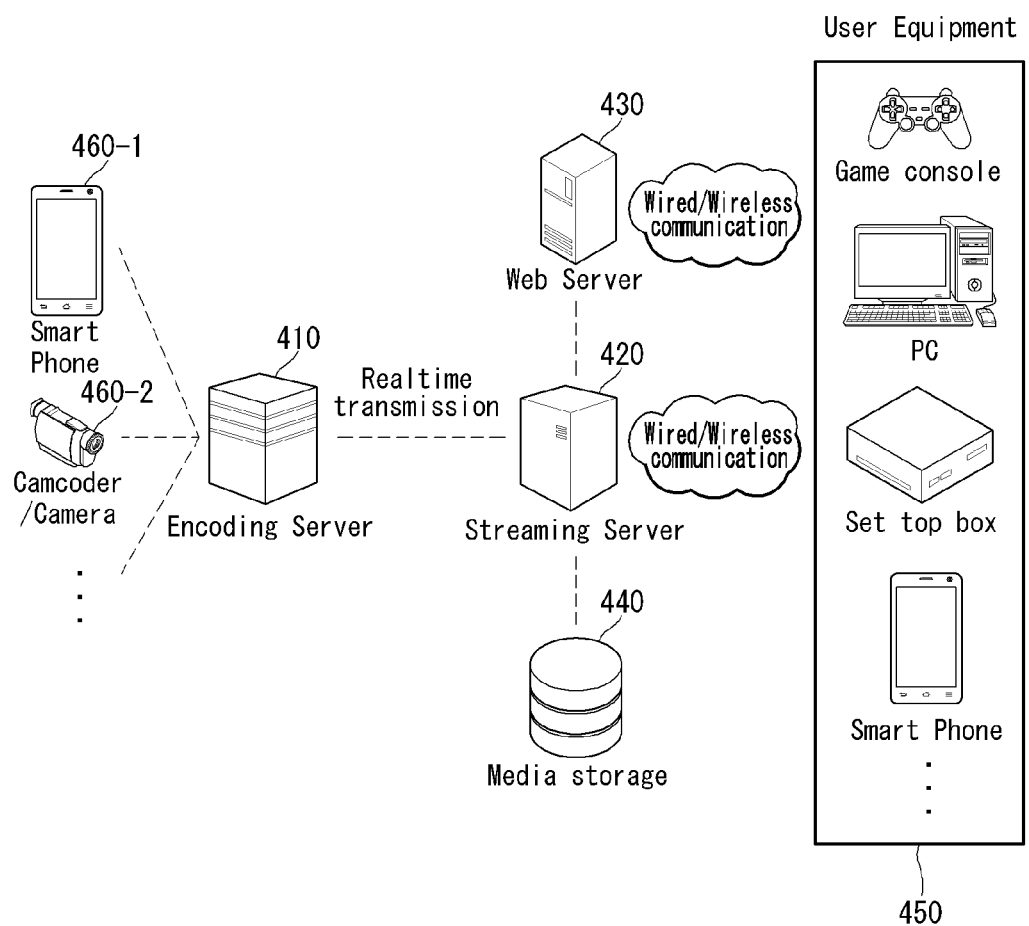

[FIG. 5]
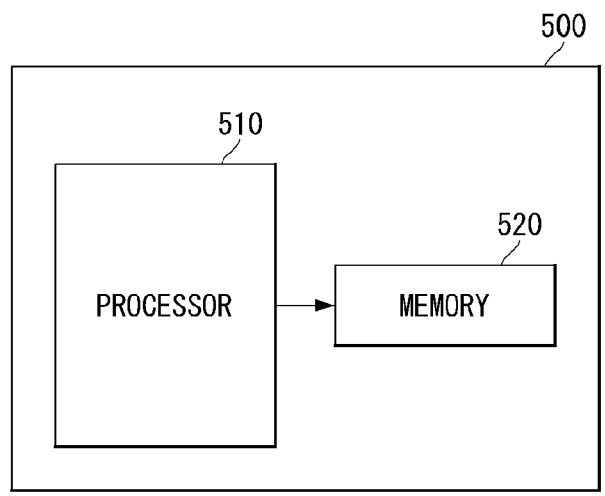
[FIG. 6]
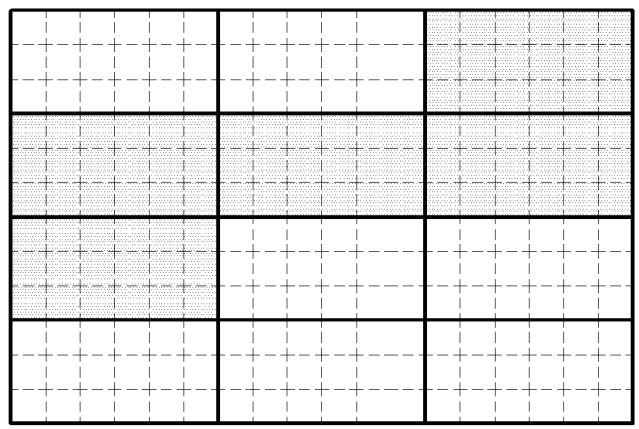
[FIG. 7A]
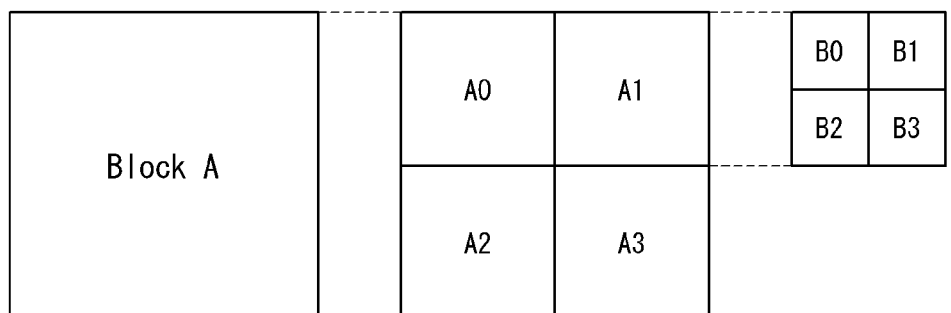

[FIG. 7B]
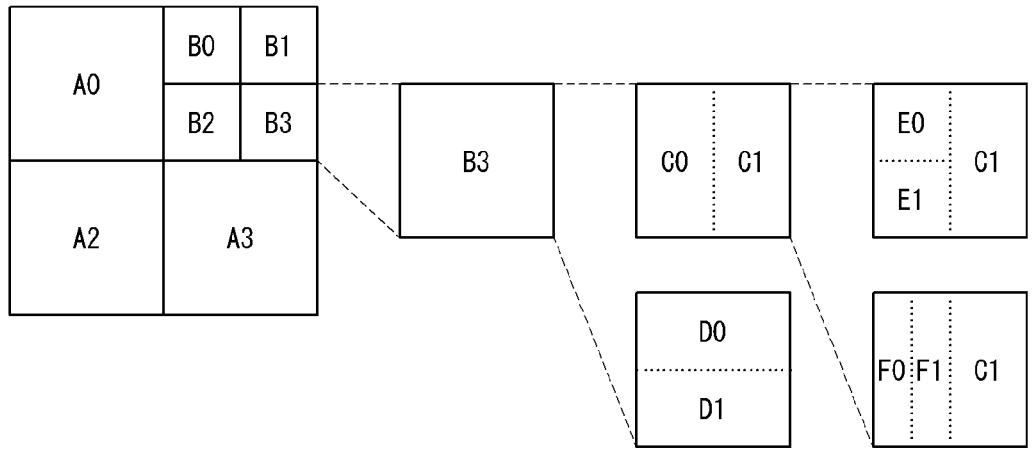
[FIG. 7C]
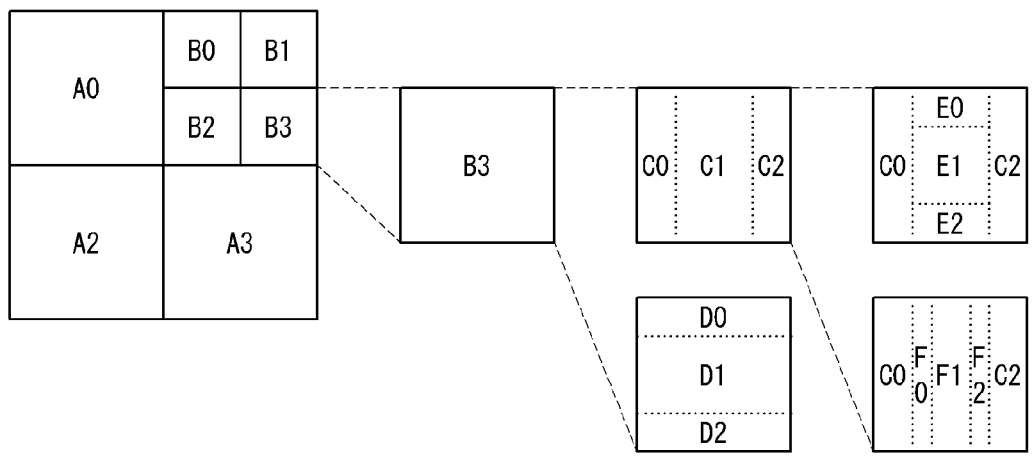
[FIG. 7D]
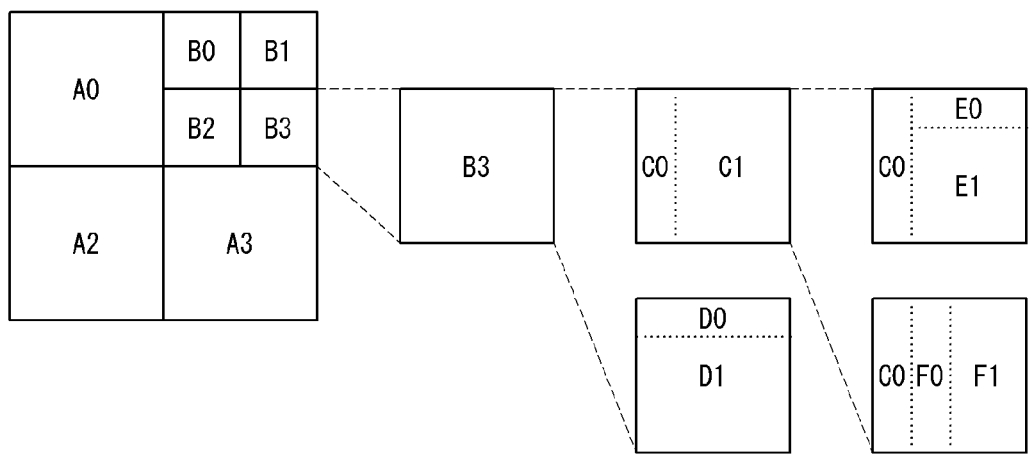

[FIG. 8]
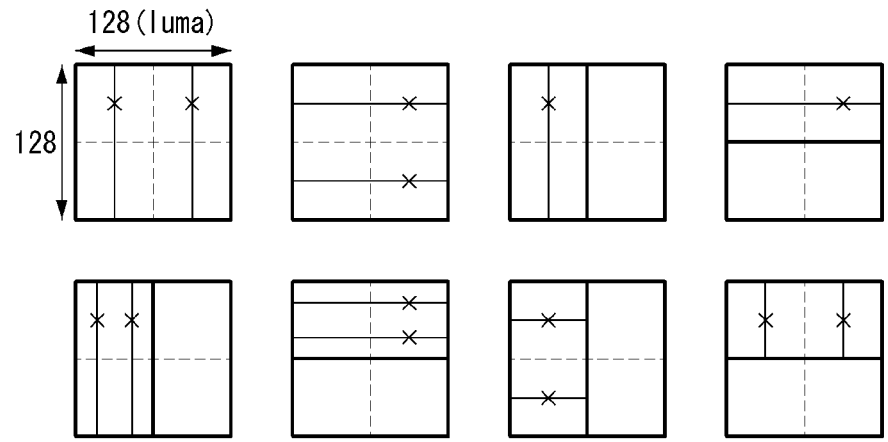
[FIG. 9]
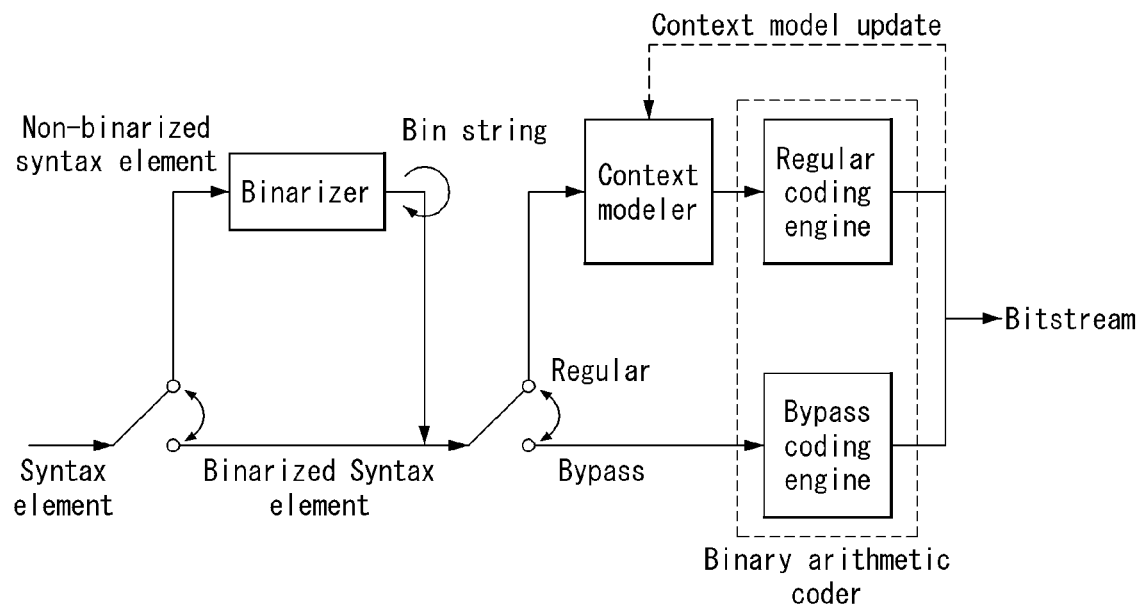

[FIG. 10A]
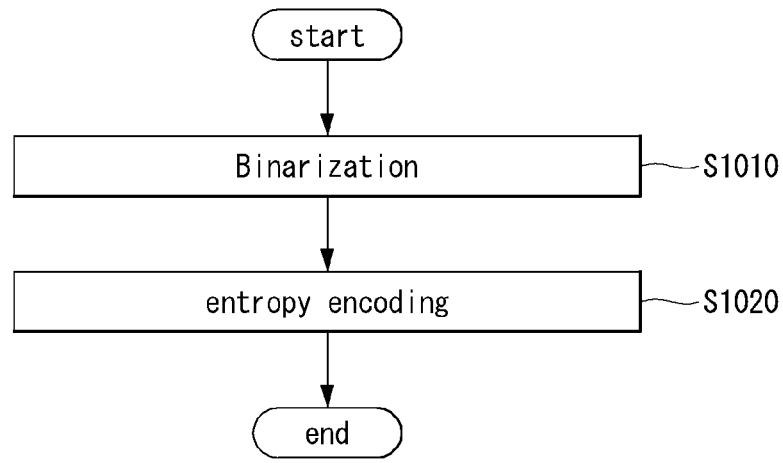
[FIG. 10B]
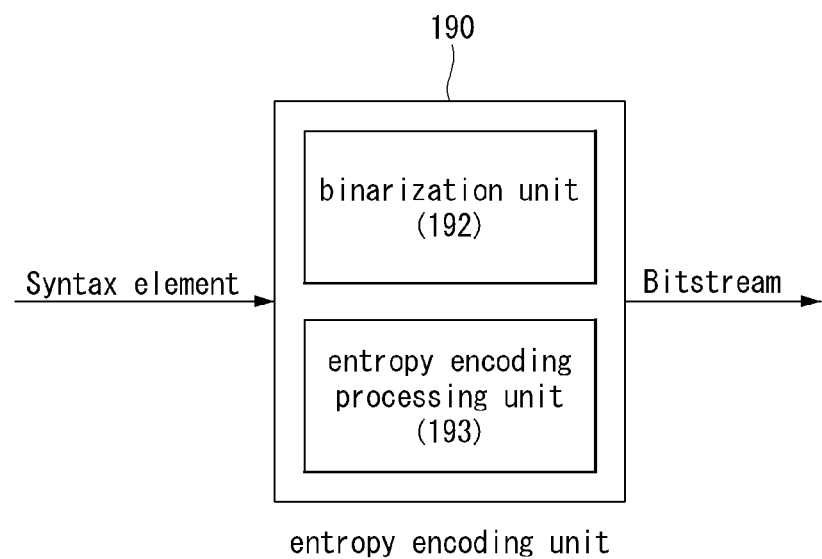

[FIG. 11A]
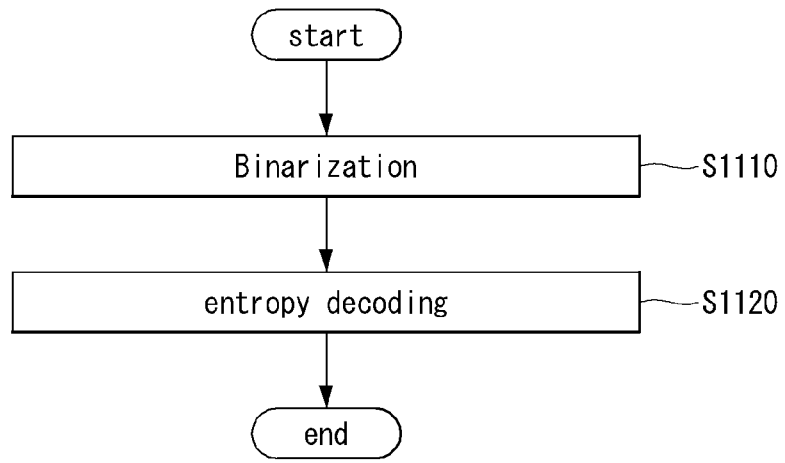
[FIG. 11B]
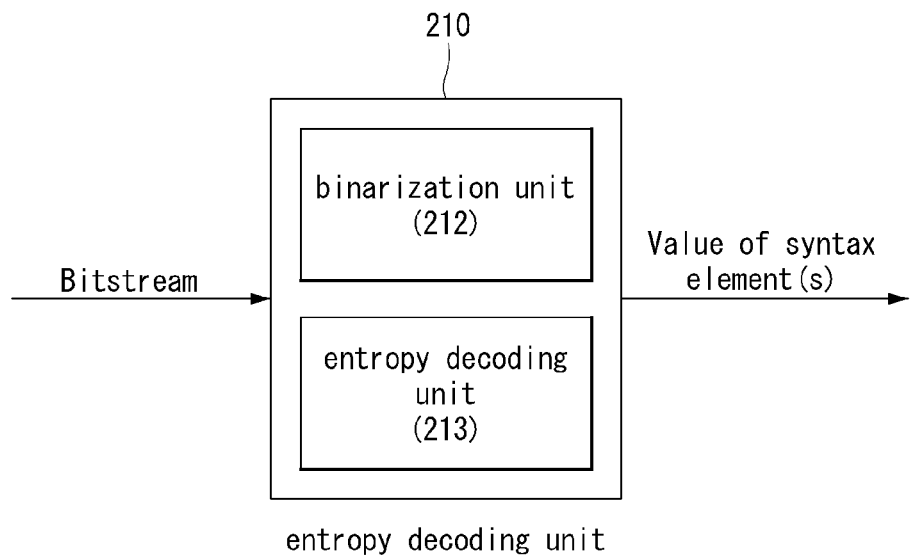
entropy decoding unit

[FIG. 12]
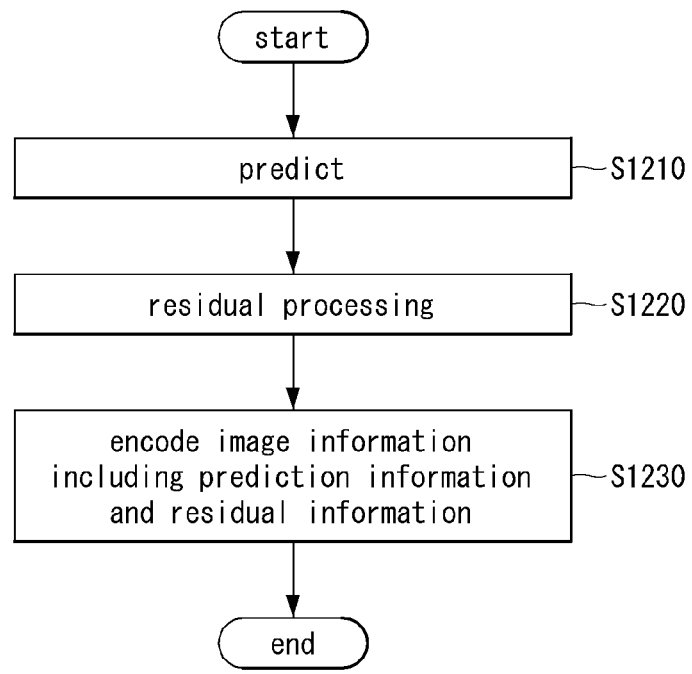

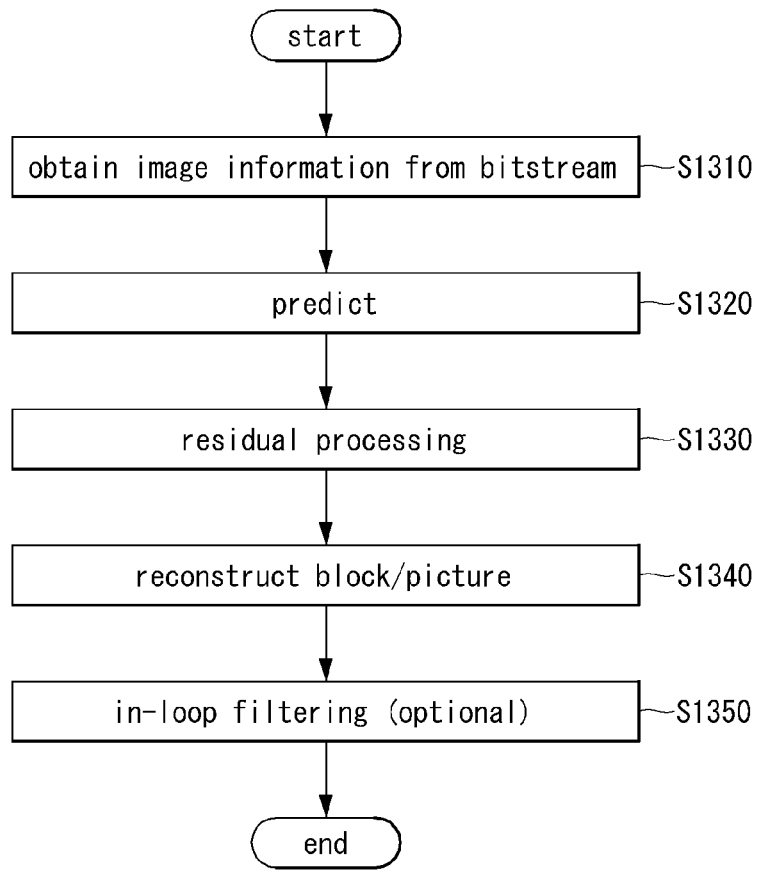
[FIG. 13]

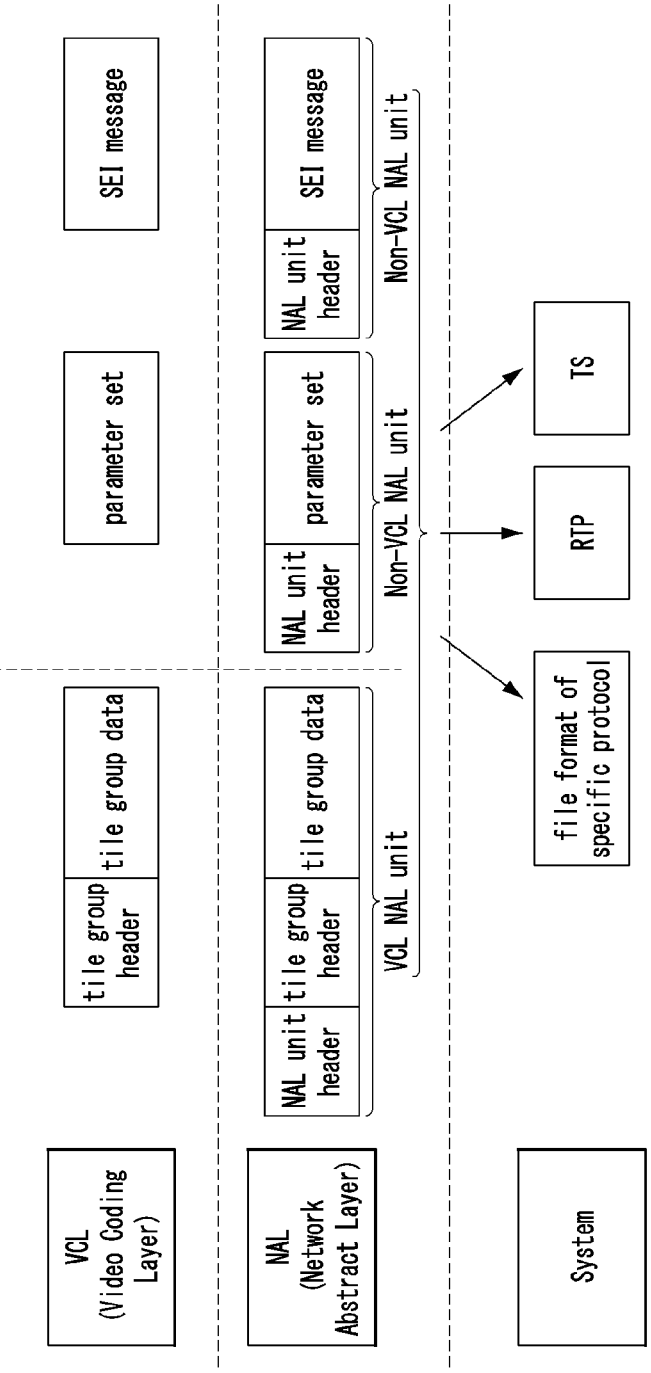
[FIG. 14]

[FIG. 15A]
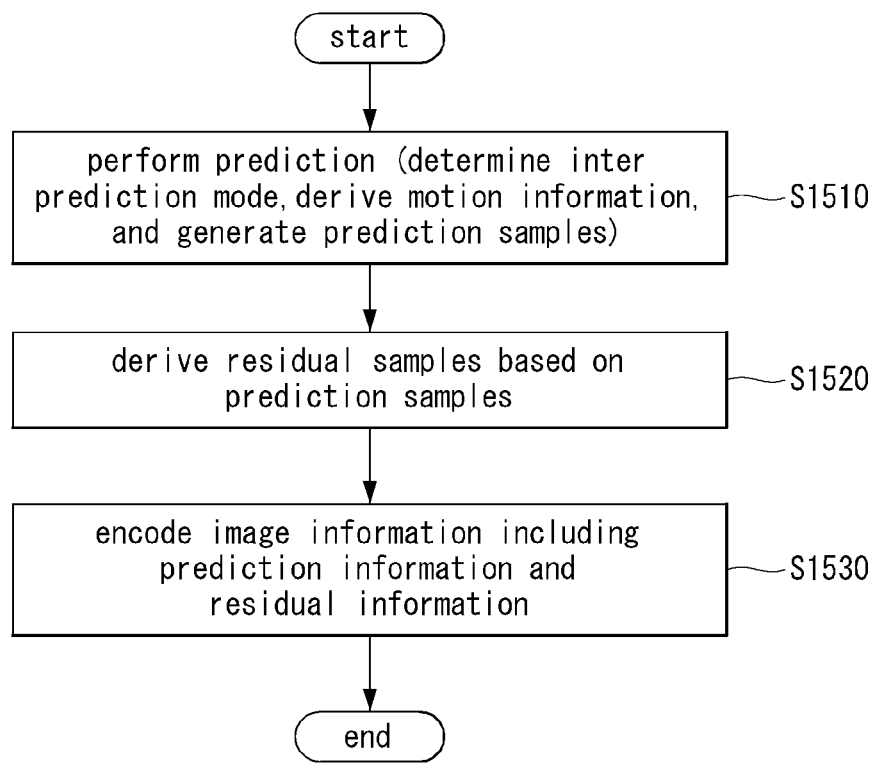

[FIG. 15B]
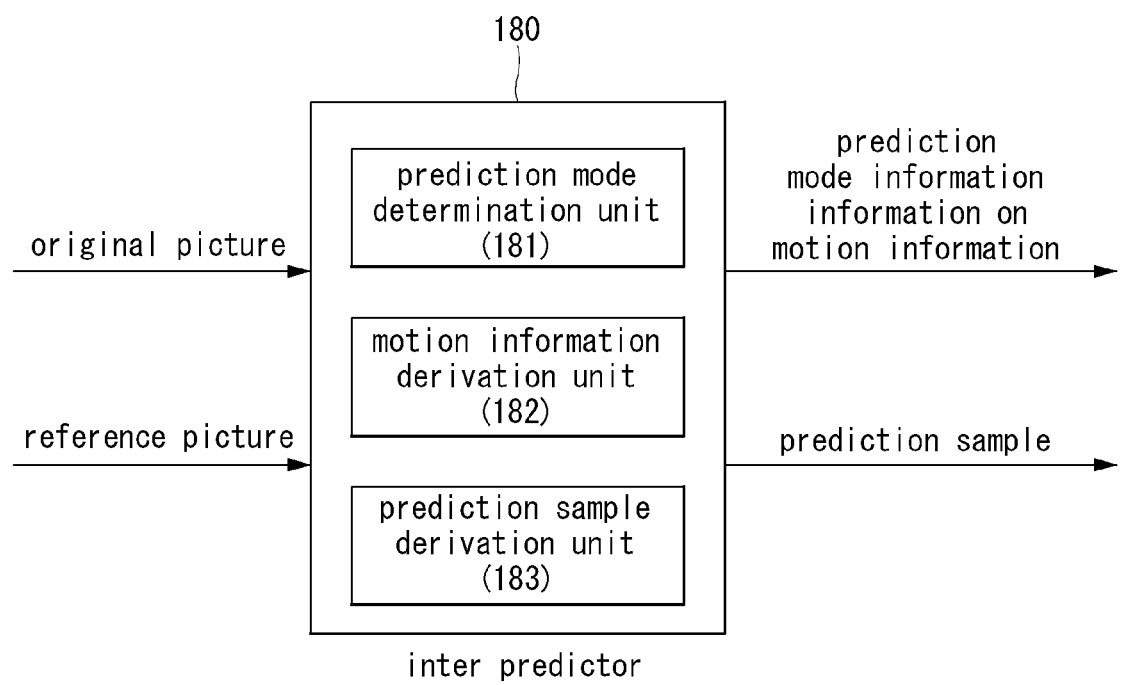

[FIG. 16A]
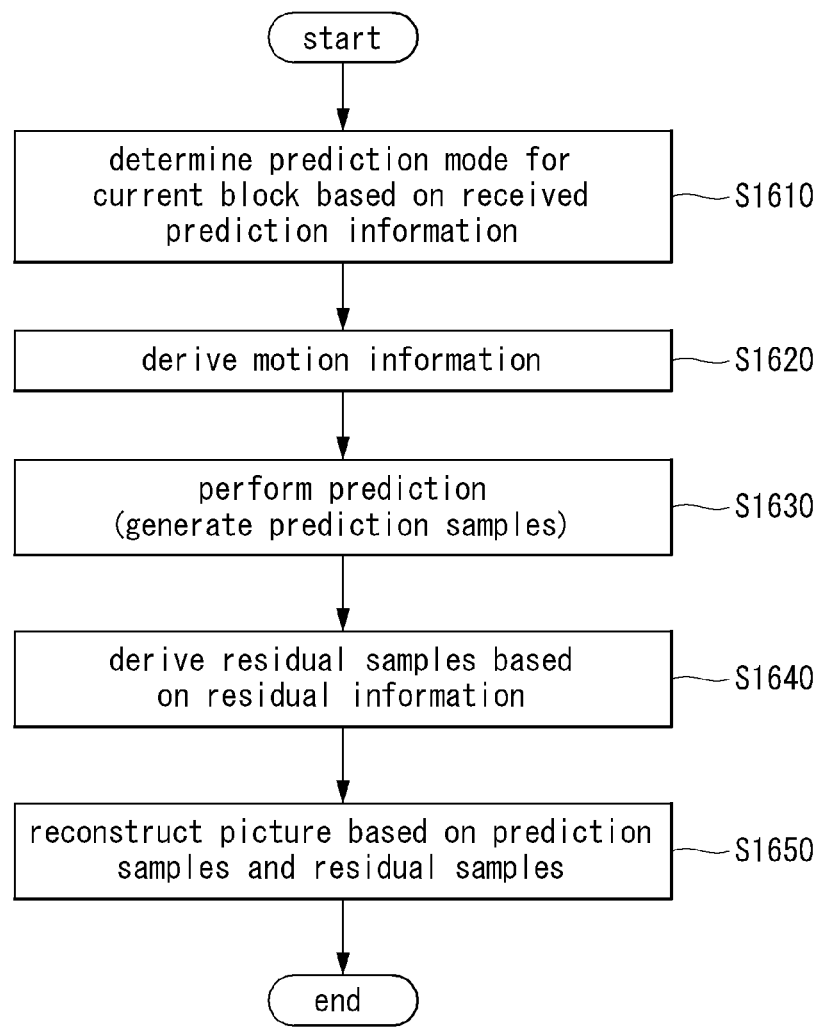

[FIG. 16B]
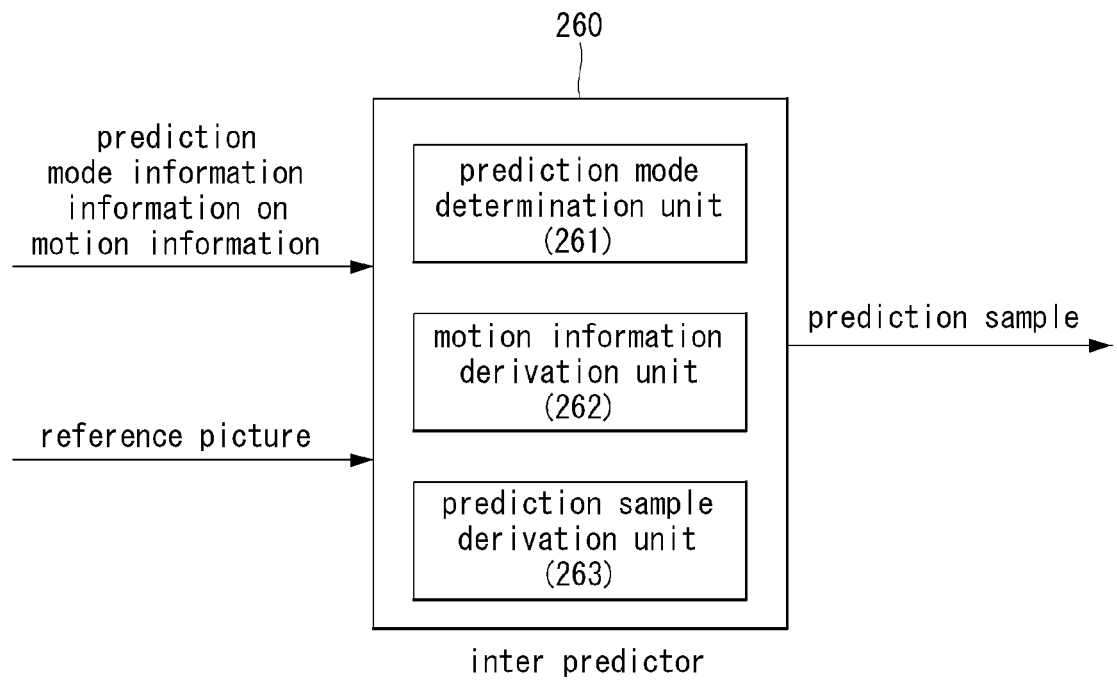
inter predictor
[FIG. 17]
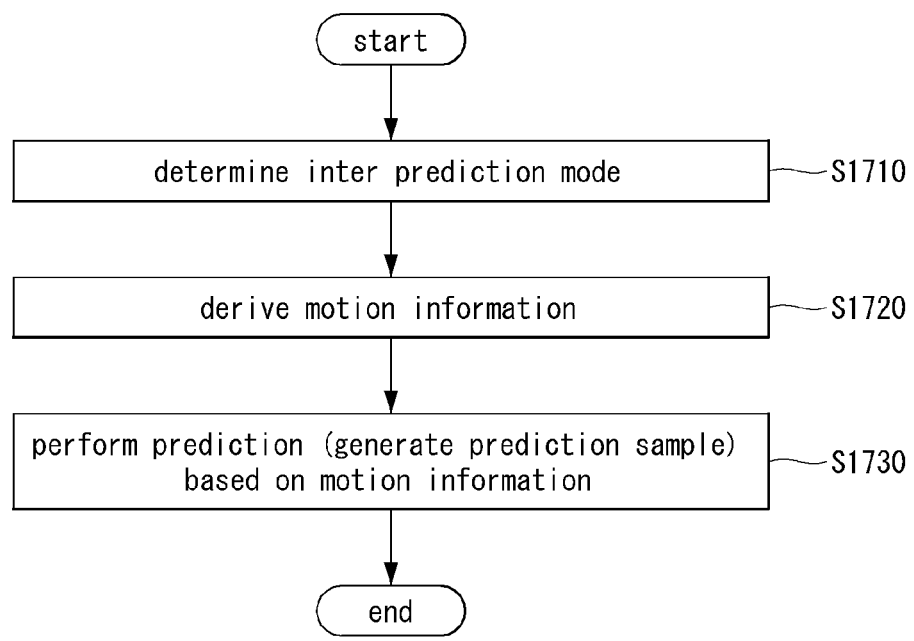

[FIG. 18]
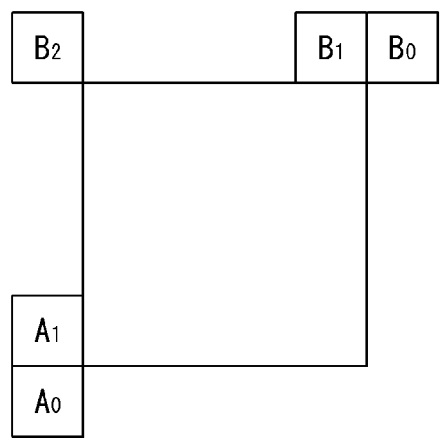

[FIG. 19]
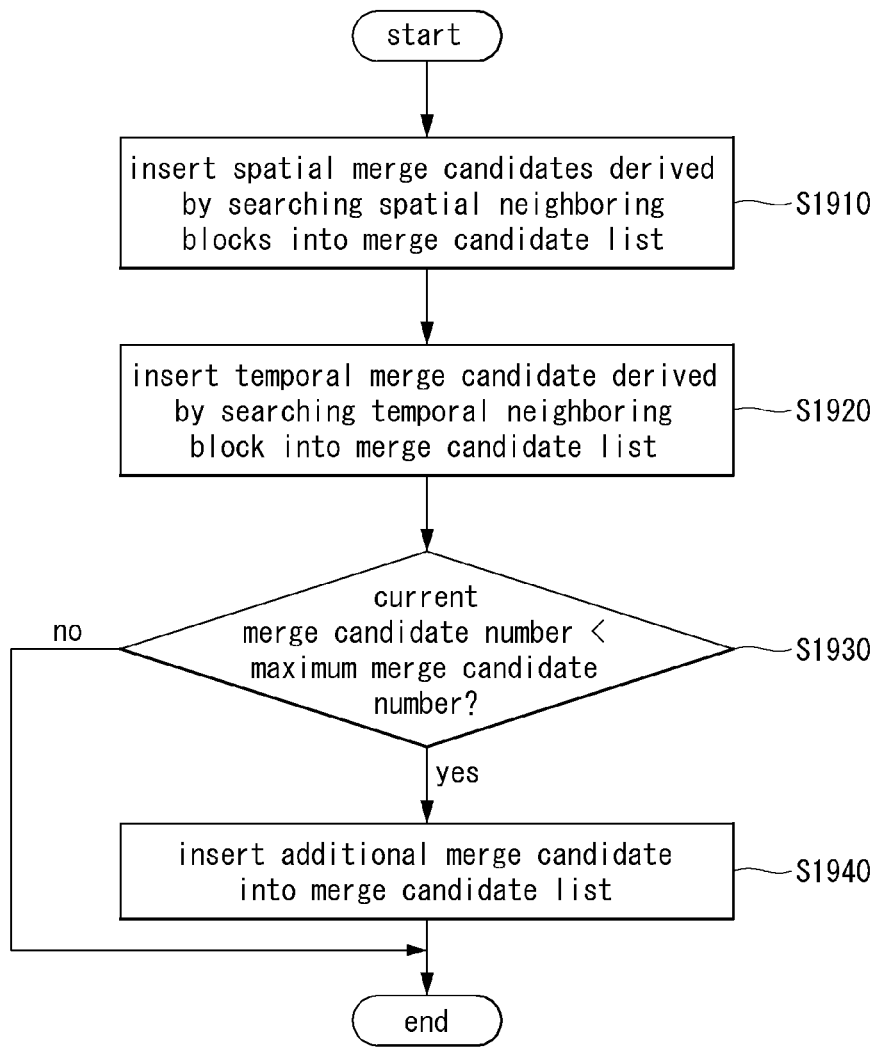

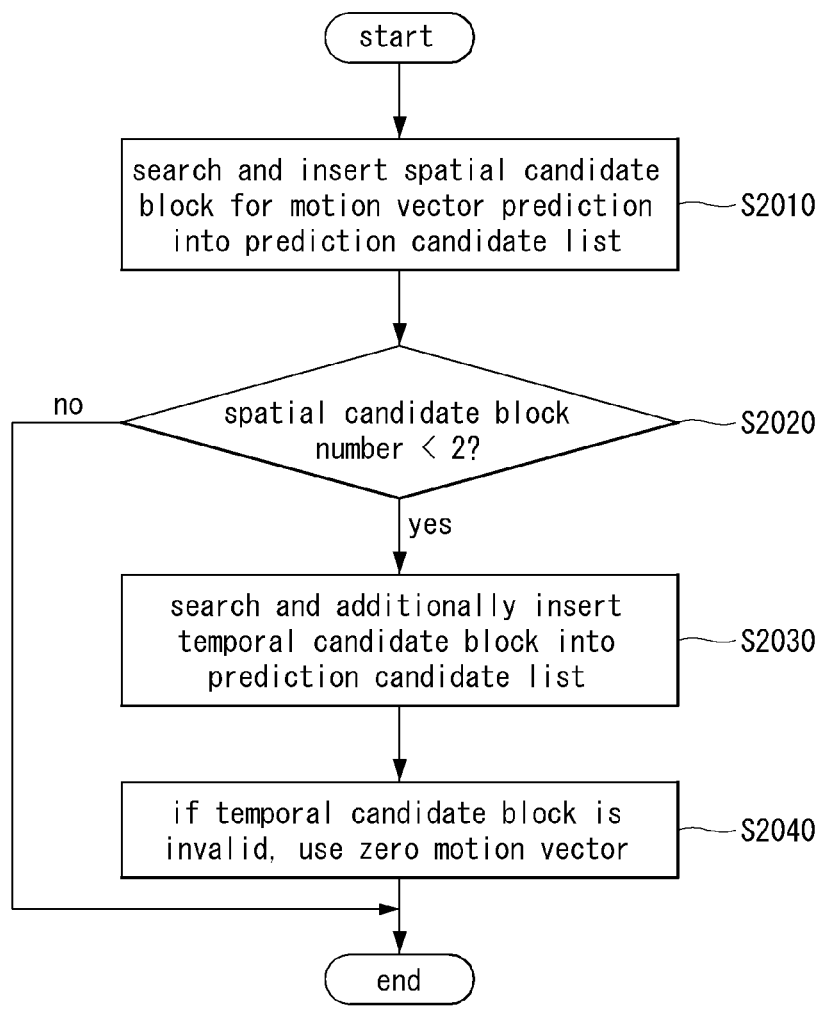
[FIG. 20]

[FIG. 21]
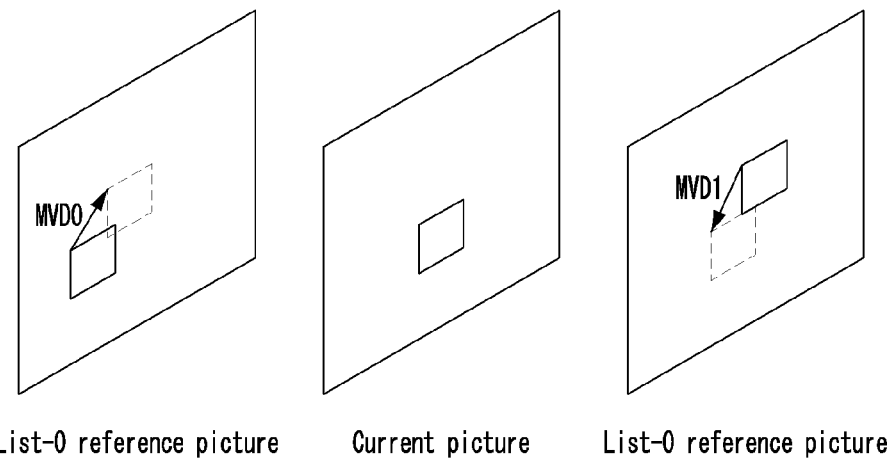
List-0 reference picture    Current picture    List-0 reference picture
[FIG. 22]
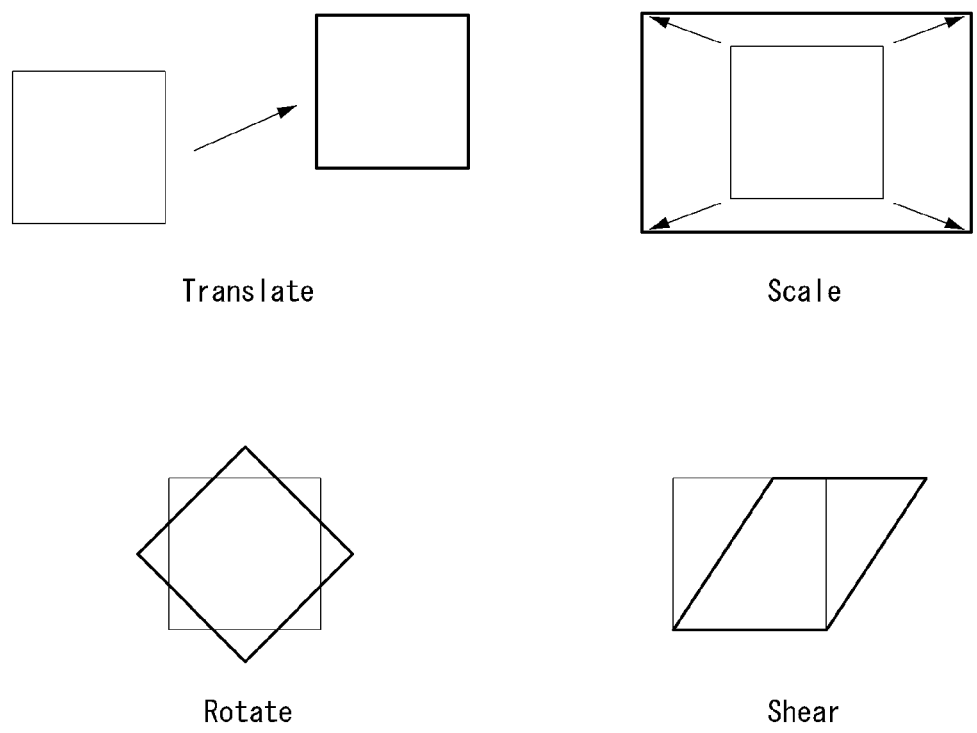
Translate    Scale
Rotate    Shear

[FIG. 23A]
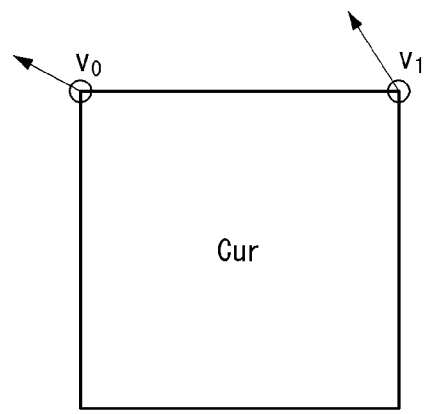
[FIG. 23B]
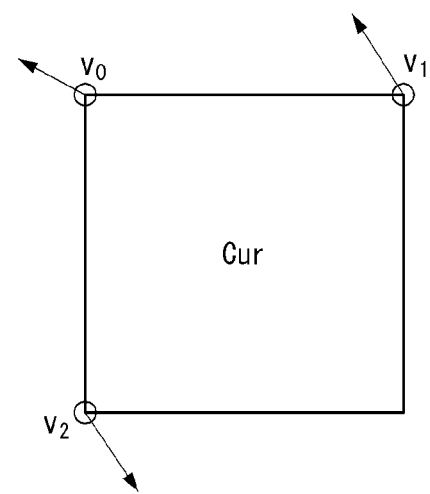

[FIG. 24]
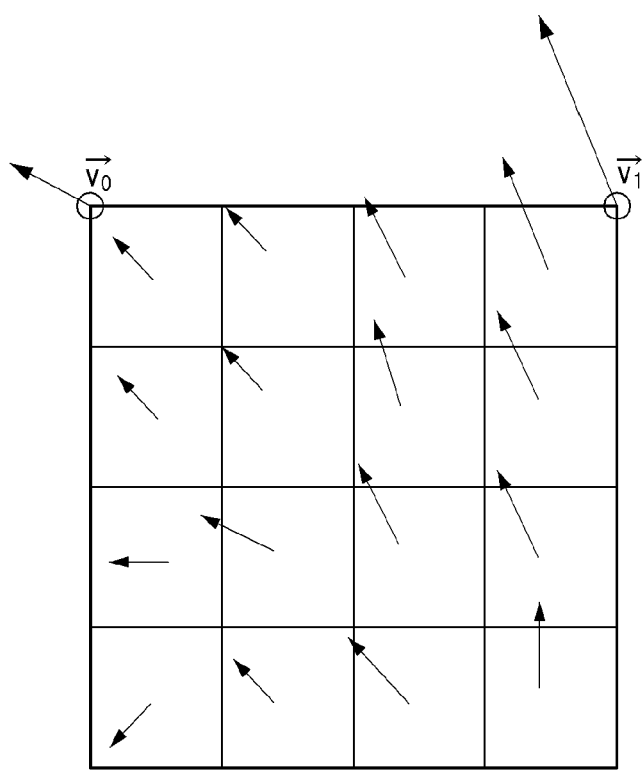

[FIG. 25]
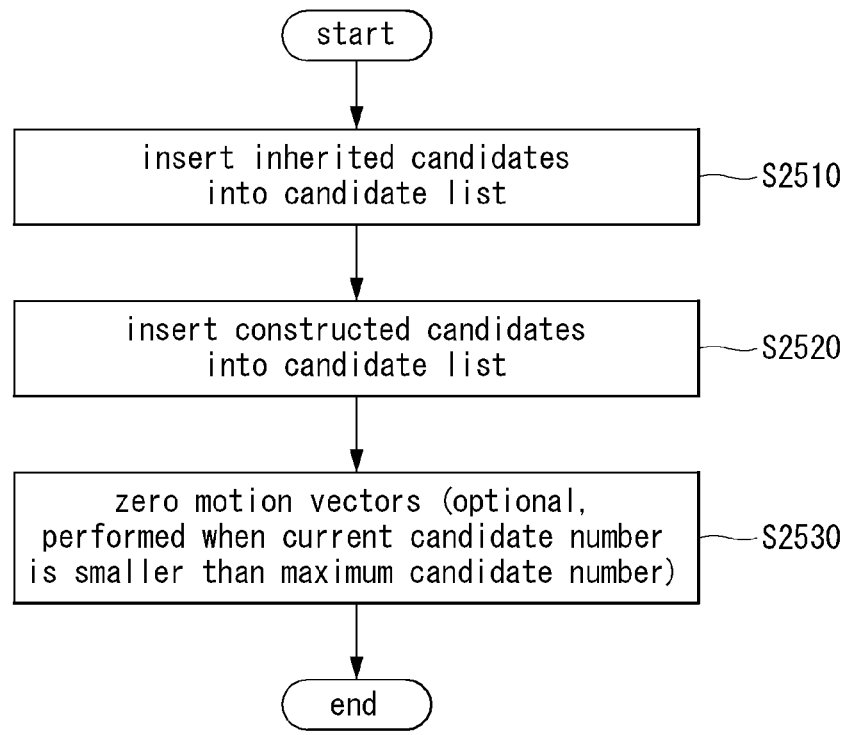
[FIG. 26]
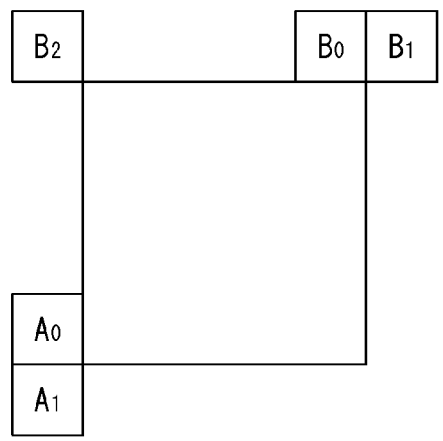

[FIG. 27]
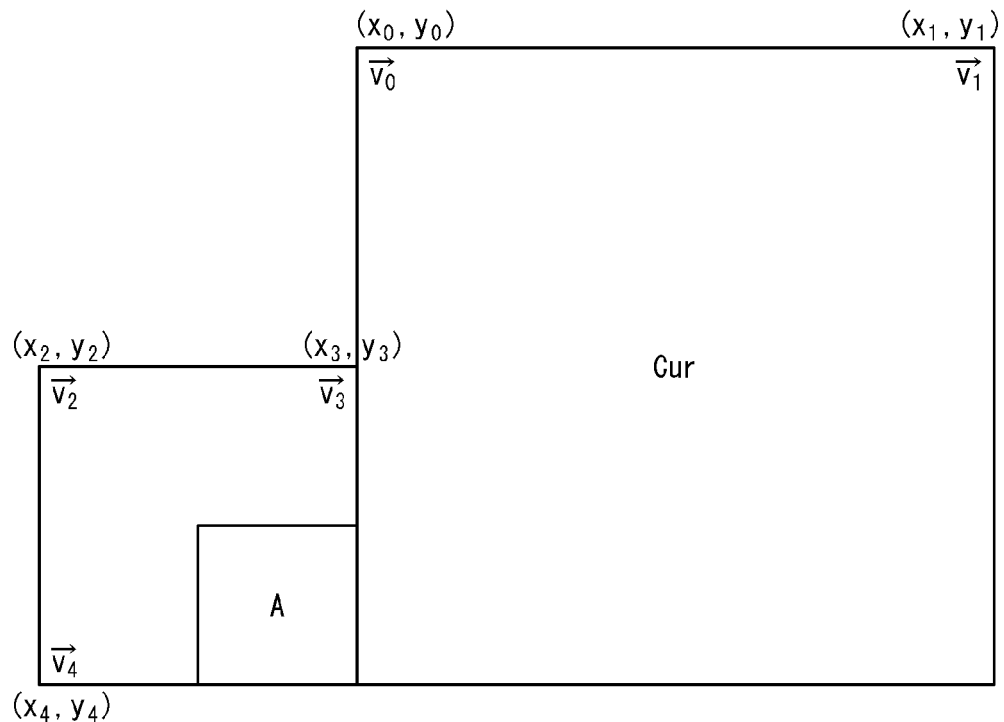
[FIG. 28]
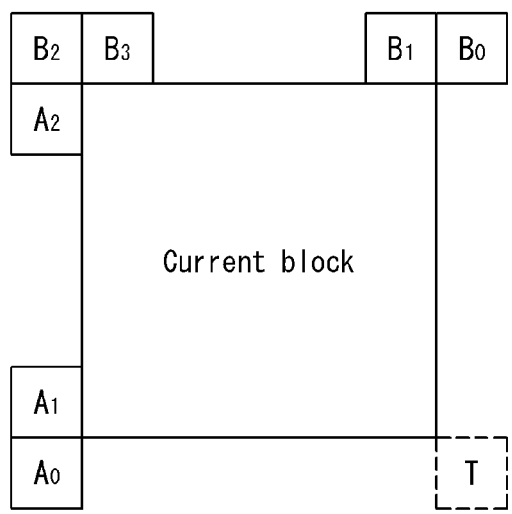

[FIG. 29]
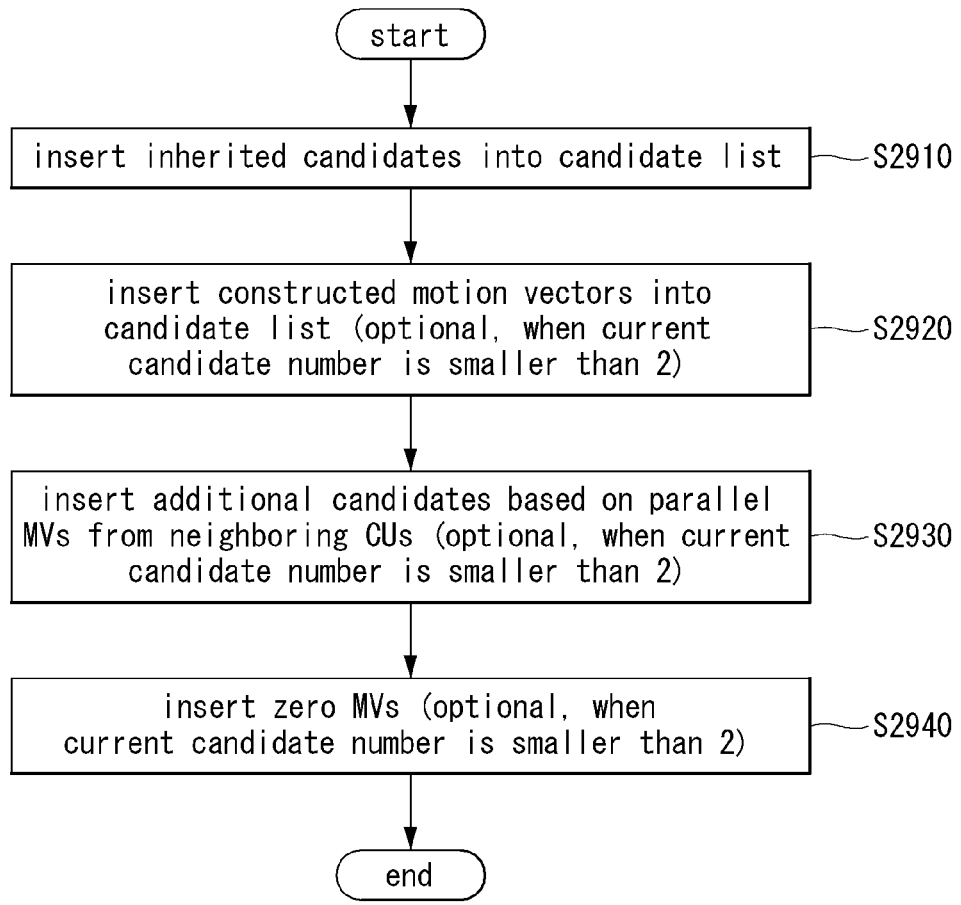
[FIG. 30A]
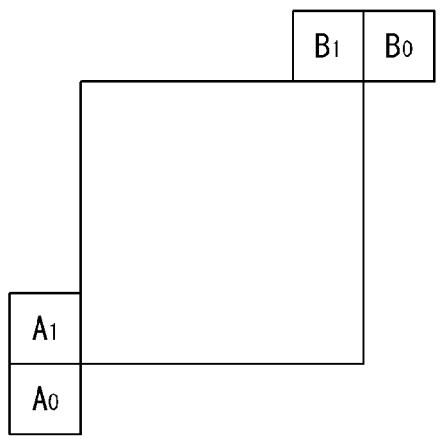

[FIG. 30B]
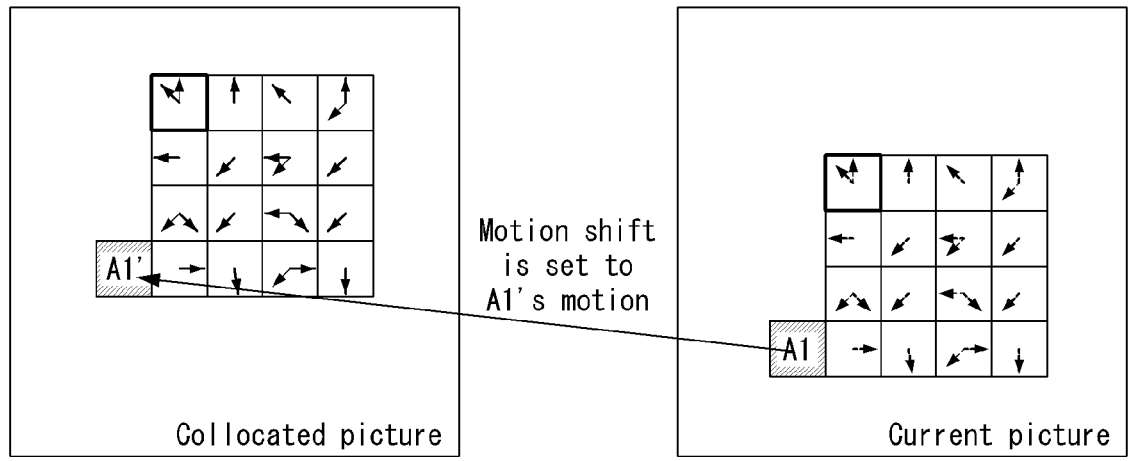
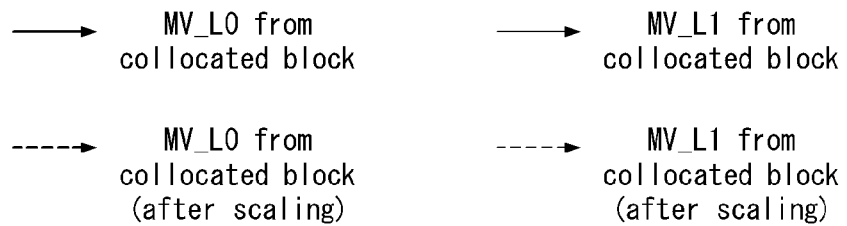
[FIG. 31A]
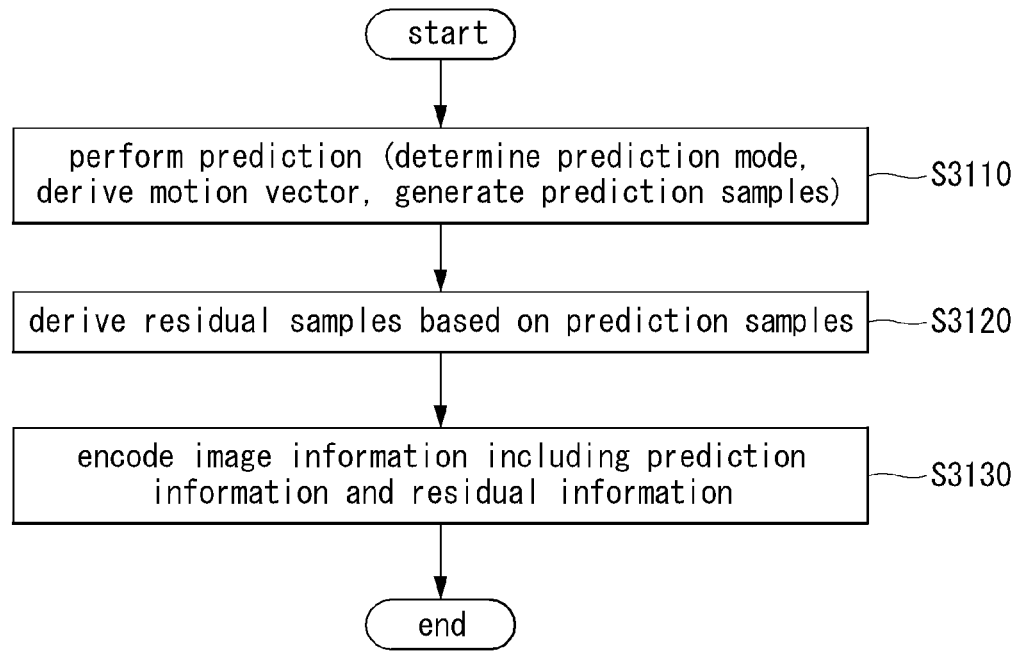

[FIG. 31B]
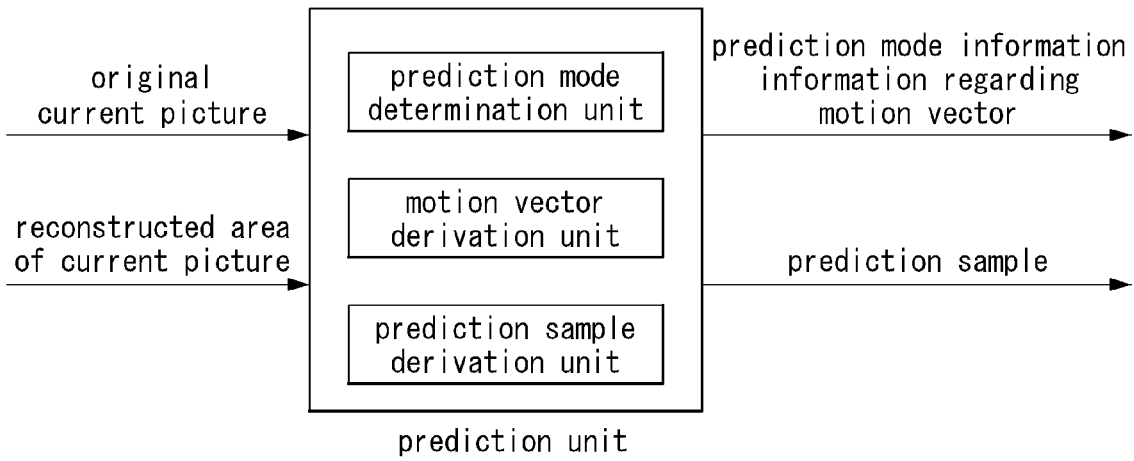
[FIG. 32A]
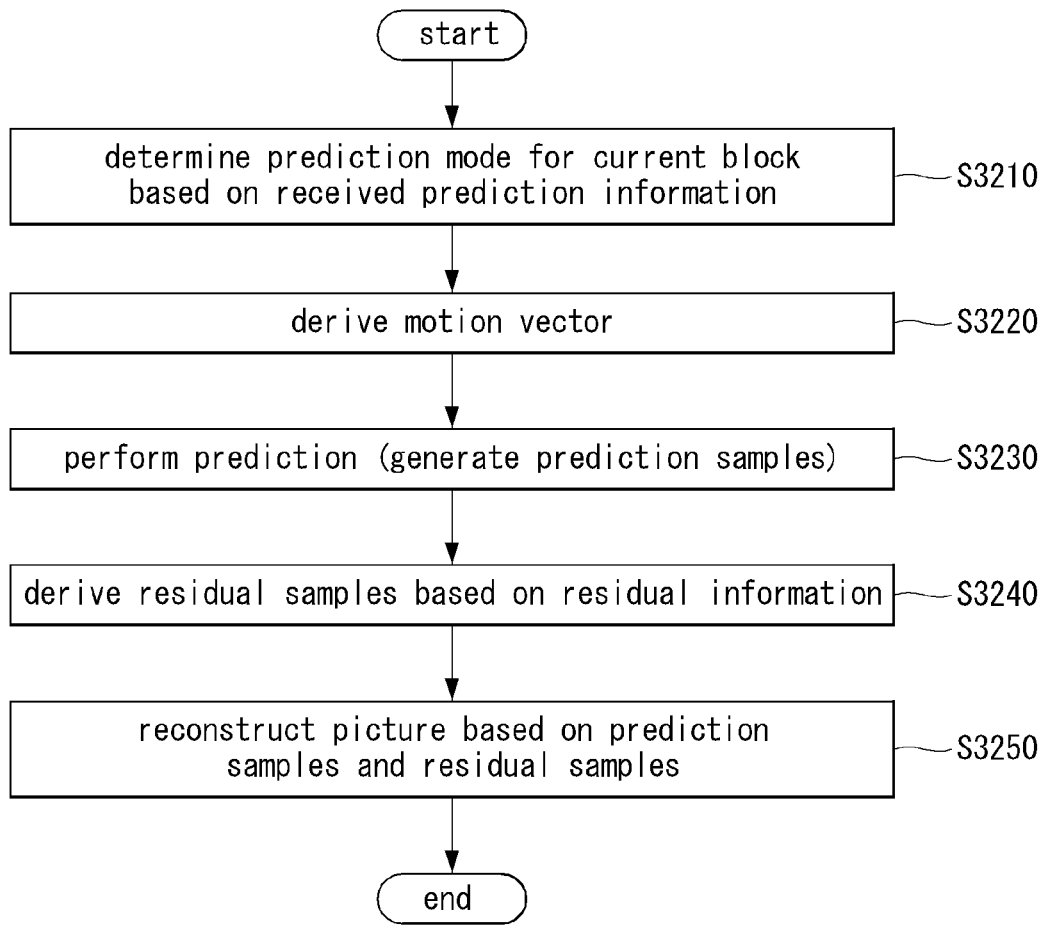

[FIG. 32B]
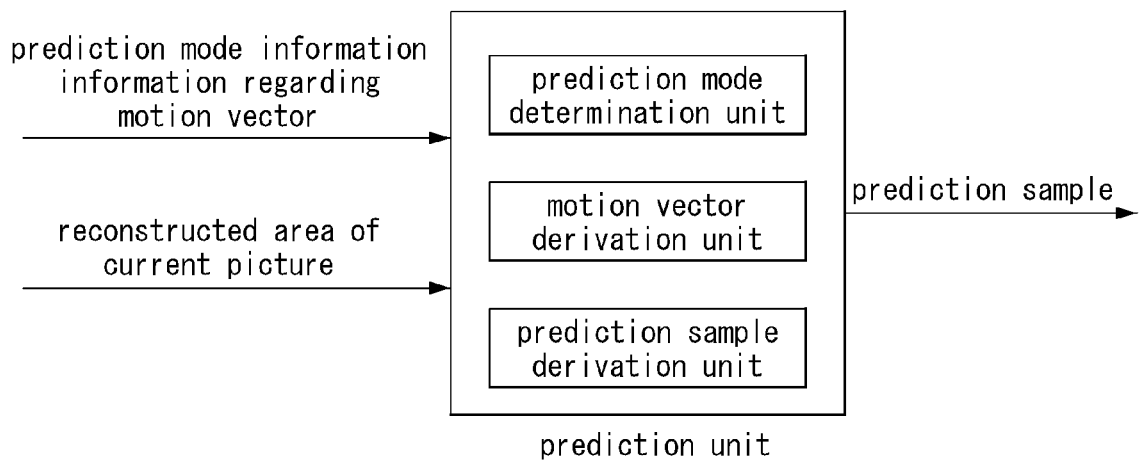

[FIG. 33]
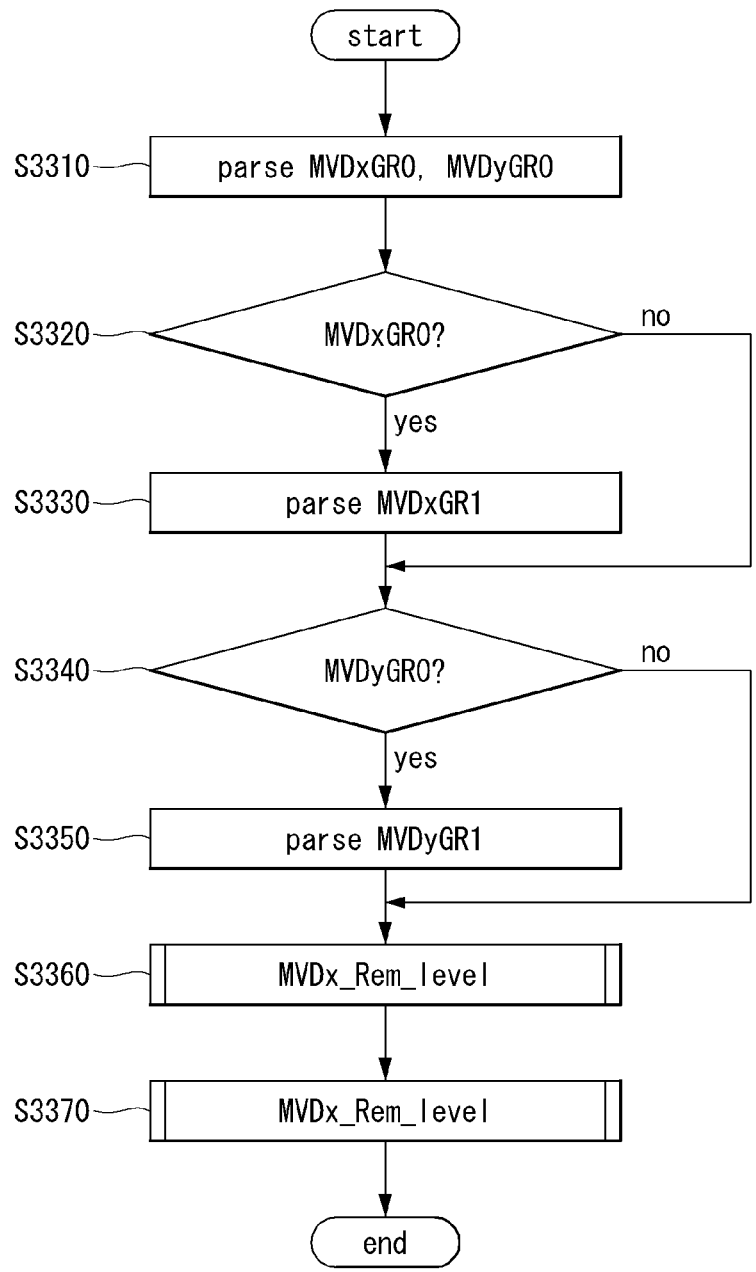

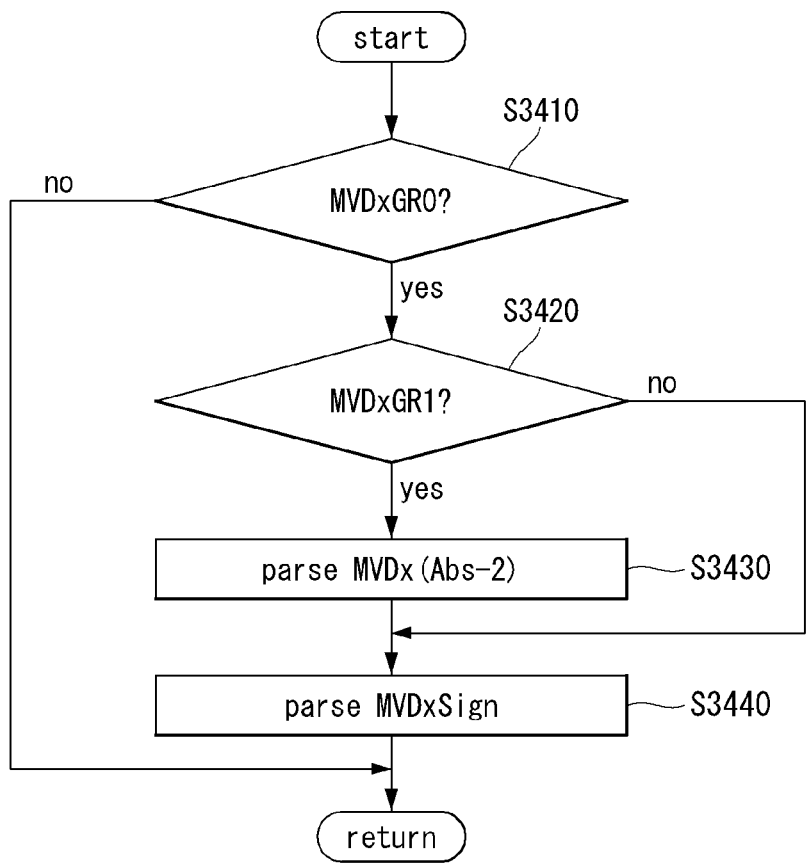
[FIG. 34A]

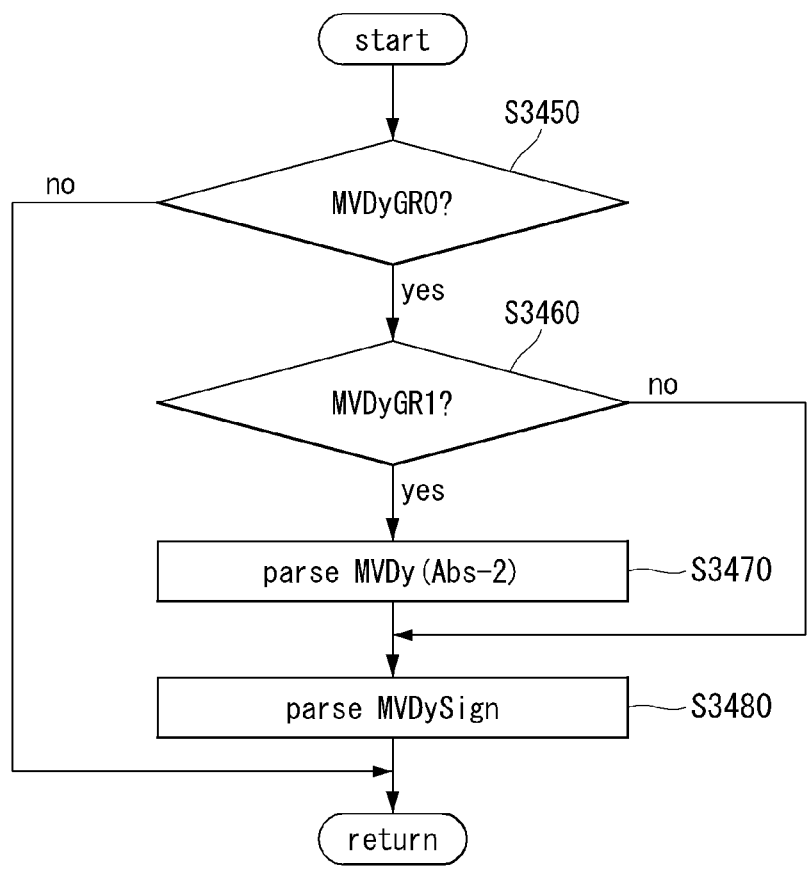
[FIG. 34B]

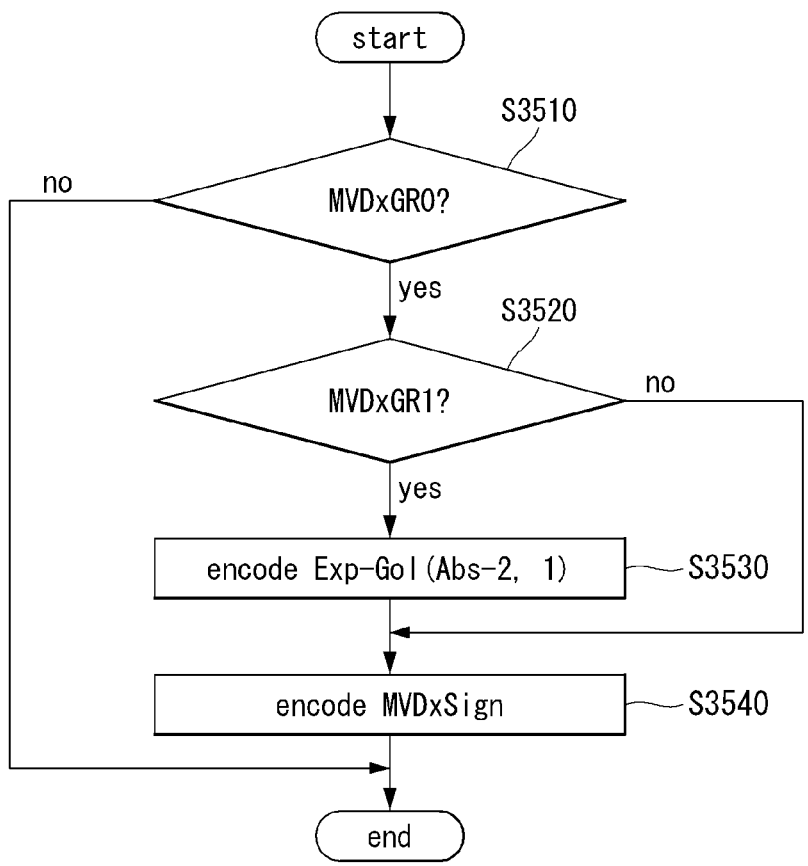
[FIG. 35A]

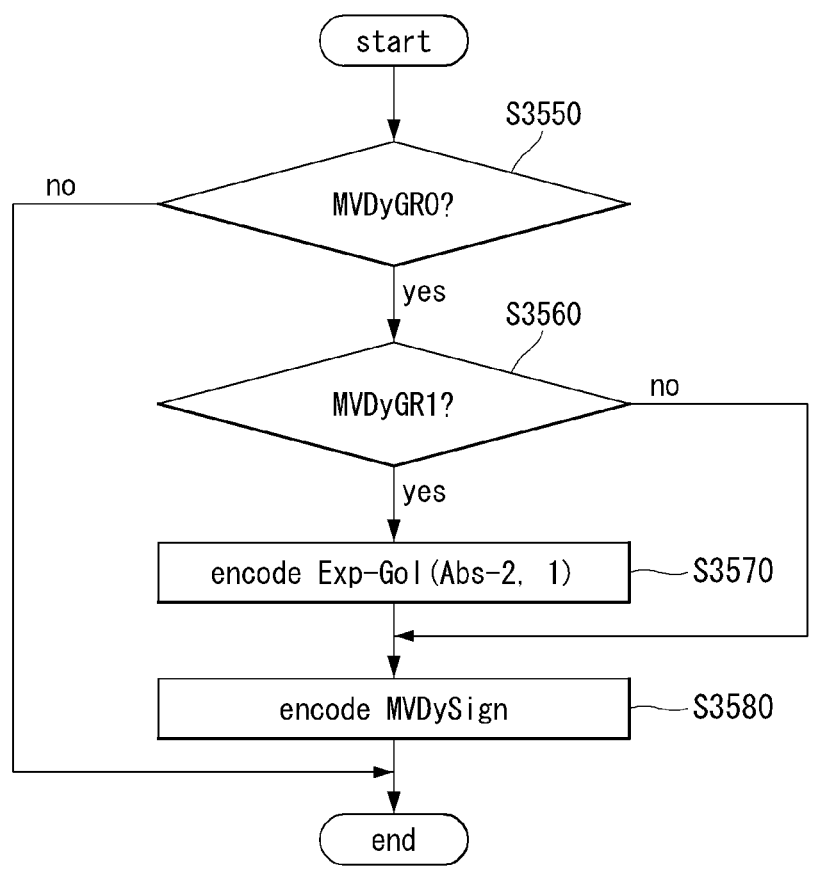
[FIG. 35B]

[FIG. 36A]
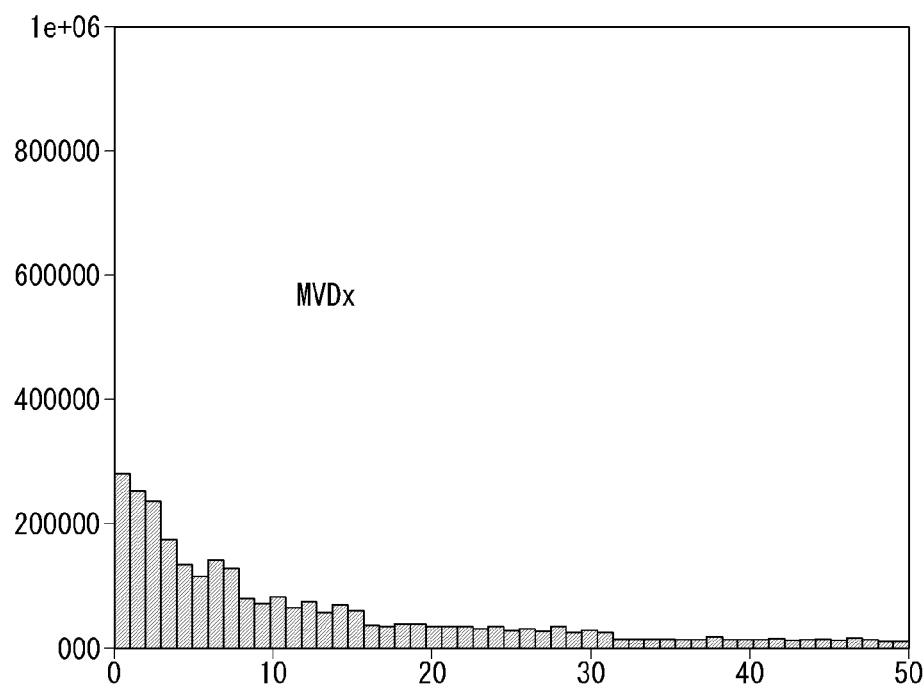
[FIG. 36B]
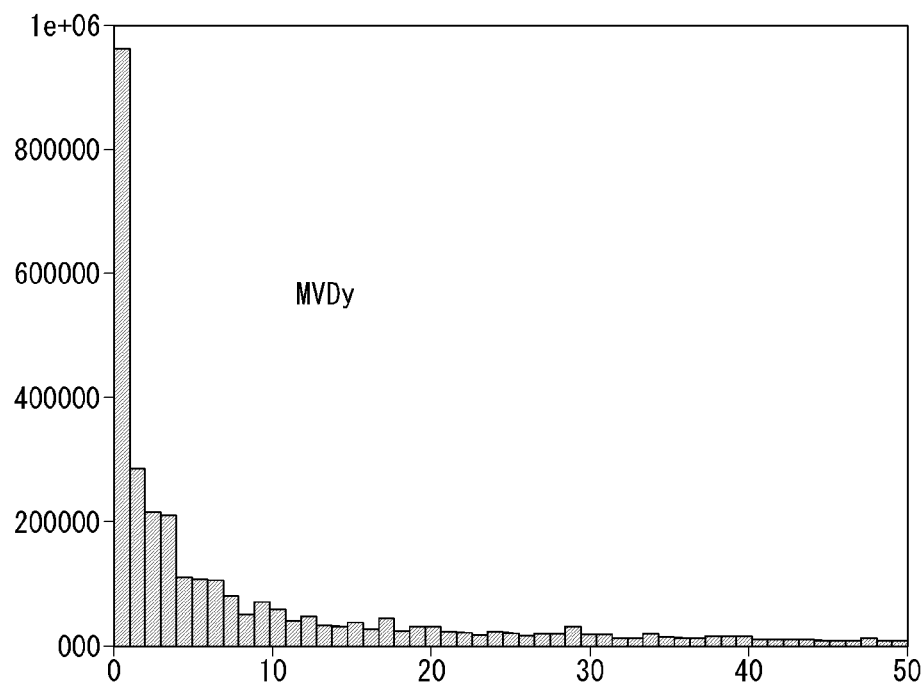

[FIG. 37]
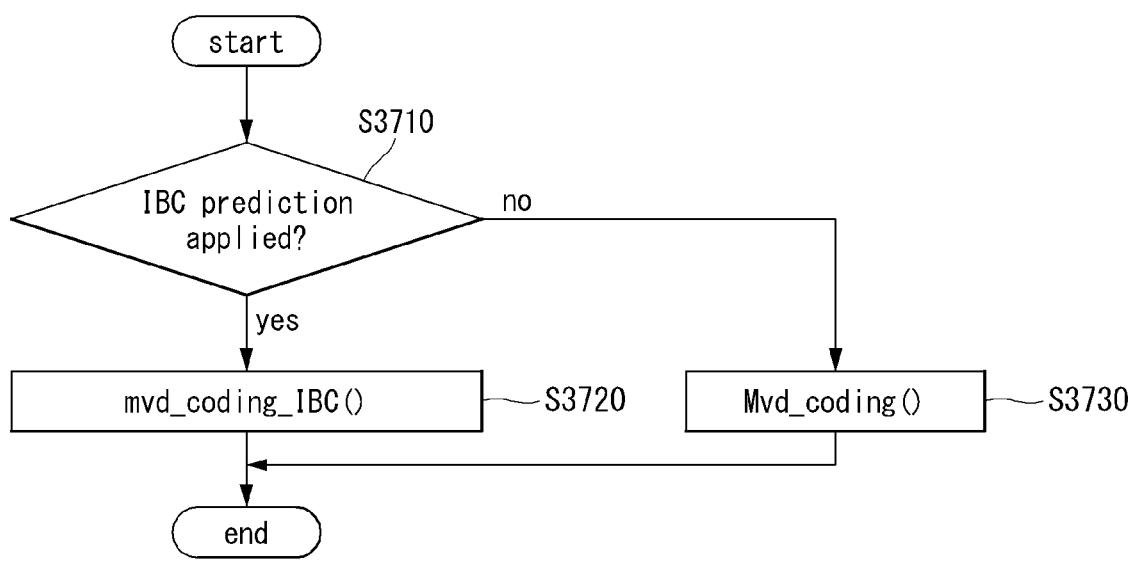

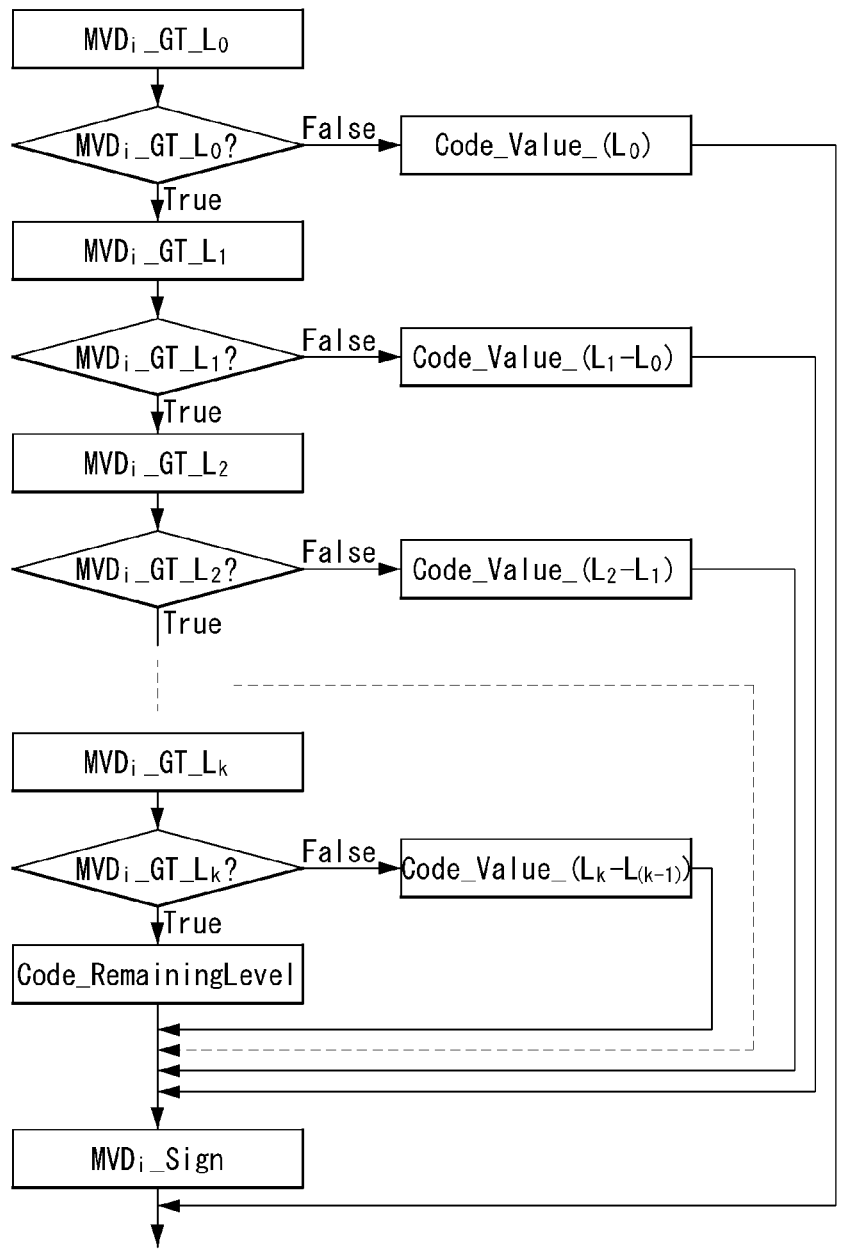
[FIG. 38]

[FIG. 39]
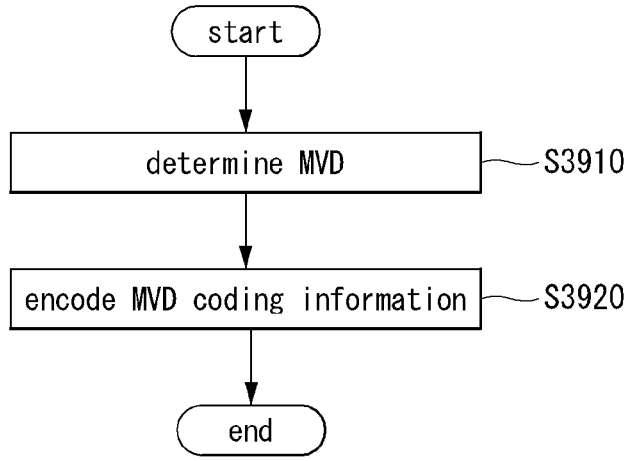
[FIG. 40]
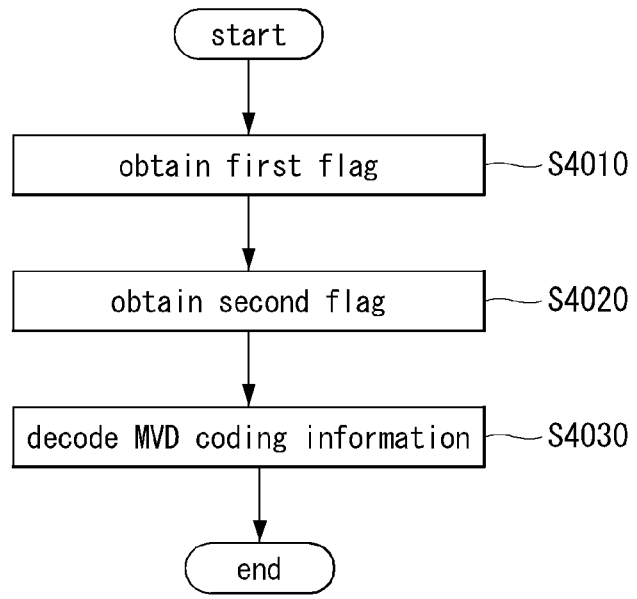

VIDEO SIGNAL PROCESSING METHOD AND DEVICE FOR PROCESSING MOTION VECTOR DIFFERENCE INFORMATION FOR INTER PREDICTION IN VIDEO SIGNAL

CROSS-REFERENCE TO RELATED APPLICATIONS

This application is the National Stage filing under 35 U.S.C. 371 of International Application No. PCT/KR2020/003320, filed on Mar. 10, 2020, which claims the benefit of U.S. Provisional Application No. 62/816,200, filed on Mar. 10, 2019, the contents of which are all hereby incorporated by reference herein in their entirety.

TECHNICAL FIELD

The present disclosure relates to a method and device for processing a video signal, and more particularly to a method and device for encoding/decoding motion vector difference information in an inter prediction during an encoding/decoding process of a video signal.

BACKGROUND ART

Compression encoding means a series of signal processing techniques for transmitting digitized information through a communication line or techniques for storing information in a form suitable for a storage medium. The medium including a picture, an image, audio, etc. may be a target for compression encoding, and particularly, a technique for performing compression encoding on a picture is referred to as video image compression.

Next-generation video contents are supposed to have the characteristics of high spatial resolution, a high frame rate and high dimensionality of scene representation. In order to process such contents, a drastic increase in the memory storage, memory access rate and processing power will result.

Inter prediction is a method of performing prediction on a current picture with reference to reconstructed samples of another picture. In order to increase the efficiency of the inter prediction, various motion vector derivation methods are being discussed together with a new inter prediction technique.

As one method for inter prediction, an encoder may code motion vector difference information between a motion vector of a current block and a motion vector (motion vector predictor) of a neighboring block and signal it to a decoder, and the decoder may derive the motion vector of the current block using the motion vector difference information and the motion vector of the neighboring block. In this process, techniques for efficiently coding motion vector difference information are under discussion.

DISCLOSURE

Technical Problem

An embodiment of the present disclosure a method and a device for efficiently encoding/decoding motion vector difference information during an encoding/decoding process for information for inter prediction.

The technical objects to be achieved by an embodiment of the present disclosure are not limited to the aforementioned technical objects, and other technical objects, which are not mentioned above, will be apparently appreciated by a person having ordinary skill in the art to which an embodiment of the present disclosure pertains from the following description.

Technical Solution

Embodiments of the disclosure provide a method and device for processing motion vector difference (MVD) information for inter prediction in a video signal. According to an embodiment of the disclosure, a method for decoding MVD information comprises obtaining a first flag indicating whether an MVD for prediction of a current block is greater than a first value, obtaining a second flag indicating whether the MVD is greater than a second value based on the first flag, and decoding size information for the MVD based on the second flag, wherein obtaining the size information for the MVD includes decoding the size information for the MVD based on a first difference value corresponding to a difference between the second value and the first value if the MVD is equal to or smaller than the second value.

In an embodiment, decoding the size information for the MVD may include decoding the size information for the MVD using a fixed length code (FLC) based on the first difference value.

In an embodiment, obtaining the size information for the MVD may include decoding the size information for the MVD based on an exponential Golomb code having an order of two or more if the MVD is greater than the second value.

In an embodiment, obtaining the size information for the MVD may include obtaining a third flag indicating whether the MVD is greater than a third value if the MVD is greater than the second value. Here, a second difference value corresponding to a difference between the third value and the second value may be greater than the first difference value.

In an embodiment, the second difference value may be set to be equal to a value obtained by multiplying the first difference value by two.

In an embodiment, the MVD may include a horizontal component and a vertical component. The horizontal component of the MVD and the vertical component of the MVD may be coded based on different context models.

According to an embodiment of the disclosure, a method for encoding MVD information comprises determining an MVD based on a motion vector of a current block and a motion vector of a neighboring block and encoding coding information for the MVD. The coding information for the MVD may include a first flag indicating whether the MVD is greater than a first value, a second flag that is coded based on the first flag and indicates whether the MVD is greater than a second value, and MVD size information. When the MVD is less than or equal to the second value, the MVD size information is coded based on a first difference value corresponding to a difference between the second value and the first value.

In an embodiment, encoding the size information for the MVD may include encoding the size information for the MVD using a fixed length code (FLC) based on the first difference value.

In an embodiment, encoding the size information for the MVD may include encoding the size information for the MVD based on an exponential Golomb code having an order of two or more if the MVD is greater than the second value.

In an embodiment, encoding the size information for the MVD may include encoding a third flag indicating whether the MVD is greater than a third value if the MVD is greater than the second value. Here, a second difference value corresponding to a difference between the third value and the second value may be greater than the first difference value.

In an embodiment, the second difference value may be set to be equal to a value obtained by multiplying the first difference value by two.

In one embodiment, the MVD may include a horizontal component and a vertical component. The horizontal component of the MVD and the vertical component of the MVD may be coded based on different context models.

Advantageous Effects

According to an embodiment of the disclosure, it is possible to reduce the amount of data for signaling by encoding/decoding a multi-path motion vector.

Effects of the disclosure are not limited to the foregoing, and other unmentioned effects would be apparent to one of ordinary skill in the art from the following description.

DESCRIPTION OF DRAWINGS

The accompany drawings, which are included as part of the detailed description in order to help understanding of the disclosure, provide embodiments of the disclosure and describe the technical characteristics of the disclosure along with the detailed description.

FIG. 1 illustrates an example of a video coding system according to an embodiment of the disclosure.

FIG. 2 is an embodiment to which the disclosure is applied, and is a schematic block diagram of an encoding apparatus for encoding a video/image signal.

FIG. 3 is an embodiment to which the disclosure is applied, and is a schematic block diagram of a decoding apparatus for decoding a video/image signal.

FIG. 4 shows an example of a content streaming system according to an embodiment of the disclosure.

FIG. 5 shows an example of an apparatus for processing a video signal according to an embodiment of the disclosure.

FIG. 6 illustrates an example of a partitioning structure of a picture according to an embodiment of the present disclosure.

FIGS. 7A to 7D illustrate an example of a block partitioning structure according to an embodiment of the present disclosure.

FIG. 8 illustrates an example of a case in which ternary tree (TT) and binary tree (BT) partitioning is limited according to an embodiment of the present disclosure.

FIG. 9 is a block diagram illustrating entropy encoding according to an embodiment of the disclosure.

FIGS. 10A and 10B illustrate an entropy encoding method and related components according to an embodiment of the disclosure.

FIGS. 11A and 11B illustrate an entropy decoding method and related components according to an embodiment of the disclosure.

FIG. 12 is an example flowchart for encoding a picture constituting a video signal according to an embodiment of the disclosure.

FIG. 13 is an example flowchart for decoding a picture constituting a video signal according to an embodiment of the disclosure.

FIG. 14 illustrates an example of a hierarchical structure for a coded image according to an embodiment of the disclosure.

FIGS. 15A and 15B illustrate an inter prediction-based video/image encoding method and an inter prediction unit in an encoding device according to an embodiment of the disclosure.

FIGS. 16A and 16B illustrate an inter prediction-based video/image decoding method and an inter prediction unit in a decoding device according to an embodiment of the disclosure.

FIG. 17 illustrates an inter prediction procedure according to an embodiment of the disclosure.

FIG. 18 illustrates example spatial neighboring blocks used as spatial merge candidates according to an embodiment of the disclosure.

FIG. 19 is an example flowchart for constructing a merge candidate list according to an embodiment of the disclosure.

FIG. 20 is an example flowchart for constructing a motion vector predictor (MVP) candidate list according to an embodiment of the disclosure.

FIG. 21 illustrates an example of a case in which a symmetric motion vector difference (SMVD) mode is applied according to an embodiment of the disclosure.

FIG. 22 illustrates example of affine motion models according to an embodiment of the disclosure.

FIGS. 23A and 23B illustrate examples of motion vectors for each control point according to an embodiment of the disclosure.

FIG. 24 illustrates an example of a motion vector for each subblock according to an embodiment of the disclosure.

FIG. 25 is an example flowchart for constructing an affine merge candidate list according to an embodiment of the disclosure.

FIG. 26 illustrates example blocks for deriving an inherited affine motion predictor according to an embodiment of the disclosure.

FIG. 27 illustrates example control point motion vectors for deriving an inherited affine motion predictor according to an embodiment of the disclosure.

FIG. 28 illustrates example blocks for deriving a constructed affine merge candidate according to an embodiment of the disclosure.

FIG. 29 is an example flowchart for constructing an affine MVP candidate list according to an embodiment of the disclosure.

FIGS. 30A and 30B illustrate examples of spatial neighboring blocks used in adaptive temporal motion vector prediction (ATMVP) and a sub-coding block (CU) motion field derived from spatial neighboring blocks according to an embodiment of the disclosure.

FIGS. 31A and 31B illustrate examples of an intra block copy (IBC) mode-based video/image encoding method and a prediction unit in an encoding device according to an embodiment of the disclosure.

FIGS. 32A and 32B illustrate examples of an IBC mode-based video/image decoding method and a prediction unit in a decoding device according to an embodiment of the disclosure.

FIG. 33 is an example flowchart for obtaining motion vector difference (MVD) coding information according to an embodiment of the disclosure.

FIGS. 34A and 34B are example flowcharts for obtaining information for the x component and the y component of the MVD according to an embodiment of the disclosure.

FIGS. 35A and 35B are example flowcharts for encoding information for the x component and the y component of the MVD according to an embodiment of the disclosure.

FIGS. 36A and 36B illustrate examples of statistics of bin values for the x component and the y component of the MVD according to an embodiment of the disclosure.

FIG. 37 illustrates an example in which MVD coding is separately applied when general MVD coding and an IBC mode are applied according to an embodiment of the disclosure.

FIG. 38 is an example flowchart for multiple pass MVD coding according to an embodiment of the disclosure.

FIG. 39 is an example flowchart for encoding MVD information in a video signal according to an embodiment of the disclosure.

FIG. 40 is an example flowchart for decoding MVD information in a video signal according to an embodiment of the disclosure.

MODE FOR DISCLOSURE

Hereinafter, preferred embodiments of the disclosure will be described by reference to the accompanying drawings. The description that will be described below with the accompanying drawings is to describe exemplary embodiments of the disclosure, and is not intended to describe the only embodiment in which the disclosure may be implemented. The description below includes particular details in order to provide perfect understanding of the disclosure. However, it is understood that the disclosure may be embodied without the particular details to those skilled in the art. In some cases, in order to prevent the technical concept of the disclosure from being unclear, structures or devices which are publicly known may be omitted, or may be depicted as a block diagram centering on the core functions of the structures or the devices.

In some cases, in order to prevent the technical concept of the disclosure from being unclear, structures or devices which are publicly known may be omitted, or may be depicted as a block diagram centering on the core functions of the structures or the devices.

Further, although general terms widely used currently are selected as the terms in the disclosure as much as possible, a term that is arbitrarily selected by the applicant is used in a specific case. Since the meaning of the term will be clearly described in the corresponding part of the description in such a case, it is understood that the disclosure will not be simply interpreted by the terms only used in the description of the disclosure, but the meaning of the terms should be figured out.

Specific terminologies used in the description below may be provided to help the understanding of the disclosure. Furthermore, the specific terminology may be modified into other forms within the scope of the technical concept of the disclosure. For example, a signal, data, a sample, a picture, a frame, a block, etc may be properly replaced and interpreted in each coding process.

Hereinafter, in the present disclosure, a "processing unit" means a unit in which an encoding/decoding processing process, such as prediction, a transform and/or quantization, is performed. A processing unit may be construed as having a meaning including a unit for a luma component and a unit for a chroma component. For example, a processing unit may correspond to a coding tree unit (CTU), a coding unit (CU), a prediction unit (PU) or a transform unit (TU).

Furthermore, a processing unit may be construed as being a unit for a luma component or a unit for a chroma component. For example, the processing unit may correspond to a coding tree block (CTB), a coding block (CB), a prediction block (PB) or a transform block (TB) for a luma component. Alternatively, a processing unit may correspond to a coding tree block (CTB), a coding block (CB), a prediction block (PB) or a transform block (TB) for a chroma component. Furthermore, the disclosure is not limited thereto, and a processing unit may be construed as a meaning including a unit for a luma component and a unit for a chroma component.

Furthermore, a processing unit is not essentially limited to a square block and may be constructed in a polygon form having three or more vertices.

Furthermore, hereinafter, in the present disclosure, a pixel is generally called a sample. Furthermore, to use a sample may mean to use a pixel value.

FIG. 1 illustrates an example of a video coding system according to an embodiment of the disclosure. The video coding system may include a source device 10 and a receive device 20. The source device 10 may transmit encoded video/image information or data to the receive device 20 in a file or streaming format through a storage medium or a network.

The source device 10 may include a video source 11, an encoding apparatus 12, and a transmitter 13. The receive device 20 may include a receiver 21, a decoding apparatus 22 and a renderer 23. The source device may be referred to as a video/image encoding apparatus and the receive device may be referred to as a video/image decoding apparatus. The transmitter 13 may be included in the encoding apparatus 12. The receiver 21 may be included in the decoding apparatus 22. The renderer may include a display and the display may be configured as a separate device or an external component.

The video source 11 may acquire video/image data through a capture, synthesis, or generation process of video/image. The video source 11 may include a video/image capturing device and/or a video/image generating device. The video/image capturing device may include, for example, one or more cameras, a video/image archive including previously captured video/images, and the like. The video/image generating device may include, for example, a computer, a tablet, and a smartphone, and may electronically generate video/image data. For example, virtual video/image data may be generated through a computer or the like, and in this case, a video/image capturing process may be replaced by a process of generating related data.

The encoding apparatus 12 may encode an input video/image. The encoding apparatus 12 may perform a series of procedures such as prediction, transform, and quantization for compression and coding efficiency. The encoded data (encoded video/video information) may be output in a form of a bitstream.

The transmitter 13 may transmit the encoded video/video information or data output in the form of a bitstream to the receiver 21 of the receive device 20 through a digital storage medium or a network in a file or streaming format. The digital storage media may include various storage media such as universal serial bus USB, secure digital SD card, compact disk CD, digital video disk DVD, blu-ray, hard disk drive HDD, and solid state drive SSD. The transmitter 13 may include an element for generating a media file through a predetermined file format, and may include an element for transmission through a broadcast/communication network. The receiver 21 may extract the bitstream and transmit it to the decoding apparatus 22.

The decoding apparatus 22 may decode video/image data by performing a series of procedures such as dequantization, inverse transform, and prediction corresponding to the operations of the encoding apparatus 12.

The renderer 23 may render the decoded video/image. The rendered video/image may be displayed through the display.

FIG. 2 is an embodiment to which the disclosure is applied, and is a schematic block diagram of an encoding apparatus for encoding a video/image signal. The encoding apparatus 100 of FIG. 2 may correspond to the encoding apparatus 12 of FIG. 1

Referring to FIG. 2, an encoding apparatus 100 may be configured to include an image divider 110, a subtractor 115, a transformer 120, a quantizer 130, a dequantizer 140, an inverse transformer 150, an adder 155, a filter 160, a memory 170, an inter predictor 180, an intra predictor 185 and an entropy encoder 190. The inter predictor 180 and the intra predictor 185 may be commonly called a predictor. In other words, the predictor may include the inter predictor 180 and the intra predictor 185. The transformer 120, the quantizer 130, the dequantizer 140, and the inverse transformer 150 may be included in a residual processor. The residual processor may further include the subtractor 115. In one embodiment, the image divider 110, the subtractor 115, the transformer 120, the quantizer 130, the dequantizer 140, the inverse transformer 150, the adder 155, the filter 160, the inter predictor 180, the intra predictor 185 and the entropy encoder 190 may be configured as one hardware component (e.g., an encoder or a processor). Furthermore, the memory 170 may include a decoded picture buffer (DPB) and may be configured with a digital storage medium.

The image divider 110 may divide an input image (or picture or frame), input to the encoding apparatus 100, into one or more processing units. For example, the processing unit may be called a coding unit (CU). In this case, the coding unit may be recursively split from a coding tree unit (CTU) or the largest coding unit (LCU) based on a quadtree binary-tree (QTBT) structure. For example, one coding unit may be split into a plurality of coding units of a deeper depth based on a quadtree structure and/or a binary-tree structure. In this case, for example, the quadtree structure may be first applied, and the binary-tree structure may be then applied. Alternatively the binary-tree structure may be first applied. A coding procedure according to the disclosure may be performed based on the final coding unit that is no longer split. In this case, the largest coding unit may be directly used as the final coding unit based on coding efficiency according to an image characteristic or a coding unit may be recursively split into coding units of a deeper depth, if necessary. Accordingly, a coding unit having an optimal size may be used as the final coding unit. In this case, the coding procedure may include a procedure, such as a prediction, transform or reconstruction to be described later. For another example, the processing unit may further include a prediction unit (PU) or a transform unit (TU). In this case, each of the prediction unit and the transform unit may be divided or partitioned from each final coding unit. The prediction unit may be a unit for sample prediction, and the transform unit may be a unit from which a transform coefficient is derived and/or a unit in which a residual signal is derived from a transform coefficient.

A unit used in the present disclosure may be interchangeably used with a block or an area according to circumstances. In the present disclosure, an M×N block may indicate a set of samples configured with M columns and N rows or a set of transform coefficients. In general, a sample may indicate a pixel or a value of a pixel, and may indicate only a pixel/pixel value of a luma component or only a pixel/pixel value of a chroma component. In a sample, one picture (or image) may be used as a term corresponding to a pixel or pel.

The encoding apparatus 100 may generate a residual signal (residual block or residual sample array) by subtracting a prediction signal (predicted block or prediction sample array), output by the inter predictor 180 or the intra predictor 185, from an input image signal (original block or original sample array). The generated residual signal is transmitted to the transformer 120. In this case, as illustrated, a unit in which the prediction signal (prediction block or prediction sample array) is subtracted from the input image signal (original block or original sample array) within the encoding apparatus 100 may be called the subtractor 115. The predictor may perform prediction on a processing target block (hereinafter referred to as a current block), and may generate a predicted block including prediction samples for the current block. The predictor may determine whether an intra prediction is applied or inter prediction is applied in a current block or a CU unit. The predictor may generate pieces of information on a prediction, such as prediction mode information as will be described later in the description of each prediction mode, and may transmit the information to the entropy encoder 190. The information on prediction may be encoded in the entropy encoder 190 and may be output in a bitstream form.

The intra predictor 185 may predict a current block with reference to samples within a current picture. The referred samples may be located to neighbor the current block or may be spaced from the current block depending on a prediction mode. In an intra prediction, prediction modes may include a plurality of non-angular modes and a plurality of angular modes. The non-angular mode may include a DC mode and a planar mode, for example. The angular mode may include 33 angular prediction modes or 65 angular prediction modes, for example, depending on a fine degree of a prediction direction. In this case, angular prediction modes that are more or less than the 33 angular prediction modes or 65 angular prediction modes may be used depending on a configuration, for example. The intra predictor 185 may determine a prediction mode applied to a current block using the prediction mode applied to a neighboring block.

The inter predictor 180 may derive a predicted block for a current block based on a reference block (reference sample array) specified by a motion vector on a reference picture. In this case, in order to reduce the amount of motion information transmitted in an inter prediction mode, motion information may be predicted as a block, a sub-block or a sample unit based on the correlation of motion information between a neighboring block and the current block. The motion information may include a motion vector and a reference picture index. The motion information may further include inter prediction direction (L0 prediction, L1 prediction, Bi prediction) information. In the case of inter prediction, a neighboring block may include a spatial neighboring block within a current picture and a temporal neighboring block within a reference picture. A reference picture including a reference block and a reference picture including a temporal neighboring block may be the same or different. The temporal neighboring block may be referred to as a name called a co-located reference block or a co-located CU (colCU). A reference picture including a temporal neighboring block may be referred to as a co-located picture (colPic). For example, the inter predictor 180 may construct a motion information candidate list based on the motion information of neighboring blocks, and may generate information indicating that which candidate is used to derive a motion vector and/or reference picture index of a current block. An inter prediction may be performed based on various prediction modes. For example, in the case of a skip mode and a merge mode, the inter predictor 180 may use motion information of a neighboring block as motion information of a current block. In the case of the skip mode, unlike the merge mode, a residual signal may not be transmitted. In the case of a motion vector prediction (MVP) mode, a motion vector of a neighboring block may be used as a motion vector predictor. A motion vector of a current block may be indicated by signaling a motion vector difference MVD.

The prediction unit may generate a prediction signal (prediction sample) based on various prediction methods to be described later. For example, the prediction unit may apply intra prediction or inter prediction for prediction of one block, and may apply the intra prediction and the inter prediction together (simultaneously). This may be referred to as combined inter and intra prediction (CIIP). Also, the prediction unit may perform intra block copy (IBC) to predict the block. The IBC may be used, for example, for content (e.g., game) video/video coding such as screen content coding (SCC). Also, the IBC may also be referred to as current picture referencing (CPR). The IBC basically performs prediction within a current picture, but may be performed similarly to the inter prediction in that a reference block is derived within the current picture. That is, the IBC may use at least one of the inter prediction techniques described in the present disclosure.

A prediction signal generated through a prediction unit (including the inter predictor 180 and/or the intra predictor 185) may be used to generate a reconstructed signal or a residual signal. The transformer 120 may generate transform coefficients by applying a transform scheme to a residual signal. For example, the transform scheme may include at least one of a discrete cosine transform (DCT), a discrete sine transform (DST), a Karhunen-Loève transform (KLT), a graph-based transform (GBT), or a conditionally non-linear transform (CNT). In this case, the GBT means a transform obtained from a graph if relation information between pixels is represented as the graph. The CNT means a transform obtained based on a prediction signal generated using all of previously reconstructed pixels. Furthermore, a transform process may be applied to pixel blocks having the same size of a square form or may be applied to blocks of a non-square form or blocks having variable sizes not a square form.

The quantizer 130 may quantize transform coefficients and transmit them to the entropy encoder 190. The entropy encoder 190 may encode a quantized signal (information on quantized transform coefficients) and output it in a bitstream form. The information on quantized transform coefficients may be called residual information. The quantizer 130 may re-arrange the quantized transform coefficients of a block form in one-dimensional vector form based on a coefficient scan sequence, and may generate information on the quantized transform coefficients based on the characteristics of the quantized transform coefficients of the one-dimensional vector form. The entropy encoder 190 may perform various encoding methods, such as exponential Golomb, context-adaptive variable length coding (CAVLC), and context-adaptive binary arithmetic coding (CABAC). The entropy encoder 190 may encode information (e.g., values of syntax elements) necessary for video/image reconstruction in addition to the quantized transform coefficients together or separately. The encoded information (e.g., encoded video/image information) may be transmitted or stored in a network abstraction layer (NAL) unit in the form of a bitstream. The video/image information may further include information about various parameter sets, such as an adaptation parameter set (APS), a picture parameter set (PPS), a sequence parameter set (SPS), or a video parameter set (VPS). Signaled/transmitted information and/or syntax elements described later in the present disclosure may be encoded through the above-described encoding procedure and included in the bitstream. The bitstream may be transmitted over a network or may be stored in a digital storage medium. In this case, the network may include a broadcast network and/or a communication network. The digital storage medium may include various storage media, such as a USB, an SD, a CD, a DVD, blu-ray, an HDD, and an SSD. A transmitter (not illustrated) that transmits a signal output by the entropy encoder 190 and/or a storage (not illustrated) for storing the signal may be configured as an internal/external element of the encoding apparatus 100, or the transmitter may be an element of the entropy encoder 190.

Quantized transform coefficients output by the quantizer 130 may be used to generate a reconstructed signal. For example, a residual signal may be reconstructed by applying de-quantization and an inverse transform to the quantized transform coefficients through the dequantizer 140 and the inverse transformer 150 within a loop. The adder 155 may add the reconstructed residual signal to a prediction signal output by the inter predictor 180 or the intra predictor 185, so a reconstructed signal (reconstructed picture, reconstructed block or reconstructed sample array) may be generated. A predicted block may be used as a reconstructed block if there is no residual signal for a processing target block as in the case where a skip mode has been applied. The adder 155 may be called a reconstructor or a reconstruction block generator. The generated reconstructed signal may be used for the intra prediction of a next processing target block within a current picture, and may be used for the inter prediction of a next picture through filtering as will be described later.

The filter 160 can improve subjective/objective picture quality by applying filtering to a reconstructed signal. For example, the filter 160 may generate a modified reconstructed picture by applying various filtering methods to the reconstructed picture. The modified reconstructed picture may be stored in the DPB 175 of the memory 170. The various filtering methods may include deblocking filtering, a sample adaptive offset SAO, an adaptive loop filter ALF, and a bilateral filter, for example. The filter 160 may generate pieces of information for filtering as will be described later in the description of each filtering method, and may transmit them to the entropy encoder 190. The filtering information may be encoded through the entropy encoding in the entropy encoder 190 and output in a bitstream form.

The modified reconstructed picture transmitted to the DPB 175 may be used as a reference picture in the inter predictor 180. The encoding apparatus can avoid a prediction mismatch in the encoding apparatus 100 and a decoding apparatus and improve encoding efficiency by using the modified reconstructed picture if inter prediction is applied. The DPB 175 may store a modified reconstructed picture in order to use the modified reconstructed picture as a reference picture in the inter predictor 180. The stored motion information may be transmitted to the inter prediction unit 180 to be used as the motion information of a spatial neighboring block or motion information of a temporal neighboring block. The memory 170 may store reconstructed samples of reconstructed blocks in the current picture, and transmit information on the reconstructed samples to the intra prediction unit 185.

FIG. 3 is an embodiment to which the disclosure is applied, and is a schematic block diagram of a decoding apparatus for decoding a video/image signal. The decoding apparatus 200 of FIG. 3 may correspond to the decoding apparatus 22 of FIG. 1.

Referring to FIG. 3, the decoding apparatus 200 may be configured to include an entropy decoder 210, a dequantizer 220, an inverse transformer 230, an adder 235, a filter 240, a memory 250, an inter predictor 260 and an intra predictor 265. The inter predictor 260 and the intra predictor 265 may be collectively called a predictor. That is, the predictor may include the inter predictor 180 and the intra predictor 185. The dequantizer 220 and the inverse transformer 230 may be collectively called as residual processor. That is, the residual processor may include the dequantizer 220 and the inverse transformer 230. The entropy decoder 210, the dequantizer 220, the inverse transformer 230, the adder 235, the filter 240, the inter predictor 260 and the intra predictor 265 may be configured as one hardware component (e.g., the decoder or the processor) according to an embodiment. Furthermore, the memory 250 may include a decoded picture buffer DPB 255 and be configured with a hardware component (for example a memory or a digital storage medium) in an embodiment.

When a bitstream including video/image information is input, the decoding apparatus 200 may reconstruct an image in accordance with a process of processing video/image information in the encoding apparatus of FIG. 2. For example, the decoding apparatus 200 may perform decoding using a processing unit applied in the encoding apparatus. Accordingly, a processing unit for decoding may be a coding unit, for example. The coding unit may be split from a coding tree unit or the largest coding unit depending on a quadtree structure and/or a binary-tree structure. Furthermore, a reconstructed image signal decoded and output through the decoding apparatus 200 may be played back through a playback device.

The decoding apparatus 200 may receive a signal, output by the encoding apparatus of FIG. 1, in a bitstream form. The received signal may be decoded through the entropy decoder 210. For example, the entropy decoder 210 may derive information (e.g., video/image information) for image reconstruction (or picture reconstruction) by parsing the bitstream. The video/image information may further include information about various parameter sets, such as an adaptation parameter set (APS), a picture parameter set (PPS), a sequence parameter set (SPS), or a video parameter set (VPS). The decoding apparatus may decode the picture based on information about the parameter set. Signaled/received information and/or syntax elements described later in the present disclosure may be decoded through a decoding procedure and obtained from a bitstream. For example, the entropy decoder 210 may obtain information within the bitstream based on a coding method, such as exponential Golomb encoding, CAVLC or CABAC, and may output a value of a syntax element for image reconstruction or quantized values of transform coefficients regarding a residual. More specifically, in the CABAC entropy decoding method, a bin corresponding to each syntax element may be received from a bitstream, a context model may be determined using decoding target syntax element information and decoding information of a neighboring and decoding target block or information of a symbol/bin decoded in a previous step, a probability that a bin occurs may be predicted based on the determined context model, and a symbol corresponding to a value of each syntax element may be generated by performing arithmetic decoding on the bin. In this case, in the CABAC entropy decoding method, after a context model is determined, the context model may be updated using information of a symbol/bin decoded for the context model of a next symbol/bin. Information on a prediction among information decoded in the entropy decoder 2110 may be provided to the predictor (inter predictor 260 and intra predictor 265). Parameter information related to a residual value on which entropy decoding has been performed in the entropy decoder 210, that is, quantized transform coefficients, and may be input to the dequantizer 220. Furthermore, information on filtering among information decoded in the entropy decoder 210 may be provided to the filter 240. Meanwhile, a receiver (not illustrated) that receives a signal output by the encoding apparatus may be further configured as an internal/external element of the decoding apparatus 200 or the receiver may be an element of the entropy decoder 210. Meanwhile, the decoding apparatus 200 according to the present specification may be referred to as a video/image/picture decoding apparatus. The decoding apparatus 200 may be divided into an information decoder (video/image/picture information decoder) and a sample decoder (video/image/picture sample decoder). The information decoder may include an entropy decoding unit 210, and the sample decoder may include at least one of the inverse quantizer 220, the inverse transform unit 230, the adder 235, the filter 240, the memory 250, the inter prediction unit, and the intra prediction unit 265.

The dequantizer 220 may de-quantize quantized transform coefficients and output transform coefficients. The dequantizer 220 may re-arrange the quantized transform coefficients in a two-dimensional block form. In this case, the re-arrangement may be performed based on a coefficient scan sequence performed in the encoding apparatus. The dequantizer 220 may perform de-quantization on the quantized transform coefficients using a quantization parameter (e.g., quantization step size information), and may obtain transform coefficients.

The inverse transformer 230 may output a residual signal (residual block or residual sample array) by inverse-transforming transform coefficients.

The predictor may perform a prediction on a current block, and may generate a predicted block including prediction samples for the current block. The predictor may determine whether an intra prediction is applied or inter prediction is applied to the current block based on information on a prediction, which is output by the entropy decoder 210, and may determine a detailed intra/inter prediction mode.

The predictor may generate a prediction signal (prediction sample) based on various prediction methods to be described below. For example, the predictor may apply the intra prediction or inter prediction for prediction for one block and simultaneously apply the intra prediction and the inter prediction. This may be called combined inter and intra prediction (CIIP). In addition, the predictor may perform intra block copy (IBC) to predict the block. The IBC may be used for content image/video coding such as a game, for example, screen content coding (SCC). Further, the IBC may also be referred to as current picture referencing (CPR). The IBC basically performs prediction in the current picture, but may be performed similarly to the inter prediction in that the IBC derives a reference block in the current picture. That is, the IBC may use at least one of the inter prediction techniques described in the present disclosure.

The intra predictor 265 may predict a current block with reference to samples within a current picture. The referred samples may be located to neighbor a current block or may be spaced apart from a current block depending on a prediction mode. In an intra prediction, prediction modes may include a plurality of non-angular modes and a plurality of angular modes. The intra predictor 265 may determine a prediction mode applied to a current block using a prediction mode applied to a neighboring block.

The inter predictor 260 may derive a predicted block for a current block based on a reference block (reference sample array) specified by a motion vector on a reference picture. In this case, in order to reduce the amount of motion information transmitted in an inter prediction mode, motion information may be predicted as a block, a sub-block or a sample unit based on the correlation of motion information between a neighboring block and the current block. The motion information may include a motion vector and a reference picture index. The motion information may further include inter prediction direction (L0 prediction, L1 prediction, Bi prediction) information. In the case of inter prediction, a neighboring block may include a spatial neighboring block within a current picture and a temporal neighboring block within a reference picture. For example, the inter predictor 260 may configure a motion information candidate list based on neighboring blocks, and may derive a motion vector and/or reference picture index of a current block based on received candidate selection information. An inter prediction may be performed based on various prediction modes. Information on the prediction may include information indicating a mode of inter prediction for a current block.

The adder 235 may generate a reconstructed signal (reconstructed picture, reconstructed block or reconstructed sample array) by adding an obtained residual signal to a prediction signal (predicted block or prediction sample array) output by the prediction unit (including the inter predictor 260 and/or the intra predictor 265). A predicted block may be used as a reconstructed block if there is no residual for a processing target block as in the case where a skip mode has been applied.

The adder 235 may be called a reconstructor or a reconstruction block generator. The generated reconstructed signal may be used for the intra prediction of a next processing target block within a current picture, and may be used for the inter prediction of a next picture through filtering as will be described later.

The filter 240 can improve subjective/objective picture quality by applying filtering to a reconstructed signal. For example, the filter 240 may generate a modified reconstructed picture by applying various filtering methods to a reconstructed picture, and may transmit the modified reconstructed picture to the DPB 255 of the memory 250. The various filtering methods may include deblocking filtering, a sample adaptive offset SAO, an adaptive loop filter ALF, and a bilateral filter, for example.

A reconstructed picture transmitted (modified) in the DPB 255 of the memory 250 may be used as a reference picture in the inter predictor 260. The memory 250 may store the motion information of a block of which motion information in the current picture is derived (or decoded) and/or the motion information of blocks in an already reconstructed picture. The stored motion information may be transmitted to the inter prediction unit 260 to be used as motion information of a spatial neighboring block or motion information of a temporal neighboring block. The memory 250 may store the reconstructed samples of blocks reconstructed in the current picture, and may transmit the reconstructed samples to the intra prediction unit 265.

In the disclosure, the embodiments described in the filter 160, inter predictor 180 and intra predictor 185 of the encoding apparatus 100 may be applied to the filter 240, inter predictor 260 and intra predictor 265 of the decoding apparatus 200, respectively, identically or in a correspondence manner.

FIG. 4 shows an example of a content streaming system according to an embodiment of the disclosure. The content streaming system to which the disclosure is applied may largely include an encoding server 410, a streaming server 420, a web server 430, a media storage 440, a user device 450, and a multimedia input device 460.

The encoding server 410 may compress the content input from multimedia input devices 460 such as a smartphone, camera, camcorder, etc. into digital data to generate a bitstream and transmit it to the streaming server 420. As another example, when the multimedia input devices 460 such as the smartphone, camera, and camcorder directly generate a bitstream, the encoding server 410 may be omitted.

The bitstream may be generated by an encoding method or a bitstream generation method to which the disclosure is applied, and the streaming server 420 may temporarily store the bitstream in the process of transmitting or receiving the bitstream.

The streaming server 420 transmits multimedia data to the user device 450 based on a user request through the web server 430, and the web server 430 serves as an intermediary to inform the user of what service is present. When a user requests a desired service through the web server 430, the web server 430 delivers the information on the desired service to the streaming server 420, and the streaming server 420 transmits multimedia data to the user. At this time, the content streaming system may include a separate control server, in which case the control server serves to control commands/responses between devices in the content streaming system.

The streaming server 420 may receive content from the media storage 440 and/or the encoding server 410. For example, the streaming server 420 may receive content in real time from the encoding server 410. In this case, in order to provide a smooth streaming service, the streaming server 420 may store the bitstream for a predetermined time.

For example, the user device 450 may include a mobile phone, a smart phone, a laptop computer, a terminal for digital broadcasting, a personal digital assistant PDA, a portable multimedia player PMP, a navigation terminal, a slate PC, a tablet PC, an ultrabook, a wearable device (for example, a smart watch, a smart glass, a head mounted display HMD, a digital TV, a desktop computer, and digital signage.

Each server in the content streaming system may operate as a distributed server, and in this case, data received from each server may be processed in a distributed manner.

FIG. 5 shows an example of an apparatus for processing a video signal according to an embodiment of the disclosure. The video signal processing apparatus may correspond to the encoding apparatus 100 of FIG. 1 or the decoding apparatus 200 of FIG. 2.

The video signal processing apparatus 500 which processes a video signal may include a memory 520 for storing a video signal, and a processor 510 for processing the video signal while being combined with the memory 520. The processor 510 according to an embodiment of the disclosure may be configured with at least one processing circuit for processing the video signal, and may process the video signal by executing instructions for encoding or decoding the video signal. That is, the processor 510 may encode the original video data or decode the encoded video signal by executing the encoding or decoding methods described below. The processor 510 may include one or more processors corresponding to each module of FIG. 2 or FIG. 3. The memory 520 may correspond to the memory 170 of FIG. 2 or the memory 250 of FIG. 3.

Partitioning Structure

A video/image coding method according to the present disclosure may be performed based on a partitioning structure to be described below. Specifically, procedures such as prediction, residual processing (e.g., (inverse) transform, (de)quantization), syntax element coding, and filtering may be performed a coding tree unit (CTU) and a CU (and/or TU or PU) derived based on the partitioning structure. A block partitioning procedure according to the present disclosure is performed by the image division unit 110 of the encoding apparatus 100 described above and partitioning related information may be processed (encoded) by the entropy encoding unit 190 and transferred to the decoding apparatus 200 in the form of a bitstream. The entropy decoding unit 210 of the decoding apparatus 200 may derive a block partitioning structure of the current block based on the partitioning related information obtained from the bitstream and perform a series of procedures (e.g., prediction, residual processing, block/picture reconstruction, in-loop filtering, etc.) for image decoding based on the derived block partitioning structure.

In coding a video/image according to an embodiment of the present disclosure, an image processing unit may have a hierarchical structure. One picture may be divided into one or more tiles or tile groups. One tile group may include one or more tiles. One tile may include one or more CTUs. The CTU may be partitioned into one or more CTUs. The tile is a rectangular region of CTUs within a particular tile column and a particular tile row in a picture. The tile group may include an integer number of tiles according to tile raster scan within the picture. A tile group header may transfer information/parameters which may be applied to the corresponding tile group. When the encoding apparatus 100/decoding apparatus 200 has a multi-core processor, an encoding/decoding procedure for the tile or tile group may be processed in parallel. Here, the tile group may have one type of tile groups including an intra (I) tile group, a predictive (P) tile group, and a bi-predictive (B) tile group. For prediction of blocks in the intra I tile group, inter prediction is not used, but only intra prediction may be used. Of course, even for the I tile group, an original sample value coded without prediction may be signaled. For blocks in the P tile group, the intra prediction or the inter prediction may be used, and when the inter prediction is used, only unidirectional prediction may be used. Meanwhile, for blocks in the B tile group, the intra prediction or the inter prediction may be used, and when the inter prediction is used, not only the unidirectional prediction but also bidirectional prediction may be used.

FIG. 6 illustrates an example of a partitioning structure of a picture according to an embodiment of the present disclosure. In FIG. 6, a picture having 216 (18 by 12) luminance CTUs is partitioned into 12 tiles and 3 tile groups.

An encoder may determine the tile/tile group and maximum and minimum coding unit sizes according to characteristics (e.g., resolution) of a video image or by considering efficiency of coding or parallel processing.

A decoder may obtain information indicating whether the tile/tile group of a current picture and the CTU in the tile are partitioned into multiple coding units. When the information is not continuously obtained (decoded) by the decoder, but obtained (decoded) only under a specific condition, the coding efficiency may be increased.

The tile group header (tile group header syntax) may include information/parameters which may be commonly applied to the tile group. APS (ASP syntax) or PPS (PPS syntax) may include information/parameters which may be commonly applied to one or more pictures. SPS (SPS syntax) may include information/parameters which may be commonly applied to one or more sequences. VPS (VPS syntax) may include information/parameters which may be commonly applied to an overall video. A higher-level syntax in the present disclosure may include at least one of the APS syntax, the PPS syntax, the SPS syntax, and the VPS syntax.

Further, for example, information on partitioning and construction of the tile/tile group may be constructed through the higher-level syntax by the encoder, and then transmitted to the decoder in the form of a bitstream.

FIGS. 7A to 7D illustrate an example of a block partitioning structure according to an embodiment of the present disclosure. FIGS. 7A, 7B, 7C, and 7D illustrate examples of block partitioning structures by quadtree (QT), binary tree (BT), ternary tree (TT), and asymmetric tree (AT), respectively.

In a video coding system, one block may be partitioned based on a QT partitioning scheme. Further, one subblock partitioned by the QT partitioning scheme may be further recursively partitioned according to the QT partitioning scheme. A leaf block which is not partitioned any longer by the QT partitioning scheme may be partitioned by at least one scheme of the BT, the TT, or the AT. The BT may have two types of partitionings such as horizontal BT (2N×N, 2N×N) and vertical BT (N×2N, N×2N). The TT may have two types of partitionings such as horizontal TT (2N×½N, 2N×N, 2N×½N) and vertical TT (½N×2N, N×2N, ½N× 2N). The AT may have four types of partitionings such as horizontal-up AT (2N×½N, 2N×³⁄₂N), horizontal-down AT (2N×³⁄₂N, 2N×½N), vertical-left AT (½N×2N, ³⁄₂N×2N), vertical-right AT (³⁄₂N×2N, ½N×2N). The BT, the TT, and the AT may be further partitioned recursively by using the BT, the TT, and the AT, respectively.

FIG. 7A illustrates an example of QT partitioning. Block A may be partitioned into four subblocks A0, A1, A2, and A3 by the QT. Subblock A1 may be partitioned into four subblocks B0, B1, B2, and B3 by the QT again.

FIG. 7B illustrates an example of the BT partitioning. Block B3 which is not partitioned any longer by the QT may be partitioned by vertical BT (C0, C1) or horizontal BT (D0, D1). Like block C0, each sub block may be further recursively partitioned like a form of horizontal BT (E0, E1) or vertical BT (F0, F1).

FIG. 7C illustrates an example of TT partitioning. Block B3 which is not partitioned any longer by the QT may be partitioned into vertical TT (C0, C1, C2) or horizontal TT (D0, D1, D2). Like block C1, each sub block may be further recursively partitioned like a form of horizontal TT (E0, E1, E2) or vertical TT (F0, F1, F2).

FIG. 7D illustrates an example of AT partitioning. Block B3 which is not partitioned any longer by the QT may be partitioned into vertical AT (C0, C1) or horizontal AT (D0, D1). Like block C1, each subblock may be further recursively partitioned like a form of horizontal AT (E0, E1) or vertical TT (F0, F1).

Meanwhile, the BT, TT, and AT partitionings may be simultaneously applied to one block. For example, the subblock partitioned by the BT may be partitioned by the TT or AT. Further, the subblock partitioned by the TT may be partitioned by the BT or AT. The subblock partitioned by the AT may be partitioned by the BT or TT. For example, after the horizontal BT partitioning, each subblock may be partitioned by the vertical BT. Further, after the vertical BT partitioning, each subblock may be partitioned by the horizontal BT. In this case, a partitioning order is different, but a final partitioning shape is the same.

Further, when the block is partitioned, an order of searching for the block may be variously defined. In general, searching may be performed from left to right and from top to bottom, and the searching for the block may mean an order of determining whether to further partition each portioned subblock, a coding order of each subblock when each subblock is no longer partitioned, or a search order when referring to information of another neighboring block in the subblock.

Further, virtual pipeline data units (VPDUs) may be defined for pipeline processing in the picture. The VPDUs may be defined as non-overlapping units in one picture. In a hardware decoder, successive VPDUs may be simultaneously processed by multiple pipeline stages. A VPDU size is roughly proportion to a buffer size in most pipeline stages. Accordingly, it is important to keep the VPDU size smaller when considering the buffer size in terms of hardware. In most hardware decoders, the VPDU size may be configured to be equal to a largest TB size. For example, the VPDU size may be a 64×64 (64×64 luminance samples) size. However, this is an example and the VPDU size may be changed (increased or decreased) by considering the above-described TT and/or BT partition. In this document, an M×N block may represents the block including samples constituted by M rows and N columns.

FIG. 8 illustrates an example of a case in which TT (Ternary Tree) and BT (Binary Tree) partitionings are limited according to an embodiment of the present disclosure. In order to keep the VPDU size to the size of the 64×64 luminance samples, at least one of the following restrictions may be applied as illustrated in FIG. 8.

TT split is not allowed for a CU with either width or height, or both width and height equal to 128.

For a 128×N CU with N<=64 (i.e. width equal to 128 and height smaller than 128), horizontal BT is not allowed.

For an N×128 CU with N<=64 (i.e., height equal to 128 and width smaller than 128), vertical BT is not allowed.

FIG. 9 is a block diagram illustrating entropy encoding according to an embodiment of the disclosure. The block diagram of FIG. 9 corresponds to an example of the entropy encoding unit 190 of FIG. 2.

Some or all of the video/image information may be entropy-encoded by the entropy encoding unit 190 as illustrated in FIG. 2, and some or all of the video/image information may be entropy-decoded by the entropy decoding unit 210 as described in FIG. 3. In this case, the video/image information may be encoded/decoded in units of syntax elements. Encoding/decoding information in the disclosure may include encoding/decoding by the method described in this paragraph.

FIG. 9 illustrates a block diagram of CABAC for encoding one syntax element. The encoding process of CABAC first converts the input signal into a binary value through binarization when the input signal is a non-binary value syntax element. If the input signal is a binary value, it is bypassed without binarization. Here, each binary number 0 or 1 constituting the binary value is called a bin. For example, if the binary string (bin string) after binarization is 110, each of 1, 1, and 0 is referred to as one bin. The bean(s) for one syntax element may indicate the value of the corresponding syntax element.

The binarized bins are input to a regular coding engine or a bypass coding engine. The regular coding engine may assign a context model reflecting a probability value to the bin and encodes the corresponding bean based on the assigned context model. After performing coding on each bin, the regular coding engine may update the probabilistic model for the corresponding bin. Bins coded in this way are called context-coded bins. The bypass coding engine omits a procedure of estimating the probability for the input bin and a procedure of updating the probabilistic model applied to the bin after coding. The coding speed is enhanced by coding the input bin by applying a uniform probability distribution (e.g., 50:50) instead of assigning contexts. Bins coded in this way are called bypass bins. The context model may be assigned and updated for each bin that is context coded (regularly coded), and the context model may be indicated based on ctxidx or ctxInc. ctxidx may be derived based on ctxInc. Specifically, e.g., the context index (ctxidx) indicating the context model for each of the regularly coded bins may be derived as the sum of the context index increment (ctxInc) and the context index offset (ctxIdxOffset). Here, ctxInc may be derived differently for each bin. ctxIdxOffset may be represented as the lowest value of ctxIdx. The minimum value of ctxIdx may be referred to as an initial value (initValue) of ctxIdx. ctxIdxOffset is a value generally used to distinguish from context models for other syntax elements, and a context model for one syntax element may be distinguished/derived based on ctxinc.

In the entropy encoding procedure, it may be determined whether encoding is performed through the regular coding engine or the encoding is performed through the bypass coding engine, and the coding paths may be switched. Entropy decoding performs the same process as entropy encoding in reverse order.

FIGS. 10A and 10B illustrate an entropy encoding method and related components according to an embodiment of the disclosure.

Referring to FIG. 10B, the encoding device 100 (entropy encoding unit 190) performs an entropy coding procedure on image/video information. The image/video information may include partitioning-related information, prediction-related information (e.g., inter/intra prediction distinguishing information, intra prediction mode information, inter prediction mode information), residual information, and in-loop filtering-related information, or various syntax elements related thereto. Entropy coding may be performed in units of syntax elements. Steps S1010 and S1020 of FIG. 10A may be performed by the entropy encoding unit 190 of the encoding device 100 of FIG. 2 described above.

The encoding device 100 performs binarization on the target syntax element (S1010). Here, binarization may be based on various binarization methods, such as truncated rice binarization process and fixed-length binarization process, and the binarization method for the target syntax element may be previously defined. The binarization procedure may be performed by the binarization unit 192 in the entropy encoding unit 190.

The encoding device 100 performs entropy encoding on the target syntax element (S1020). The encoding device 100 may encode the bin string of the target syntax element based on regular coding (context based) or bypass coding, based on an entropy coding technique, such as CABAC or CAVLC, and the output may be included in the bitstream. The entropy encoding procedure may be performed by the entropy encoding processing unit 193 in the entropy encoding unit 190. As described above, the bitstream may be transferred to the decoding device through a (digital) storage medium or network.

FIGS. 11A and 11B illustrate an entropy decoding method and related components according to an embodiment of the disclosure.

Referring to FIG. 11B, the decoding device 200 (entropy decoding unit 210) may decode encoded image/video information. The image/video information may include partitioning-related information, prediction-related information (e.g., inter/intra prediction distinguishing information, intra prediction mode information, inter prediction mode information), residual information, and in-loop filtering-related information, or various syntax elements related thereto. Entropy coding may be performed in units of syntax elements. Steps S1110 and S1120 may be performed by the entropy decoding unit 210 of the decoding device 200 of FIG. 3 described above.

The decoding device 200 performs binarization on the target syntax element (S1110). Binarization may be based on various binarization methods, such as truncated rice binarization process and fixed-length binarization process, and the binarization method for the target syntax element may be previously defined. The decoding device may derive available bin strings (bin string candidates) for available values of the target syntax element through a binarization procedure. The binarization procedure may be performed by the binarization unit 212 in the entropy decoding unit 210.

The decoding device 200 performs entropy decoding on the target syntax element (S1220). The decoding device 200 sequentially decodes and parses each bin for the target syntax element from the input bit(s) in the bitstream and compares the derived bin string with available bin strings for the corresponding syntax element. If the derived bin string is the same as one of the available bin strings, the value corresponding to the corresponding bin string is derived as the value of the corresponding syntax element. If not, the next bit in the bitstream is further parsed, and then the above-described procedure is performed again. Through this process, it is possible to signal the corresponding information using variable-length bits even without the start bit and end bit for specific information (specific syntax element) in the bitstream. Through this, relatively fewer bits may be allocated to a low value, and overall coding efficiency may be increased.

The decoding device 200 may decode each bin in the bin string from the bitstream, on a context basis or bypass basis, based on an entropy coding scheme, such as CABAC or CAVLC. The bitstream may include various information for video/image decoding as described above. As described above, the bitstream may be transferred to the decoding device through a (digital) storage medium or network.

Image/Video Coding Procedure

In image/video coding, a picture constructing the image/video may be encoded/decoded according to a series of decoding order. A picture order corresponding to an output order of a decoded picture may be configured differently fro the coding order, and not only forward prediction but also inverse prediction may be performed.

FIG. 12 illustrates an example of a flowchart for encoding a picture constructing a video signal according to an embodiment of the present disclosure. In FIG. 12, step S1210 may be performed by the predictors 180 and 185 of the encoding apparatus 100 described in FIG. 2, step S1220 may be performed by the residual processing units 115, 120, and 130, and step S1230 may be performed by the entropy encoder 190. Step S1210 may include an inter/intra prediction procedure described in the present disclosure, step S1220 may include a residual processing procedure described in the present disclosure, and step S1230 may include an information encoding procedure described in the present disclosure.

Referring to FIG. 12, a picture encoding procedure may schematically include a procedure of encoding information (e.g., prediction information, residual information, and partitioning information) and outputting the encoded information in the form of the bitstream as described in FIG. 2, and a procedure of generating a reconstructed picture for the current picture and a procedure (optional) of applying in-loop filtering to the reconstructed picture. The encoding apparatus 100 may derive (modified) residual samples from a transform coefficient quantized through the dequantizer 140 and the inverse transformer 150, and may generate the reconstructed picture based on prediction samples and the (modified) residual samples corresponding to the output in step S1210. The generated reconstructed picture may be the same as the reconstructed picture generated by the decoding apparatus 200. A modified reconstructed picture may be generated through an in-loop filtering procedure for the reconstructed picture, and may be stored in the memory 170 (DPB 175), and as in the case in the decoding apparatus 200, the modified reconstructed picture may be used as a reference picture in an inter prediction procedure during encoding the picture. As described above, in some cases, a part or the entirety of the in-loop filtering procedure may be omitted. When the in-loop filtering procedure is performed, (in-loop) filtering related information (parameter) may be encoded by the entropy encoder 190 and output in the form of the bitstream, and the decoding apparatus 200 may perform the in-loop filtering procedure in the same method as the encoding apparatus 100 based on filtering related information.

Through the in-loop filtering procedure, noise generated during video/moving picture coding may be reduced, such as a blocking artifact and a ringing artifact, and a subjective/objective visual quality may be improved. Further, both the encoding apparatus 100 and the decoding apparatus 200 perform the in-loop filtering procedure, and as a result, the encoding apparatus 100 and the decoding apparatus 200 may derive the same prediction procedure, and increase reliability of picture coding and reduce the amount of data transmitted for the picture coding.

FIG. 13 illustrates an example of a flowchart for decoding a picture constructing a video signal according to an embodiment of the present disclosure. Step S1310 may be performed by the entropy decoding unit 210 in the decoding apparatus 200 of FIG. 3, step S1320 may be performed by the predictors 260 and 265, step S1330 may be performed by the residual processing units 220 and 230, step S1340 may be performed by the addition unit 235, and step S1350 may be performed by the filter 240. Step S1310 may include the information decoding procedure described in the present disclosure, step S1320 may include the inter/intra prediction procedure described in the present disclosure, step S1330 may include the residual processing procedure described in the present disclosure, step S1340 may include the block/picture constructing procedure described in the present disclosure, and step S1350 may include the in-loop filtering procedure described in the present disclosure.

Referring to FIG. 13, the picture decoding procedure may schematically include an image/video information obtaining procedure (S1310) (through decoding) from the bitstream, a picture reconstructing procedure (S1320 to S1340), and an in-loop filtering procedure (S1350) for the reconstructed picture as described in FIG. 2. The picture reconstructing procedure may be performed based on the prediction samples and the residual samples obtained through the processes of the inter-intra prediction S1320 and the residual processing S1330 (dequantization and inverse transform for the quantized transform or coefficient) described in the present disclosure. The modified reconstructed picture may be generated through the in-loop filtering procedure for the reconstructed picture generated through the picture reconstructing procedure, and the modified reconstructed picture may be output as the decoded picture, and further, the modified reconstructed picture may be stored in the DPB 255 of the decoding apparatus 200 and used as the reference picture in the inter prediction procedure during decoding subsequent decoding of the picture. In some cases, the in-loop filtering procedure may be omitted, and in this case, the reconstructed picture may be output as the decoded picture, and further, the modified reconstructed picture may be stored in the DPB 255 of the decoding apparatus 200 and used as the reference picture in the inter prediction procedure during decoding subsequent decoding of the picture. The in-loop filtering procedure S1350 may include a deblocking filtering procedure, a sample adaptive offset (SAO) procedure, an adaptive loop filter (ALF) procedure, and/or a bi-lateral filter procedure, and some or all thereof may be omitted. Further, one or some of the deblocking filtering procedure, the SAO procedure, the ALF procedure, the bi-lateral filter procedure may be sequentially applied or all procedures may be sequentially applied. For example, after the deblocking filtering procedure is applied to the reconstructed picture, the SAO procedure may be performed. Further, for example, after the deblocking filtering procedure is applied to the reconstructed picture, the ALF procedure may be performed. This may be performed similarly even in the encoding apparatus 100.

As described above, the picture reconstructing procedure may be performed even in the encoding apparatus 100 in addition to the decoding apparatus 200. The reconstructed block may be generated based on the intra prediction/inter prediction in units of each block, and the reconstructed picture including the reconstructed blocks may be generated. When the current picture/slice tile group is the I picture/slice/tile group, blocks included in the current picture/slice/tile group may be reconstructed based on only the intra prediction. In this case, the inter prediction may be applied to some blocks in the current picture/slice/tile group, and the intra prediction may be applied to some remaining blocks. Color components of the picture may include a luma component and a chroma component, and when not explicitly limited in the present disclosure, methods and embodiments proposed in the present disclosure may be applied to the luma component and the chroma component.

Example of Coding Layer and Structure

FIG. 14 illustrates an example of a hierarchical structure for an encoded image according to an embodiment of the present disclosure.

A coded image may be divided into a video coding layer (VCL) that performs decoding processing of an image and handles the decoding processing, a lower system that transmits and stores coded information, and a network abstraction layer (NAL) which exists between the VCL and the lower system, and serves to perform a network adaptation function.

VCL data including image data (tile group data) compressed in the VCL, or a supplemental enhancement information (SEI) message additionally required may be generated in a decoding process of a parameter set including information such as a picture parameter set (PPS), a sequence parameter set (SPS), or a video parameter set (VPS), or an image.

In the NAL, header information (NAL unit data) is added to a raw byte sequence payload (RSRP) generated in the VCL to generate the NAL unit. In this case, the RSRP may be referred to as the tile group data, the parameter set, and the SEI message generated in the VCL. The NAL unit header may include NAL unit type information specified according to RSRP data included in the corresponding NAL unit.

As illustrated in FIG. 14, the NAL unit may be divided into a VCL NAL unit and a non-VCL NAL unit according to the RSRP generated in the VCL. The VCL NAL unit may mean a NAL unit including information (tile group data) on the information, and the non-VOL NAL unit may mean a NAL unit including information (parameter set or SEI message) required to decode the image.

The VCL NA unit and the non-VCL NAL unit may be transmitted through a network while header information is added according to a data specification. For example, the NAL unit may be converted into a data form of a predetermined specification, such as an H.266/VVC file format, a real-time transport protocol (RTP), and a transport stream (TS), and transmitted through various networks.

As described above, in respect to the NAL unit, an NAL unit type may be specified according to an RBSP data structure included in the corresponding NAL unit, and information on the NAL unit type may be stored in an NAL unit header and signaled.

For example, the NAL unit may be generally classified into a VCL NAL unit type and a non-VOL NAL unit type according to whether the NAL unit includes information (tile group data) on the image. The VCL NAL unit type may be classified according to a property and a type of picture included in the VCL NAL unit and the non-VOL NAL unit may be classified according to the type of parameter set.

The following is an example of the NAL unit type specified according to the type of parameter set included in the non-VCL NAL unit type.

Adaptation Parameter Set (APS) NAL unit: Type for the NAL unit including the APS Video Parameter Set (VPS) NAL unit: Type for the NAL unit including the VPS Sequence Parameter Set (SPS) NAL unit: Type for the NAL unit including the SPS Picture Parameter Set (PPS) NAL unit: Type for the NAL unit including the PPS The above-described NAL unit types may have syntax information for the NAL unit type and the syntax information may be stored in the NAL unit header and signaled. For example, the syntax information may be nal_unit_type and the NAL unit types may be specified by a value of nal_unit_type.

The tile group header (tile group header syntax) may include information/parameters which may be commonly applied to the tile group. APS (ASP syntax) or PPS (PPS syntax) may include information/parameters which may be commonly applied to one or more pictures. SPS (SPS syntax) may include information/parameters which may be commonly applied to one or more sequences. VPS (VPS syntax) may include information/parameters which may be commonly applied to an overall video. A higher-level syntax in the present disclosure may include at least one of the APS syntax, the PPS syntax, the SPS syntax, and the VPS syntax.

In the present disclosure, the image/video information encoded from the encoding apparatus 100 to the decoding apparatus 200 and signaled in the form of the bitstream may include intra-picture partitioning related information, intra/inter prediction information, residual information, and in-loop filtering information, and may include information included in the APS, information included in the PPS, information included in the SPS, and/or information included in the VPS.

Inter Prediction

Hereinafter, an inter prediction technique according to an embodiment of the present disclosure will be described. Inter prediction described below may be performed by the inter predictor 180 of the encoding apparatus 100 of FIG. 2 or the inter predictor 260 of the decoding apparatus 200 of FIG. 3. Further, according to an embodiment of the present disclosure, encoded data may be stored in the form of the bitstream.

The prediction unit of the encoding apparatus 100/decoding apparatus 200 may derive the prediction sample by performing the inter prediction in units of the block. Inter prediction can be a prediction derived in a manner that is de-pendent on data elements (e.g., sample values or motion information) of picture(s) other than the current picture. When the inter prediction is applied to the current block, a predicted block (prediction sample array) for the current block may be derived based on a reference block (reference sample array) specified by the motion vector on the reference picture indicated by the reference picture index. In this case, in order to reduce an amount of motion information transmitted in the inter-prediction mode, the motion information of the current block may be predicted in units of a block, a subblock, or a sample based on a correlation of the motion information between the neighboring block and the current block. The motion information may include the motion vector and the reference picture index. The motion information may further include inter-prediction type (L0 prediction, L1 prediction, Bi prediction, etc.) information. In the case of applying the inter prediction, the neighboring block may include a spatial neighboring block which is present in the current picture and a temporal neighboring block which is present in the reference picture. A reference picture including the reference block and a reference picture including the temporal neighboring block may be the same as each other or different from each other. The temporal neighboring block may be referred to as a name such as a collocated reference block, a collocated CU (colCU), etc., and the reference picture including the temporal neighboring block may be referred to as a collocated picture (colPic). For example, a motion information candidate list may be configured based on the neighboring blocks of the current block and a flag or index information indicating which candidate is selected (used) may be signaled in order to derive the motion vector and/or reference picture index of the current block. The inter prediction may be performed based on various prediction modes and for example, in the case of a skip mode and a merge mode, the motion information of the current block may be the same as the motion information of the selected neighboring block. In the case of the skip mode, the residual signal may not be transmitted unlike the merge mode. In the case of a motion vector prediction (MVP) mode, the motion vector of the selected neighboring block may be used as a motion vector predictor and a motion vector difference may be signaled. In this case, the motion vector of the current block may be derived by using a sum of the motion vector predictor and the motion vector difference.

FIGS. 15A and 15B show an video encoding method based on inter prediction and an inter prediction unit in an encoding apparatus according to an embodiment of the present specification.

The encoding apparatus 100 performs inter prediction on a current block (S1510). The encoding apparatus 100 may derive an inter prediction mode and motion information of a current block, and may generate the prediction samples of the current block. In this case, the inter prediction mode determination, motion information derivation and prediction sample generation procedure may be performed at the same time, and any one procedure may be performed prior to another procedure. For example, the inter predictor 180 of the encoding apparatus 100 may include a prediction mode determination unit 181, a motion information derivation unit 182, and a prediction sample derivation unit 183. The prediction mode determination unit 181 may determine a prediction mode for a current block. The motion information derivation unit 182 may derive motion information of the current block. The prediction sample derivation unit 183 may derive prediction samples of the current block. For example, the inter predictor 180 of the encoding apparatus 100 may search a given area (search area) of reference pictures for a block similar to a current block through motion estimation, and may derive a reference block having a minimum difference or a difference of a given reference or less with respect to the current block. The inter predictor 180 may derive a reference picture index indicating a reference picture in which a reference block is located based on the reference block, and may derive a motion vector based on a location difference between the reference block and the current block. The encoding apparatus 100 may determine a mode applied to the current block among various prediction modes. The encoding apparatus may compare rate-distortion (RD) costs for the various prediction modes, and may determine an optimal prediction mode for the current block.

For example, if a skip mode or merge mode is applied to the current block, the encoding apparatus 100 may configure a merge candidate list to be described later, and may derive a reference block having a minimum difference or a difference of a given reference or less with respect to the current block among reference blocks indicated by merge candidates included in a merge candidate list. In this case, a merge candidate associated with the derived reference block may be selected. Merge index information indicating the selected merge candidate may be generated and signaled to the decoding apparatus 200. Motion information of the current block may be derived using motion information of the selected merge candidate.

For another example, if an (A)MVP mode is applied to the current block, the encoding apparatus may configure an (A)MVP candidate list to be described later, and may use a motion vector of a motion vector predictor (mvp) candidate, selected among mvp candidates included in the (A)MVP candidate list, as the mvp of the current block. In this case, for example, a motion vector indicating the reference block derived by the motion estimation may be used as the motion vector of the current block. An mvp candidate including a motion vector having the smallest difference with respect to the motion vector of the current block, among the mvp candidates, may become the selected mvp candidate. A motion vector difference (MVD), that is, a difference obtained by subtracting the mvp from the motion vector of the current block, may be derived. In this case, information on the MVD may be signaled to the decoding apparatus 200. Furthermore, if an (A)MVP mode is applied, a value of the reference picture index may be configured as reference picture index information and may be separately signaled to the decoding apparatus.

The encoding apparatus 100 may derive residual samples based on the prediction samples (S1520). The encoding apparatus 100 may derive the residual samples through a comparison between the original samples of the current block and the prediction samples.

The encoding apparatus 100 encodes image information including prediction information and residual information (S1530). The encoding apparatus may output the encoded image information in a bitstream form. The prediction information may include information on prediction mode information (e.g., skip flag, merge flag or mode index) and motion information as information related to the prediction procedure. The information related to motion information may include candidate selection information (e.g., merge index, mvp flag or mvp index), that is, information for deriving a motion vector. Furthermore, the information related to motion information may include information on the MVD and/or reference picture index information. Furthermore, the information related to motion information may include information indicating whether L0 prediction, L1 prediction, or bi-prediction is applied. The residual information is information on the residual samples. The residual information may include information on quantized transform coefficients for the residual samples. The prediction mode information and the motion information may be collectively referred to as inter prediction information.

The output bitstream may be stored in a (digital) storage medium and transmitted to the decoding apparatus or may be transmitted to the decoding apparatus over a network.

Meanwhile, as described above, the encoding apparatus may generate a reconstructed picture (including reconstructed samples and reconstructed block) based on the reference samples and the residual samples. This is for deriving, in the encoding apparatus 100, the same prediction results as those performed in the decoding apparatus 200. Accordingly, coding efficiency can be improved. Accordingly, the encoding apparatus 100 may store the reconstructed picture (or reconstructed samples and reconstructed block) in the memory, and may use the reconstructed picture as a reference picture for inter prediction. As described above, an in-loop filtering procedure may be further applied to the reconstructed picture.

FIGS. 16A and 16B show an video decoding method based on inter prediction and an inter prediction unit in a decoding apparatus according to an embodiment of the present specification.

The decoding apparatus 200 may perform an operation corresponding to an operation performed in the encoding apparatus 100. The decoding apparatus 200 may perform prediction on a current block based on received prediction information, and may derive prediction samples.

Specifically, the decoding apparatus 200 may determine a prediction mode for the current block based on received prediction information (S1610). The decoding apparatus 200 may determine which inter prediction mode is applied to the current block based on prediction mode information within the prediction information.

For example, the decoding apparatus 200 may determine whether the merge mode or (A)MVP mode is applied to the current block based on the merge flag. Alternatively, the decoding apparatus 200 may select one of various inter prediction mode candidates based on the mode index. The inter prediction mode candidates may include a skip mode, a merge mode and/or an (A)MVP mode or may include various inter prediction modes to be described later.

The decoding apparatus 200 derives motion information of the current block based on the determined inter prediction mode (S1620). For example, if a skip mode or merge mode is applied to the current block, the decoding apparatus 200 may configure a merge candidate list to be described later and select one of merge candidates included in the merge candidate list. The selection of the merge candidate may be performed based on the merge index. Motion information of the current block may be derived from the motion information of the selected merge candidate. The motion information of the selected merge candidate may be used the motion information of the current block.

For another example, if an (A)MVP mode is applied to the current block, the decoding apparatus 200 may configure an (A)MVP candidate list to be described later, and may use a motion vector of a motion vector predictor (mvp) candidate, selected among mvp candidates included in the (A)MVP candidate list, as the mvp of the current block. The selection may be performed based on the selection information (mvp flag or mvp index). In this case, the decoding apparatus 200 may derive the MVD of the current block based on information on the MVD. The decoding apparatus may derive the motion vector of the current block based on the mvp of the current block and the MVD. Furthermore, the decoding apparatus may derive the reference picture index of the current block based on the reference picture index information. A picture indicated by the reference picture index within a reference picture list regarding the current block may be derived as a reference picture referred for the inter prediction of the current block.

Meanwhile, as will be described later, motion information of the current block may be derived without a candidate list configuration. In this case, motion information of the current block may be derived according to a procedure disclosed in a prediction mode to be described later. In this case, a candidate list configuration, such as that described above, may be omitted.

The decoding apparatus 200 may generate prediction samples for the current block based on the motion information of the current block (S1630). In this case, the decoding apparatus 200 may derive a reference picture based on the reference picture index of the current block, and may derive the prediction samples of the current block indicated on the reference picture by the motion vector of the current block. In this case, as will be described later, a prediction sample filtering procedure may be further performed on some of or all the prediction samples of the current block according to circumstances.

For example, the inter predictor 260 of the decoding apparatus 200 may include a prediction mode determination unit 261, a motion information derivation unit 262, and a prediction sample derivation unit 263. The decoding apparatus 200 may determine a prediction mode of the current block based on prediction mode information received from the prediction mode determination unit 261, may derive motion information (motion vector and/or the reference picture index) of the current block based on information related to motion information received from the motion information derivation unit 262. The prediction sample derivation unit 263 may derive the prediction samples of the current block.

The decoding apparatus 200 generates residual samples for the current block based on the received residual information (S1640). The decoding apparatus 200 may generate reconstructed samples for the current block based on the prediction samples and the residual samples, and may generate a reconstructed picture based on the reconstructed samples (S1650). Thereafter, as described above, an in-loop filtering procedure may be further applied to the reconstructed picture.

As described above, the inter prediction procedure may include an inter prediction mode determination step, a motion information derivation step according to a determined prediction mode, and a prediction execution (prediction sample generation) step based on derived motion information.

FIG. 17 illustrates an inter prediction procedure according to an embodiment of the disclosure.

As described above, the inter prediction procedure may include an inter prediction mode step (S1710), a step (S1720) of deriving motion information according to the determined prediction mode, and a step (S1730) of performing prediction (generating a prediction sample) based on the derived motion information. The inter prediction procedure may be performed by the encoding device 100 and the decoding device 200 as described above.

Derivation of Motion Information

The encoding apparatus 100 or the decoding apparatus 200 may perform inter prediction using motion information of a current block. The encoding apparatus 100 may derive optimal motion information for a current block according to a motion estimation procedure. For example, the encoding apparatus 100 may search a reference block having a similar correlation using the original block within the original picture for a current block in a fraction pixel unit within a determined search range within a reference picture. Accordingly, the encoding apparatus may derive motion information. The similarity of a block may be derived based on a difference between phase-based sample values. For example, the similarity of a block may be calculated based on a SAD (Sum of Absolute Difference) between a current block (or the template of the current block) and a reference block (or the template of the reference block). In this case, motion information may be derived based on a reference block having the smallest SAD within a search area. The derived motion information may be signaled to the decoding apparatus using several methods based on an inter prediction mode.

Merge Mode and Skip Mode

If a merge mode is applied, motion information of a current prediction block is not directly transmitted, and motion information of the current prediction block is derived using motion information of a neighboring prediction block. Accordingly, the encoding apparatus 100 may indicate the motion information of the current prediction block by transmitting flag information to notify that a merge mode has been used and a merge index to notify which neighboring prediction block has been used.

The encoding apparatus 100 should search a merge candidate block used to derive motion information of a current prediction block in order to perform a merge mode. For example, a maximum of up to 5 merge candidate blocks may be used, but the disclosure is not limited thereto. Furthermore, a maximum number of merge candidate blocks may be transmitted in a slice header, and the disclosure is not limited thereto. After searching merge candidate blocks, the encoding apparatus 100 may generate a merge candidate list, and may select a merge candidate block having the smallest cost, among the merge candidate blocks, as the final merge candidate block.

The merge candidate list may use 5 merge candidate blocks, for example. For example, 4 spatial merge candidates and 1 temporal merge candidate may be used.

FIG. 18 shows an example of spatial neighboring blocks used as spatial merge candidates according to an embodiment of the present specification.

Referring to FIG. 18, for prediction of a current block, at least one of a left neighboring block A1, a bottom-left neighboring block A0, a top-right neighboring block B0, an upper neighboring block B1, and a top-left neighboring block B2 may be used. The merge candidate list for the current block may be configured based on the procedure shown in FIG. 19.

FIG. 19 is a flowchart illustrating a method of configuring a merge candidate list according to an embodiment to which the disclosure is applied.

A coding apparatus (the encoding apparatus 100 or the decoding apparatus 200) searches spatial neighboring blocks of a current block and inserts derived spatial merge candidates into a merge candidate list (S1910). For example, the spatial neighboring blocks may include the bottom left corner neighboring block, left neighboring block, top right corner neighboring block, top neighboring block, and top left corner neighboring block of the current block. In this case, this is an example, and additional neighboring blocks, such as a right neighboring block, a bottom neighboring block, and a bottom right neighboring block, in addition to the spatial neighboring blocks may be further used as the spatial neighboring blocks. The coding apparatus may detect available blocks by searching the spatial neighboring blocks based on priority, and may derive motion information of the detected blocks as the spatial merge candidates. For example, the encoding apparatus 100 or the decoding apparatus 200 may search the 5 blocks illustrated in FIG. 11 in the sequence of A1, B1, B0, A0, and B2, and may configure a merge candidate list by sequentially indexing available candidates.

The coding apparatus searches a temporal neighboring block of the current block and inserts a derived temporal merge candidate into the merge candidate list (S1920). The temporal neighboring block may be located on a reference picture, that is, a picture different from a current picture in which the current block is located. A reference picture in which the temporal neighboring block is located may be called a co-located picture or a col-picture. The temporal neighboring block may be searched in the sequence of the bottom right corner neighboring block and bottom right center block of a co-located block for the current block on the col-picture. Meanwhile, if motion data compression is applied, specific motion information may be stored in the col-picture as representative motion information for each given storage unit. In this case, it is not necessary to store motion information for all blocks within the given storage unit, and thus a motion data compression effect can be obtained. In this case, the given storage unit may be predetermined as a 16×16 sample unit or an 8×8 sample unit, for example, or size information for the given storage unit may be signaled from the encoding apparatus 100 to the decoding apparatus 200. If the motion data compression is applied, motion information of the temporal neighboring block may be substituted with representative motion information of the given storage unit in which the temporal neighboring block is located. That is, in this case, in an implementation aspect, after an arithmetic right shift is performed by a given value based on the coordinates (top left sample position) of the temporal neighboring block not a prediction block in which the coordinates of the temporal neighboring block are located, the temporal merge candidate may be derived based on motion information of a prediction block that covers the arithmetic left-shifted location. For example, if the given storage unit is a 2n×2n sample unit, assuming that the coordinates of the temporal neighboring block are (xTnb, yTnb), motion information of a prediction block located in ((xTnb>>n)<<n), (yTnb>>n)<<n)), that is, a modified location, may be used for the temporal merge candidate. Specifically, for example, if the given storage unit is a 16×16 sample unit, assuming that the coordinates of the temporal neighboring block are (xTnb, yTnb), motion information of a prediction block located in ((xTnb>>4)<<4), (yTnb>>4)<<4)), that is, a modified location, may be used for the temporal merge candidate. Alternatively, for example, if the given storage unit is an 8×8 sample unit, assuming that the coordinates of the temporal neighboring block are (xTnb, yTnb), motion information of a prediction block located in ((xTnb>>3)<<3), (yTnb>>3)<<3)), that is, a modified location, may be used for the temporal merge candidate.

The coding apparatus may check whether the current number of merge candidates is smaller than a maximum number of merge candidates (S1930). The maximum number of merge candidates may be pre-defined or may be signaled from the encoding apparatus 100 to the decoding apparatus 200. For example, the encoding apparatus 100 may generate information on the maximum number of merge candidates, may encode the information, and may transmit the information to the decoding apparatus 200 in a bitstream form. If the maximum number of merge candidates is filled, a candidate addition process may not be performed.

If, as a result of the check, the current number of merge candidates is smaller than the maximum number of merge candidates, the coding apparatus inserts an added merge candidate into the merge candidate list (S1940). The added merge candidate may include an ATMVP (Adaptive Temporal Motion Vector Prediction), a combined bi-predictive merge candidate (if the slice type of a current slice is a B type) and/or a zero vector merge candidate, for example.

MVP Mode

FIG. 20 is an example of a flowchart for constructing a motion vector predictor (MVP) candidate list according to an embodiment of the present specification.

The MVP mode may be called as an advanced MVP or an adaptive MVP (AMVP). If the motion vector prediction (MVP) mode is applied, a motion vector predictor (mvp) candidate list may be generated based on a motion vector of a reconstructed spatial neighboring block (e.g., the neighboring block described in FIG. 18) and/or a motion vector corresponding to a temporal neighboring block (or Col block). That is, the motion vector of the reconstructed spatial neighboring block and/or the motion vector of the temporal neighboring block may be used as a motion vector predictor candidate. The information on prediction may include selection information (e.g., MVP flag or MVP index) indicating an optimal motion vector predictor candidate selected among motion vector predictor candidates included in the list. In this case, the predictor may select the motion vector predictor of a current block, among motion vector predictor candidates included in a motion vector candidate list, using the selection information. The predictor of the encoding apparatus 100 may calculate a motion vector difference (MVD) between the motion vector of the current block and the motion vector predictor, may encode the MVD, and may output the encoded MVD in a bitstream form. That is, the MVD may be calculated as a value obtained by subtracting the motion vector predictor from the motion vector of the current block. In this case, the predictor of the decoding apparatus may obtain a motion vector difference included in the information on prediction, and may derive the motion vector of the current block through the addition of the motion vector difference and the motion vector predictor. The predictor of the decoding apparatus may obtain or derive a reference picture index indicating a reference picture from the information on prediction. For example, a motion vector predictor candidate list may be configured as illustrated in FIG. 20.

Referring to FIG. 20, the coding apparatus searches for a spatial candidate block for motion vector prediction and inserts it into a prediction candidate list (S2010). For example, the coding apparatus may search for neighboring blocks according to a predetermined search order, and add information of the neighboring block satisfying the condition for the spatial candidate block to the prediction candidate list (MVP candidate list).

After constructing the spatial candidate block list, the coding apparatus compares the number of spatial candidates included in the prediction candidate list with a preset reference number (eg, 2) (S2020). If the number of the spatial candidates included in the prediction candidate list is greater than or equal to the reference number (eg, 2), the coding apparatus may end the construction of the prediction candidate list.

But if the number of spatial candidate lists included in the prediction candidate list is less than the reference number (eg, 2), the coding apparatus searches for a temporal candidate block and inserts it into the prediction candidate list (S2030), and when the temporal candidate block is unavailable, adds a zero motion vector to the prediction candidate list (S2040).

A predicted block for a current block may be derived based on the motion information derived according to a prediction mode. The predicted block may include prediction samples (prediction sample array) of the current block. When the motion vector of the current block indicates a fractional sample unit, an interpolation procedure may be performed, and through this prediction samples of the current block may be derived based on the reference samples in a fractional sample unit in a reference picture. When affine inter prediction is applied to the current block, prediction samples may be generated based on a motion vector in a sample/subblock unit. When bi-direction prediction is applied, final prediction samples may be derived through weighted (according to the phase) sums of prediction samples derived based on first direction prediction (eg, L0 prediction) and prediction samples derived based on second direction prediction. Reconstruction samples and reconstruction pictures may be generated based on the derived prediction samples, and as described above, a procedure such as in-loop filtering may be performed afterwards.

Meanwhile, when the MVP mode is applied, the reference picture index may be explicitly signaled. In this case, a reference picture index refidxL0 for L0 prediction and a reference picture index refidxL1 for L1 prediction may be individually signaled. For example, when the MVP mode is applied and bi-prediction is applied, both information on refidxL0 and information on refidxL1 may be signaled.

When the MVP mode is applied, information on MVD derived by the encoding apparatus 100 may be signaled to the decoding apparatus 200 as described above. The information on the MVD may include, for example, an MVD absolute value and information on x and y components for signs. In this case, whether the MVD absolute value is greater than 0 (abs_mvd_greater1_flag), whether the MVD absolute value is greater than 1, and information (abs_mvd_greater1_flag) indicating an MVD remainder may be signaled stepwise. For example, information (abs_mvd_greater1_flag) indicating whether the MVD absolute value is greater than 1 may be signaled only when a value of flag information (abs_mvd_greater0_flag) indicating whether the MVD absolute value is greater than 0 is 1.

Symmetric MVD (SMVD)

FIG. 21 illustrates an example of a case of applying a symmetric motion vector difference (MVD) mode according to an embodiment of the present disclosure.

Meanwhile, when the bi-prediction is applied, a symmetric MVD (SMVD) may also be used by considering the coding efficiency. In this case, signaling some of motion information may be omitted. For example, when the SMVD is applied to the current block, the information on refidxL0, the information on refidxL1, and the information on MVDL1 may not be signaled from the encoding apparatus 100 to the decoding apparatus 200, but may be internally derived. For example, when the MVP mode and the bi-prediction is applied to the current block, flag information (e.g., symmetric MVD flag information or sym_mvd_flag syntax element) indicating whether to apply the SMVD may be signaled and when a value of the flag information is 1, the decoding apparatus 200 may determine that the SMVD is applied to the current block.

When the SMVD mode is applied (i.e., when the value of the symmetric MVD flag information is 1), mvp_l0_lfag, mvp_l1_flag, and the information on mvp_l0_lfag, mvp_l1_flag, and MVD0 may be explicitly signaled, and while signaling of the information on refidxL0, the information on refidxL1, and the information on MVDL1 is omitted, the information on refidxL0, the information on refidxL1, and the information on MVDL1 may be derived inside the decoder as described above. For example, refidxL0 may be derived as an index indicating a previous reference picture closest to the current picture in a picture order count (POC) order within reference picture list 0 (may be referred to as List 0, L0, or first reference list). refidxL1 may be derived as an index indicating a subsequent reference picture closest to the current picture in the POC order within reference picture list 1 (may be referred to as List 1, L1, or second reference list). Further, for example, each of both refidxL0 and refidxL1 may be derived as 0. Further, for example, each of refidxL0 and refidxL1 may be derived as a minimum index having the same POC difference in a relation with the current picture. As a more specific example, when it is assumed that [POC of current picture]−[POC of first reference picture indicated by refidxL0] is referred to as a first POC difference and when [POC of current picture]−[POC of second reference picture indicated by refidxL1] is referred to as a second POC difference, a value of refidxL0 indicating the first reference picture may be derived as a value of refidxL0 of the current block and a value of refidxL1 indicating the second reference picture may be derived as a value of refidxL1 of the current block only if the first POC difference and the second POC difference are equal to each other. Further, for example, when is a plurality of sets in which the first POC difference and the second POC difference are equal to each other, refidxL0 and refidxL1 of a set in which the difference is smallest among the plurality of sets may be derived as refidxL0 and refidxL1 of the current block.

MVDL1 may be derived as −MVDL0. For example, a final MV for the current block may be derived as in Equation 1 below.

$$\begin{cases} (mvx_0, mvy_0) = (mvpx_0 + mvdx_0, mvpy_0 + mvdy_0) \\ (mvx_1, mvy_1) = (mvpx_1 - mvdx_0, mvpy_1 - mvdy_0) \end{cases} \quad \text{[Equation 1]}$$

In Equation 1, mvx0 and mvy0 represent x and y components of an L0-direction motion vector for the current block, and mvx1 and mvy1 represent x and y components of a motion vector for L0-direction prediction for the current block, and represent x and y components of a motion vector for L1-directin prediction. mvp0 and mvp0 represent a motion vector (L0 base motion vector) of the MVP for the L0-direction prediction and mvp1 and mvp1 represent a motion vector (L1 base motion vector) of the MVP for the L1-direction prediction. mvd0 and mvd0 represent x and y components of the MVD for the L0-direction prediction. According to Equation 1, the MVD for the L1-direction prediction has the same value as L0 MVD, but has an opposite sign to the L0 MVD.

Affine Mode

The legacy video coding system uses one motion vector in order to express a motion of a coding block (uses a translation motion model). However, in a method for using one motion vector, a best motion may be expressed in units of the block, but the corresponding motion is not actually a best motion for each pixel, and as a result, if a best motion vector is determined in units of the pixel, the coding efficiency may be increased. To this end, in the embodiment, a method of affine motion prediction performing encoding/decoding by using an affine motion model is described. In the affine motion prediction method, the motion vector may be expressed in each pixel unit of the block by using 2, 3, or 4 motion vectors.

FIG. 22 illustrates an example of affine motion models according to an embodiment of the present disclosure.

The affine motion model may express 4 motions as illustrated in FIG. 22. An affine motion model expressing 3 motions (translation, scale, and rotate) among motions which may be expressed by the affine motion model is referred to as a similar (or simplified) affine motion model, and in the present disclosure, methods proposed based on the similar (or simplified) affine motion model are described. However, the embodiment of the present disclosure is not limited to the similar (or simplified) affine motion model.

FIGS. 23A and 23B illustrate an example of a motion vector for each control point according to an embodiment of the present disclosure.

As illustrated in FIGS. 23A and 23B, in the affine motion prediction, the motion vector may be determined for each pixel position included in the block by using two or more control point motion vectors (CPMVs).

In respect to a 4-parameter affine motion model (FIG. 23A), a motion vector at a sample position (x, y) may be derived as in Equation 2 below.

$$\begin{cases} mv_x = \dfrac{mv_{1x} - mv_{0x}}{W}x + \dfrac{mv_{1y} - mv_{0y}}{W}y + mv_{0x} \\ mv_y = \dfrac{mv_{1y} - mv_{0y}}{W}x + \dfrac{mv_{1y} - mv_{0x}}{W}y + mv_{0y} \end{cases} \quad \text{[Equation 2]}$$

In respect to a 6-parameter affine motion model (FIG. 21B), the motion vector at the sample position (x, y) may be derived as in Equation 3 below.

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases} \quad \text{[Equation 3]}$$

Here, {v0x, v0y} represents CPMV of CP at a top-left corner position of the coding block, {v1x, v1y} represents CPMV of CP at a top-right corner position of, and {v2x, v2y} represents CPMV of CP at a bottom-left corner position. In addition, W correspond to a width of the current block, H corresponds to a height of the current block, and {vx, vy} represents a motion vector at the {x, y} position.

FIG. 24 illustrates an example of a motion vector for each subblock according to an embodiment of the present disclosure.

During the encoding/decoding process, an affine motion vector field (MVF) may be determined in a pixel unit or a predefined subblock unit. When the MVF is determined in the pixel unit, the motion vector may be obtained based on each pixel value and when the MVP is determined in the subblock unit, the motion vector of the corresponding block may be obtained based on a pixel value of a center (a center bottom-right side, i.e., a bottom-right sample among four center samples) of the subblock. In the following description, the description is made by assuming a case where the affine MVF is determined in a 4*4 subblock unit. However, this is just for convenience of the description, and a size of the subblock may be variously modified.

That is, when the affine prediction is valid, a motion model applicable to the current block may include three following motion models. Translational motion model, 4-parameter affine motion model, and 6-parameter affine motion model. Here, the translational motion model may represent a model in which a legacy block-unit motion vector is used, the 4-parameter affine motion model may represent a model in which two CPMVs are used, and the 6-parameter affine motion model may represent a model in which three CPMVs are used.

The affine motion prediction may include an affine MVP (or affine inter) mode and an affine merge. In the affine motion prediction, motion vectors of the current block may be derived in the sample unit or subblock unit.

Affine Merge

In the affine merge mode, the CPMV may be determined according to the affine motion model of a neighboring block coded by the affine motion prediction. In the search order, an affine coded neighboring block may be used for the affine merge mode. When one or more neighboring blocks are coded by the affine motion prediction, the current block may be coded as AF_MERGE. That is, when the affine merge mode is applied, the CPMVs of the current block may be derived by using the CPMVs of the neighboring block. In this case, the CPMVs of the neighboring block may be used as the CPMVs of the current block as they are, and the CPMVs of the neighboring block are modified based on the size of the neighboring block and the size of the current block to be used as the CPMVs of the current block.

When the affine merge mode is applied, an affine merge candidate list may be constructed in order to derive the CPMVs of the current block. The affine merge candidate list may include, for example, at least one of the following candidates.

1) Inherited affine candidates
2) Constructed affine candidates
3) Zero MV candidate Here, when the neighboring block is coded in the affine mode, the inherited affine candidates may be candidates derived based on the CPMVs of the neighboring block, the constructed affine candidates may be candidates derived by constructing CPMVs based on an MV of a corresponding CP neighboring block in each CPMV unit, and the zero MV candidate may represent a candidate constituted by CPMVs having a value of 0.

FIG. 25 illustrates an example of a flowchart constructing an affine merge candidate list according to an embodiment of the present disclosure.

Referring to FIG. 25, a coding device (encoding apparatus or decoding apparatus) may insert inherited affine candidates into a candidate list (S2510), insert constructed affine candidates into an affine candidate list (S2520), and insert a zero MV candidate into the affine candidate list (S2530). In an embodiment, the coding device may insert the constructed affine candidates or the zero MV candidate when the number of candidates included in the candidate list is smaller than a reference number (e.g., 2).

FIG. 26 illustrates an example of blocks for deriving an inherited affine motion predictor according to an embodiment of the present disclosure and FIG. 27 illustrates an example of control point motion vectors for deriving an inherited affine motion predictor according to an embodiment of the present disclosure.

There may be up to 2 (one from a left neighbour CU and one of top neighbour CUs) inherited affine candidates, and the inherited affine candidates may be derived from an affine motion model of neighboring blocks. In FIG. 24, candidate blocks are illustrated. A scan order for a left predictor is A0-A1 and a scan order for a top predictor is B0-B1-B2. Only first inherited candidates from each lateral surface are selected. Pruning check may not be performed between two inherited candidates. When a neighbour affine CU is identified, control point motion vectors of the neighbour affine CU may be used for deriving a control point motion vector predictor (CPMVP) from an affine merge list of a current CU. As illustrated in FIG. 25, if left neighboring block A is coded in the affine mode, v2, v3, and v4 of a top-left corner, a top-right corner, and a left-bottom corner of the motion vectors of a CU including block A are used. When block A is coded as the 4-parameter affine model, two CPMVs of the current CU are calculated according to v2 and v3. When block A is coded by the 6-parameter affine model, three CPMVs of the current CU are calculated according to v2, v3, and v4.

FIG. 28 illustrates an example of blocks for deriving a constructed affine merge candidate according to an embodiment of the present disclosure.

A constructed affine merge means a candidate constructed by combining neighboring translational motion information for each control point. As illustrated in FIG. 26, motion information for control points is derived from specified spatial neighbors and temporal neighbors. CPMVk (k=1, 2, 3, 4) represents a k-th control point. In respect to top-left corner CPMV1 (CP0), blocks are checked in an order of B2-B3-A2 and an MV of a first valid block is used. In respect to top-right corner CPMV2 (CP1), blocks are checked in an order of B1-B0 and in respect to bottom-left corner CMPV3 (CP2), blocks are checked in an order of A1-A0. If valid, the TMVP is used in respect to bottom-right corner CPMV4 (CP3).

When MVs of 4 control points are obtained, the affine merge candidates are constructed based on the motion information. Combinations of control point MVs below are used in order.

{CPMV1, CPMV2, CPMV3}, {CPMV1, CPMV2, CPMV4}, {CPMV1, CPMV3, CPMV4},

{CPMV2, CPMV3, CPMV4}, {CPMV1, CPMV2}, {CPMV1, CPMV3}

Combinations of 3 CPMVs constitute the 6-parameter affine merge candidate and a combination of 2 CPMVs constitutes the 4-parameter affine merge candidate. In order to avoid a motion scaling process, if reference indices of control points are different, a combination of related control point MVs is discarded.

Affine MVP

FIG. 29 illustrates an example of a flowchart constructing an affine MVP candidate list according to an embodiment of the present disclosure.

In the affine MVP mode, after two or more control point motion vector predictions (CPMVPs) and CPMVs for the current block are determined, a control point motion vector difference (CPMVD) corresponding to a difference value is transmitted from the encoding apparatus 100 to the decoding apparatus 200.

When the affine MVP mode is applied, the affine MVP candidate list may be constructed in order to derive the CPMVs for the current block. For example, the affine MVP candidate list may include at least one of the following candidates. For example, the affine MVP candidate list may include up to n (e.g., 2) candidates.

1) Inherited affine MVP candidates that are extrapolated from the CPMVs of the neighbour CUs (S2910)

2) Constructed affine MVP candidates CPMVPs that are derived using the translational MVs of the neighbour CUs (S2920)

3) Additional candidates based on Translational MVs from neighboring CUs (S2930)

4) Zero MVs candidate (S2940)

Here, when the neighboring block is coded in the affine mode, the inherited affine candidate may be a candidate derived based on the CPMVs of the neighboring block, the constructed affine candidate may be a candidate derived by constructing the CPMVs based on an MV of a corresponding CP neighboring block in each CPMV unit, and the zero MV candidate may represent a candidate constituted by CPMVs having a value of 0. When a maximum candidate number for the affine MVP candidate list is 2, candidates below clause 2) in the above order may be considered and added in respect to a case where the number of current candidates is less than 2. Further, additional candidates based on Translational MVs from neighboring CUs may be derived in the following order.

1) If the candidate number is less than 2 and CPMV0 of a constructed candidate is valid, CPMV0 is used as the affine MVP candidate. That is, all MVs of CP0, CP1, and CP2 are configured to be the same as CPMV0 of the constructed candidate.

2) If the candidate number is less than 2 and CPMV1 of the constructed candidate is valid, CPMV1 is used as the affine MVP candidate. That is, all MVs of CP0, CP1, and CP2 are configured to be the same as CPMV1 of the constructed candidate.

3) If the candidate number is less than 2 and CPMV2 of a constructed candidate is valid, CPMV2 is used as the affine MVP candidate. That is, all MVs of CP0, CP1, and CP2 are configured to be the same as CPMV2 of the constructed candidate.

4) If the candidate number is less than 2, a temporal motion vector predictor (TMVP or mvCol) is used as the affine MVP candidate.

The affine MVP candidate list may be derived by a procedure shown in FIG. 29.

A checking order of the inherited MVP candidates is the same as the checking order of the inherited affine merge candidates. A difference is that in respect to, only an affine CU having the same reference picture as the current block is considered. When the inherited affine motion predictor is added to the candidate list, a pruning process is not applied.

The constructed MVP candidate is derived from the neighboring blocks illustrated in FIG. 28. The same checking order as the affine merge candidate is used. Further, the reference picture index of the neighboring block is also checked. A first block is used, which is inter-coded in the checking order and has the same reference picture as the current CU.

SbTMVP (Subblock-Based Temporal Motion Vector Prediction)

FIGS. 30A and 30B illustrate examples of spatial neighboring blocks used in adaptive temporal motion vector prediction (ATMVP) and a sub-coding block (CU) motion field derived from spatial neighboring blocks according to an embodiment of the disclosure.

A subblock-based temporal motion vector prediction (SbTMVP) method may be used. Similar to temporal motion vector prediction (TMVP), SbTMVP may use the motion field in the co-located picture to enhance the motion vector predictor and merge mode for CUs in the current picture. The same co-located picture used by TMVP is used for SbTMVP. SbTMVP differs from TMVP in the following two aspects.

1. TMVP predicts motion at the CU level, whereas SbTMVP predicts motion at the subCU level.

2. TMVP brings the temporal motion vector from the co-located block in each co-located picture (where the co-located block is the lower-right or center block with respect to the current CU), whereas SbTMVP applies motion shift before bringing the temporal motion information from the co-located picture. Here, the motion shift is obtained from the motion vector from one of the spatial neighboring blocks of the current CU.

The SbTMVP process is illustrated in FIGS. 30A and 30B. SbTMVP predicts motion vectors of subCUs in the current CU in two steps. In the first step, the spatial neighbors in FIG. 30a are checked in the order of A1, B1, B0, and A0. (As soon as and the first spatial neighboring block that has a motion vector that uses the collocated picture as its reference picture is identified, this motion vector is selected to be the motion shift to be applied). (As soon as and the first spatial neighboring block that has a motion vector that uses the collocated picture as its reference picture is identified, this motion vector is selected to be the motion shift to be applied). If no such motion is identified from spatial neighbors, the motion shift is set to (0, 0).

In the second step, the motion shift identified in the first step is applied (i.e., added to the coordinates of the current block) to obtain subCU level motion information (motion vectors and reference indices) from the co-located picture as illustrated in FIG. 30B. The example in FIG. 30B assumes that the motion shift is set to the motion of block A1. Then, for each subCU, the motion information for the corresponding block (the smallest motion grid covering the center sample) in the co-located picture is used to derive the motion information for the subCU. After the motion information for the co-located subCU is identified, it is converted into reference indices and motion vectors of the current subCU in a scheme similar to the TMVP process. Here, temporal motion scaling is applied so that the reference pictures of the temporal motion vectors are aligned to the temporal motion vectors of the current CU.

The combined subblock-based merge list including the SbTMVP candidate and the affine merge candidates may be used for signaling of an affine merge mode (which may be referred to as a subblock-based merge mode). The SbTMVP mode may be activated/deactivated by a sequence parameter set (SPS). When the SbTMVP mode is activated, the SbTMVP predictor may be added as a first entry in the list of subblock-based merge candidates, and affine merge candidates are added later. The maximum allowed size of the affine merge candidate list may be 5.

The subCU size used in SbTMVP may be fixed to 8×8, and it is also the same for the affine merge mode, and the SbTMVP mode may only be applied to CUs with both width and height greater than or equal to 8.

The encoding logic of the additional SbTMVP merge candidate is the same as that of other merge candidates. That is, for each CU in the P or B slice, an additional rate-distortion (RD) check is performed to determine whether to use the SbTMVP candidate.

Adaptive Motion Vector Resolution (AMVR)

In the related art, when use_integer_mv_flag is 0 in a slice header, a motion vector difference (MVD) (between a predicted motion vector and a motion vector of the CU) may be signaled in units of a quarter-luma-sample. In the present disclosure a CU-level AMVR scheme is introduced. The AMVR may allow the MVD of the CU to be coded in units of the quarter-luma-sample, integer-luma-sample, or 4-luma-sample. In order for the current CT to have at least one non-zero MVD component, a CU-level MVD resolution indication is conditionally signaled. When all MVD components (i.e., horizontal and vertical MVDs for reference list L0 and reference list L1) are 0, a quarter-luma-sample MVD resolution is inferred.

In respect to a CU having at least one non-zero MVD component, a first flag is signaled to determine whether quarter-luma-sample MVD accuracy is applied to the CU. If the first flag is 0, additional signaling is not required and the quarter-luma-sample MVD accuracy is used for the current CU. Otherwise, a second flag is signaled to indicate whether integer-luma-sample or 4-luma-sample MVD accuracy is used. In order for a reconstructed MV to guarantee intended accuracy (quarter-luma-sample, integer-luma-sample, or 4-luma-sample), motion vector predictors for the CU may be rounded to have the same accuracy as a motion vector predictor previously added together with the MVD. The motion vector predictors may be rounded to 0 (that is, a negative motion vector predictor is rounded to a positive infinity and a positive motion vector predictor is rounded to a negative infinity). The encoder determines a motion vector resolution for the current CU by using an RD check. In order to avoid continuously performing three CU-level RD checks for each MVD resolution, the RD check of the 4-luma-sample MVD resolution may be conditionally called. An RD cost of the quarter-sample MVD accuracy is first calculated. Then, in order to determine whether checking the RD cost of the 4-luma-sample MVD accuracy is required, the RD cost of the integer-luma-sample MVD accuracy is compared with the RD cost of the quarter-luma-sample MVD accuracy. When the RD cost of the quarter-luma-sample MVD accuracy is smaller than the RD cost of the integer-luma-sample MVD accuracy, the RD cost of the 4-sample MVD accuracy is omitted.

Motion Field Storage

For reduction of a memory load, motion information of a reference picture which is previously decoded may be stored in unit of a predetermined region. This may be referred to as temporal motion field storage, motion field compression, or motion data compression. In this case, a storage unit may be differently set according to whether the affine mode is applied. In this case, among explicitly signaled motion vectors, a motion vector having highest accuracy is the quarter-luma-sample. In some inter prediction modes such as the affine mode, the motion vectors are derived in 1/16th-luma-sample accuracy and motion-compensated prediction is performed 1/16th sample accuracy. In terms of internal motion field storage, all motion vectors are stored in the 1/16th-luma-sample accuracy.

In the present disclosure, for storing a temporal motion field used by the TMVP and the ATMVP, motion field compression is performed in 8×8 granularity.

History-Based Merge Candidate Derivation

A history-based MVP (HMVP) merge candidate may be added to a merge list after the spatial MVP and the TMVP. In this method, the motion information of the previously coded block is stored in a table and used as the MVP for the current CU. A table constituted by multiple HVMP candidates is maintained during the encoding/decoding process. When a new CTU row is used, the table is reset (empty). When there is a CU coded by the inter prediction other than the subblock, related motion information is added to a last entry of the table as a new HMVP candidate.

In an embodiment, an HVMP table size S is set to 6, and this means that up to 6 HVMP candidates may be added to the table. When a new motion candidate is inserted into the table, a constrained first-in-first-out (FIFO) rule is used. Here, redundancy checking for checking whether the same HVMP candidate as the HVMP candidate to be added exists in the table is first performed. When the same HVMP candidate exists, the existing same MVVP candidate is removed form the table and all HMVP candidates move to a previous order.

The HMVP candidates may be used in a merge candidate list construction process. In the table, most recent HVMP candidates are checked and inserted into the merge candidate list in a subsequent order of the TMVP candidate. Checking the redundancy for the HMVP candidate is applied to the spatial or temporal merge candidate.

In order to reduce the number of performed redundancy checking operations, the following simplification methods may be used.

1) The number of HMVP candidates for generating the merge list is set to (N<=4) ? M: (8−N). Here, N represents the number of candidates which exist in the merge list and M represents the number of HMVP candidates valid in the table.

2) When the total number of valid merge candidates reaches a value obtained by subtracting 1 from the maximum number of allowed merge candidates, the merge candidate list construction process from the HVMP is terminated.

Pair-Wise Average Merge Candidates Derivation

Pair-wise average candidates are generated by an average of predefined pairs of the candidates which exist in the merge candidate list. Here, the predefined pairs are defined as {(0, 1), (0, 2), (1, 2), (0, 3), (1, 3), (2, 3)}, and numbers such as 0, 1, 2, and 3 are merge indices in the merge candidate list. An average of the motion vectors is individually calculated for each reference list. When both two motion vectors are valid in one list, an average value of two motion vectors is used even though two motion vectors are related to different reference pictures. If only one motion vector is valid, the valid motion vector is immediately used. When there is no valid motion vector, the list is maintained invalid.

When the merge list is not filled even after the pair-wise average merge candidate, zero MVs are inserted until the number of zero MVs reaches the maximum merge candidate number.

Prediction Sample Generation

A predicted block for the current block may be derived based on the motion information derived according to the prediction mode. The predicted block may include prediction samples (prediction sample array) of the current block. When the motion vector of the current block indicates a fractional sample unit, an interpolation procedure may be performed. The prediction samples of the current block may be derived from the reference samples of the fractional sample unit within the reference picture through the interpolation procedure. When the affine inter prediction is applied to the current block, the prediction samples may be generated based on a sample/subblock-unit motion vector. When the bi-prediction is applied, prediction samples derived through a weighted sum or a weighted average of prediction samples derived based on the L0-direction prediction (i.e., a prediction using reference pictures in the L0 reference picture list and the L0 motion vector) and prediction samples (according to a phase) derived based on the L1 prediction (i.e., a prediction using reference pictures in the L1 reference picture list and the L1 motion vector) may be used as the prediction samples of the current block. When the bi-prediction is applied, if the reference picture used for the L0 prediction and the reference picture used for the L1 prediction are located in different temporal directions based on the current picture (i.e., if the prediction corresponds to the bi-prediction and the bi-directional prediction), this may be referred to as a true bi-prediction.

Reconstruction samples and reconstruction pictures may be generated based on the derived prediction samples and thereafter, the procedure such as in-loop filtering, etc., may be performed as described above.

Bi-Prediction with Weighted Average (BWA)

As described above, according to the present disclosure, when the bi-prediction is applied to the current block, the prediction sample may be derived based on the weighted average. A bi-prediction signal (i.e., bi-prediction samples) may be derived through a simple average or a weighted average of the L0 prediction signal (L0 prediction samples) and the L1 prediction signal (L1 prediction samples). When the prediction sample derivation by the simple average is applied, the bi-prediction samples may be derived as average values of the L0 prediction samples based on the L0 reference picture and the L0 motion vector and the L1 prediction samples based on the L1 reference picture and the L1 motion vector. According to an embodiment of the present disclosure, when the bi-prediction is applied, the bi-prediction signal (bi-prediction samples) may be derived through the weighted average of the L0 prediction signal and the L1 prediction signal as shown in Equation 4 below.

$$P_{bi\text{-}pred}((8-w)*P_0+w*P_1+4)>>3 \quad \text{[Equation 4]}$$

In Equation 4, Pbi-pred represents a bi-prediction sample value, L0 represents an L0 prediction sample value, P1 represents an L0 prediction sample value, and w represents a weight value.

In the weighed average bi-prediction, 5 weight values w may be allowed, and the weight values w may be −2, 3, 4, 5, and 10. For each CU to which the bi-prediction is applied, the weight w may be determined by one of two methods.

1) For a non-merge CU, the weight index is signaled after the MVD.
2) For the merge CU, the weight index is inferred from the neighboring blocks based on the merge candidate index.

Weighted sum bi-prediction may just be applied only to CUs (CUs in which a multiplication of a CU width and a CU height is equal to or greater than 256) having 256 or more luminance samples. For low-delay pictures, all of 5 weights may be used. For non-low-delay pictures, only 3 weights (3, 4, and 5) may be used.

1) In the encoder, a fast search algorithm is applied in order to find the weight index without significant increase in encoder complexity. The algorithms are summarized as follows. When being coupled to the AMVR, if the current picture is the low-delay picture, only unequal weights are conditionally checked for 1-pel and 4-pel motion vector accuracy.
b) When being coupled to the affine, if the affine mode is selected as a current best mode, affine motion estimation (ME) will be performed for the unequal weights.
c) When two reference pictures are equal in the bi-prediction, only the unequal weights are conditionally checked.
e) According to a POC distance between the current picture and the reference pictures, a coding quantization parameter (QP), and a temporal level, when a specific condition is not satisfied, the unequal weights are not searched.

Combined Inter and Intra Prediction (CIIP)

The CIIP may be applied to the current CU. For example, when the CU is coded in the merge mode, if the CU includes at least 64 luminance samples (if the multiplication of the CU width and the CU height is equal to or greater than 64), an additional flag may be signaled to indicate whether the CIIP mode is applied to the current CU. The CIIP mode may also be referred to as a multi-hypothesis mode or an inter/intra multi-hypothesis mode.

Intra Prediction Mode Derivation

Up to 4 intra prediction modes including DC, PLANAR, HORIZONTAL, and VERTICAL modes may be used for predicting a luma component in the CIIP mode. When a CU shape is very wide (e.g., when the width is twice or more greater than the height), a HORIZONTAL mode is not allowed. When a CU shape is very narrow (e.g., when the width is twice or more greater than the height), a VERTICAL mode is not allowed. For this cases, three intra prediction modes are allowed.

In the CIIP mode, 3 most probable modes (MPMs) are used for the intra prediction. A CIIP MPM candidate list is formed as followed.

Left and top neighbor blocks are configured to A and B, respectively.
Prediction modes of block A and block B are referred to as intraModeA and intraModeB, respectively, and are derived as below.
X is configured to A or B.
If i) block X is invalid, ii) block X is not predicted by using the CIIP mode, or iii) block B is located outside the current CTU, intraModeX is configured to DC.
Otherwise, i) if the intra prediction mode of block X is DC or PLANAR, intraModeX is configured to DC or PLANAR, ii) if the intra prediction mode of block X is a "vertical-like" directional mode (a mode which is greater than 34), intraModeX is configured to VERTI- CAL, or iii) if the intra prediction mode of block X is a "horizontal-like" directional mode (a mode which is equal to or smaller than 34), intraModeX is configured to HORIZONTAL.

If intraModeA is equal to intraModeB,
If intraModeA is PLANAR or DC, 3 MPSs are configured in the order of {PLANAR, DC, VERTICAL}.
Otherwise, 3 MPSs may be configured in the order of {intraModeA, PLANAR, DC}.
Otherwise (if intraModeA is not equal to intraModeB),
Other wise, 2 MPSs may be configured in the order of {intraModeA, PLANAR, DC}.
Uniqueness (redundancy) of PLANAR, DC, and VERTICAL is checked first two MPM candidates, and when a unique (non-redundant) mode is discovered, the unique mode is added as a third MPM.

If the CU shape is very wide or very narrow, the MPM flag is inferred as 1 without signaling. Otherwise, an MPM flag for indicating whether the CIIP intra prediction mode is one of CIIP MPM candidate modes is signaled.

If the MPM flag is 1, an MPM index for indicating which one of the MPM candidate modes is used for the CIIP intra prediction may be additionally signaled. Otherwise, if the MPM flag is 0, the intra prediction mode is configured to a "missing" mode in the MPM candidate list. For example, if the PLANAR MODE does not exist in the MPM candidate list, the PLANAR becomes the missing mode and the intra prediction mode is configured to PLANAR. Since 4 valid intra prediction modes are allowed in the CIIP, the MPM candidate list includes only 3 intra prediction candidates. For the chroma components, a DM mode is continuously applied without additional signaling. That is, the same prediction mode as the luma component is used in the chroma components. The intra prediction mode of the CU coded in the CIIP will be stored and used for intra mode coding of the neighboring CUs.

Combining the Inter and Intra Prediction Signals

An inter prediction signal Pinter in the CIIP mode is derived by using the same inter prediction process applied to a general merge mode and an intra prediction signal Pintra is derived by using CIIP intra prediction according to an intra prediction process. Then, the intra and inter prediction signals are combined by using a weighted average, and here, the weight value depends on a place where the sample is located in the intra prediction mode and the coding block as below.

If the intra prediction mode is the DC or planar mode or the block width or height is smaller than 4, the same weight is applied to the intra prediction and inter prediction signals.

Otherwise, the weights are determined based on the intra prediction mode (in this case, the horizontal mode or vertical mode) and the sample location in the block. A horizontal prediction mode is described as an example (the weights for the vertical mode are similar, but may be derived in an orthogonal direction). The width of the block is configured to W and the height of the block is configured to H. The coding block is first partitioned into 4 equal-region parts and each dimension is (W/4)×H. From the start at a part closest to intra prediction reference samples to the end at a part farthest from the intra prediction samples, wt which is a weight for each of 4 regions is set to 6, 5, 3, and 2. A final CIIP prediction signal may be derived as in Equation 5 below.

$$P_{CIIP}=((8-wt)*P_{inter}+wt*P_{intra}+4)>>3 \quad \text{[Equation 5]}$$

In Equation 5, PCIIP represents a CIIP prediction sample value, Pinter represents the inter prediction sample value, Pintra represents the intra prediction sample value, and wt represents the weight.

IBC (Intra Block Copy)

Details of IBC that may be performed in the prediction unit of FIGS. 2 and 3 are described. IBC may be used, e.g., for video/image coding of content, such as a game, such as screen content coding (SCC). IBC basically performs prediction within the current picture, but may be performed similarly to inter prediction in that a reference block is derived within the current picture. In other words, IBC may use at least one of the inter prediction schemes described in the disclosure. For example, IBC may use at least one of the above-described methods for deriving motion information (motion vector). IBC may refer to the current picture, and therefore, it may be called current picture referencing (CPR).

For IBC, the encoding device 100 may perform block matching (BM) to derive an optimal block vector (or motion vector) for the current block (e.g., CU). The derived block vector (or motion vector) may be signaled to the decoding device 200 through a bitstream using a method similar to the above-described block information (motion vector) signaling in inter prediction. The decoding device 200 may derive a reference block for the current block in the current picture through the signaled block vector (motion vector), and through this, may derive a prediction signal (predicted block or prediction samples) for the current block. Here, the block vector (or motion vector) may indicate a displacement from the current block to the reference block positioned in the already reconstructed area in the current picture. Accordingly, the block vector (or motion vector) may also be referred to as a displacement vector. Hereinafter, in IBC, a motion vector may correspond to a block vector or a displacement vector. The motion vector of the current block may include a motion vector for a luma component (luma motion vector) or a motion vector (chroma motion vector) for a chroma component. For example, the luma motion vector for the IBC-coded CU may be an integer sample unit (i.e., integer precision). The chroma motion vector may also be clipped in units of integer samples. As described above, IBC may use at least one of inter prediction schemes. For example, when IBC is applied like AMVR, 1-pel and 4-pel motion vector precision may be switched.

To reduce memory consumption and decoder complexity, only a reconstructed portion of a predefined area including the current CU may be used. This limitation allows the IBC mode to be implemented, using local on-chip memory for hardware implementations.

At the encoder side, hash-based motion estimation is performed for IBC. The encoder performs an RD check on blocks whose width or height is not greater than 16 luminance samples. For the non-merge mode, a block vector search is performed from the hash-based search. If the hash search does not return a valid candidate, a block matching-based local search will be performed.

In hash-based search, hash key matching (32-bit CRC) between the current block and the reference block is expanded to all allowed block sizes. Hash key calculation for all positions in the current picture is based on 4×4 subblocks. For the larger size current block, a hash key is determined to match the hash key of the reference block if all hash keys in all 4×4 subblocks match hash keys in all corresponding reference positions. If the hash keys of multiple reference blocks are found to match the hash key of the current block, the block vector costs of the matched reference blocks are calculated and the one with the least cost is selected.

In the block matching search, a search range is set to N samples from the left and the upper sides of the current block in the current CTU. At the beginning of the CTU, N may be initialized to 128 if there is no temporal reference picture, and it is initialized to 64 if there is at least one temporal reference picture. A hash hit ratio is defined as the percentage of samples in the CTU where a match using hash-based search has been discovered. During encoding of the current CTU, if the hash hit rate is less than 5%, N is reduced by half.

At the CU level, the IBC mode is signaled using a flag and may be signaled as follows like the IBC AMVP mode or the IBC skip/merge mode.

FIGS. 31A and 31B illustrate examples of an intra block copy (IBC) mode-based video/image encoding method and a prediction unit in an encoding device 100 according to an embodiment of the disclosure.

The encoding device 100 performs IBC prediction (IBC-based prediction) on the current block (S3110). The encoding device 100 may derive a prediction mode and a motion vector of the current block and may generate prediction samples of the current block. The prediction mode may include at least one of the above-described inter prediction modes as prediction modes for IBC. Here, the prediction mode determination, motion vector derivation, and prediction sample generation procedures may be performed simultaneously, or one procedure may be performed before another procedure. For example, the prediction unit of the encoding device 100 may include a prediction mode determination unit, a motion vector derivation unit, and a prediction sample derivation unit. The prediction mode determination unit may determine the prediction mode for the current block. The motion vector derivation unit may derive the motion vector of the current block. The prediction sample derivation unit may derive the prediction samples of the current block. For example, the prediction unit of the encoding device 100 may search for a block similar to the current block within a reconstructed area of the current picture (or a certain area (search area) in the reconstructed area) through block matching (BM) and may derive a reference block whose difference from the current block is the minimum or a predetermined reference or less. A motion vector may be derived based on the displacement difference between the reference block and the current block. The encoding device 100 may determine the mode applied to the current block among various prediction modes. The encoding device 100 may compare RD costs based on various prediction modes and determine an optimal prediction mode for the current block.

For example, when the skip mode or the merge mode is applied to the current block, the encoding device 100 may configure the above-described merge candidate list and may derive a reference block having a difference from the current block, which is the minimum or a predetermined reference or less, among the reference blocks indicated by the merge candidates included in the merge candidate list. In this case, the merge candidate associated with the derived reference block may be selected, and the merge index information indicating the selected merge candidate may be generated and signaled to the decoding device 200. The motion vector of the current block may be derived using the motion vector of the selected merge candidate.

As another example, when the (A)MVP mode is applied to the current block, the encoding device 100 may configure the above-described (A)MVP candidate list and may use the motion vector of an MVP candidate selected from among the motion vector predictor (MVP) candidates included in the (A)MVP candidate list as the MVP of the current block. In this case, for example, the motion vector indicating the reference block derived by the above-described motion estimation may be used as the motion vector of the current block, and the MVP candidate having the motion vector with the smallest difference from the motion vector of the current block among the MVP candidates may be the selected MVP candidate. A motion vector difference (MVD) that is a difference obtained by subtracting MVP from the motion vector of the current block may be derived. In this case, information for the MVD may be signaled to the decoding device 200.

The encoding device 100 may derive residual samples based on the prediction samples (S3120). The encoding device 100 may derive residual samples via comparison between the raw samples of the current block and the prediction samples.

The encoding device 100 encodes image information including the prediction information and residual information (S3130). The encoding device 100 may output the encoded image information in the form of a bitstream. The prediction information may include motion vector-related information and prediction mode information (e.g., skip flag, merge flag, or mode index), as information related to the prediction procedure. The motion vector-related information may include candidate selection information (e.g., merge index, mvp flag, or mvp index) which is information for deriving the motion vector. Further, the motion vector-related information may include the above-described information regarding the MVD. The motion vector-related information may include information indicating whether L0 prediction, L1 prediction, or bi prediction applies. The residual information is information for residual samples. The residual information may include information for quantized transform coefficients for the residual samples.

The output bitstream may be stored in a (digital) storage medium and transferred to a decoding device, and it may be transferred to the decoding device 200 via a network.

Meanwhile, as set forth above, the encoding device 100 may generate a reconstructed picture (including reconstructed samples and reconstructed block) based on the reference samples and the residual samples. This is for the encoding device to derive the same prediction result as that obtained by the decoding device 200 and coding efficiency may be raised thereby. Thus, the encoding device may store the reconstructed area (or reconstructed samples or reconstructed block) of the current picture in the memory and use the same as the reference picture for IBC prediction.

An IBC-based video/image decoding procedure and a prediction unit in the decoding device 200 may schematically include, e.g., the following.

FIGS. 32A and 32B illustrate examples of an IBC mode-based video/image decoding method and a prediction unit in a decoding device 200 according to an embodiment of the disclosure.

The decoding device 200 may perform operations corresponding to the operations performed by the encoding device 100. The decoding device 200 may perform IBC prediction on the current block based on the received prediction information and derive prediction samples.

Specifically, the decoding device 200 may determine a prediction mode for the current block based on the received prediction information (S3210). The decoding device 200 may determine which prediction mode is applied to the current block based on prediction mode information in the prediction information.

For example, it may be determined whether the merge mode is applied to the current block or whether the (A)MVP mode is determined based on a merge flag. Alternatively, one of various prediction mode candidates may be selected based on a mode index. The prediction mode candidates may include a skip mode, a merge mode, and/or an (A)MVP mode, or may include the various prediction modes described above.

The decoding device 200 derives a motion vector of the current block based on the determined prediction mode (S3220). For example, when the skip mode or the merge mode is applied to the current block, the decoding device 200 may configure the above-described merge candidate list and may select one merge candidate from among the merge candidates included in the merge candidate list. The selection of the merge candidate may be performed based on the above-described selection information (merge index). The motion vector of the current block may be derived using the motion vector of the selected merge candidate. The motion vector of the selected merge candidate may be used as the motion vector of the current block.

As another example, when the (A)MVP mode is applied to the current block, the decoding device 200 may configure the above-described (A)MVP candidate list and may use the motion vector of an MVP candidate selected from among the motion vector predictor (MVP) candidates included in the (A)MVP candidate list as the MVP of the current block. The selection of the MVP candidate may be performed based on the above-described selection information (mvp flag or mvp index). In this case, the MVD of the current block may be derived based on the information regarding the MVD. A motion vector of the current block may be derived based on the MVP and MVD of the current block.

Meanwhile, motion information for the current block may be derived without configuring the candidate list as described above, and in this case, the motion vector of the current block may be derived according to the procedure disclosed in the corresponding prediction mode. In this case, the above-described candidate list configuration may be omitted.

The decoding device 200 may generate prediction samples for the current block based on the motion vector of the current block (S3230). Prediction samples of the current block may be derived using the samples of the reference block indicated by the motion vector of the current block on the current picture. In this case, a prediction sample filtering procedure for all or some of the prediction samples of the current block may be further performed.

For example, the prediction unit of the decoding device 200 may include a prediction mode determination unit, a motion vector derivation unit, and a prediction sample derivation unit. The prediction mode determination unit may determine the prediction mode for the current block based on the received prediction mode information. The motion vector derivation unit may derive the motion vector of the current block based on information regarding the received motion vector. The prediction sample derivation unit may derive the prediction samples of the current block.

The decoding device 200 generates residual samples for the current block based on the received residual information (S3240). The decoding device 200 may generate reconstructed samples for the current block based on the prediction samples and the residual samples and may generate a reconstructed picture based thereupon (S3250). Thereafter, in-loop filtering may further be performed on the reconstructed picture as described above.

MVD (Motion Vector Difference) Coding

As described above, several inter prediction schemes may be applied to IBC prediction. For example, MVD coding may be used for inter prediction and IBC prediction. Current video coding standards use motion vectors and their motion vector predictors to generate a motion vector difference (MVD). MVD may be defined as the difference between the motion vector and the motion vector predictor. Similar to the motion vector, the MVD may include x and y components (a first component and a second component) corresponding to the x and y directions. Once the MVD is determined, the MVD is encoded using entropy schemes. Video standards use the MVD as one of the possible methods to achieve compression and search for redundancy in motion vectors. Embodiments for the compression of a video/image signal use the MVD as one of the tools for searching for hidden motion. At the decoder side, the MVD is decoded before the motion vectors of the coding unit are decoded. Encoding the MVD before encoding the actual motion vectors helps increasing the compression efficiency and searching for redundancy between motion vectors and their predictors. Inputs to the MVD coding stage from the decoder are the coded MVD bins parsed for decoding. Inputs from the encoder to the MVD coding stage are the actual MVD values and an additional flag ("imv" flag) indicating the resolution for MVD encoding. The MVD is used to determine whether it is represented as 1-pel, 4-pel, or quarter-pel.

FIG. 33 is an example flowchart for obtaining motion vector difference (MVD) coding information according to an embodiment of the disclosure. The operations of FIG. 33 may be performed by the entropy decoding unit 210 of the decoding device 200.

First, flags (MVDxGR0, MVDyGR0) indicating whether the MVD is greater than 0 for horizontal and vertical components are parsed (S3310). Thereafter, the parsed data for the horizontal component is identified to identify whether the x component of the MVD is greater than 0 (that is, whether MVDxGR0 is true) (S3320). If MVDxGR0 is true (that is, if MVDxGR0 is '1'), the flag MVDxGR1 indicating whether the horizontal component is greater than 1 is parsed (S3330). If MVDxGR0 is not true (if MVDxGR0 is '0'), the MVDxGR1 data is not parsed. Thereafter, similar procedures are performed on the vertical component (S3340 and S3350). Thereafter, to obtain reconstructed MVDs, the parsed MVD data may be additionally processed according to the order of remaining MVD coding (MVDx_Rem_Level and MVDy_Rem_Level) steps S3360 and SS70.

FIGS. 34A and 34B are example flowcharts for obtaining information for the x component and the y component of the MVD according to an embodiment of the disclosure. FIG. 34A illustrates an operation in which the decoder obtains information for decoding the x component of the MVD in block MVDx_Rem_Level (S3360) of FIG. 33, and FIG. 34B illustrates the operation of obtaining information for decoding the y component of the MVD in the MVDy_Rem_Level (S3370) of FIG. 33.

In FIG. 34A, the decoder identifies MVDxGR0 (S3410) and, if MVDxGR0 is true, the decoder identifies MVDxGR1 (S3420). If the flag (i.e., MVDxGR0) indicating whether the parsed data is greater than 0 is true and the flag (i.e., MVDxGR1) indicating whether the parsed data is greater than 1 is true, the decoder parses MVDx(Abs−2) (S3430). In this case, the decoder decodes the bins corresponding to the parsed MVDx component by using an Exponential Golomb (EG) code having order 1. The inputs to the EG will be bins containing absolute minus 2 (i.e., Abs-2) and first order Golombs. The sign information is parsed by decoding the bypass bin including the sign information. If the decoded bypass bin has a value of 1, a negative sign is appended to the decoded MVDx. However, if the decoded bypass bin has a value of 0, it is indicated that the decoded MVD has a positive value. If MVDxGR0 is true but MVDxGR1 is not true, this indicates that the absolute value of MVDx is 1 and the decoder parses the MVDxSign (S3440). The code information is parsed and updated. However, if MVDxGR0 is false, the reconstructed MVDx is 0.

Similar operations may be applied to obtain information for the y component of the MVD. The decoder identifies MVDyGR0 (S3450), and if MVDyGR0 is true, the decoder identifies MVDyGR1 (S3460). If the flag (i.e., MVDyGT0) indicating whether the parsed data is greater than 0 is true and the flag (i.e., MVDyGT1) indicating whether the parsed data is greater than 1 is true, the decoder parses MVDy (Abs-2) (S3470). If MVDyGR0 is true but MVDyGR1 is not true, this indicates that the absolute value of MVDy is 1, and the decoder parses MVDySign (S3480).

Signed MVD values are encoded at the encoder side. Similar to the decoder, by checking the absolute values of the horizontal and vertical components, bins indicating whether the x and y components are greater than zero, namely MVDxGR0 and MVDyGR0, are encoded. Flags indicating whether the horizontal and vertical components are greater than 1, that is, MVDxGr1 and MVDyGR1, are encoded. The MVD absolute values are then encoded as illustrated in FIGS. 35A and 35B.

FIGS. 35A and 35B are example flowcharts for encoding information for the x component and the y component of the MVD according to an embodiment of the disclosure.

Similar to the decoder, the horizontal and vertical components are encoded sequentially. For horizontal MVD encoding, the encoder identifies whether the absolute value of the horizontal MVD component is greater than 0 (i.e., MVDxGR0) and whether the absolute value of the horizontal MVD component is greater than 1 (i.e., MVDxGR1) (S3510, S3520). If the absolute value of the horizontal MVD component is greater than 0 and greater than 1, (absolute value-2) is encoded using the EG code having order 1 (S3530). The sign information is then encoded using bypass bins. If MVDxGR0 is true and MVDxGr1 is not true, only sign information is encoded (S3540). The same process is performed for encoding of MVDy.

For vertical MVD encoding, the encoder identifies whether the absolute value of the vertical MVD component is greater than 0 (i.e., MVDyGR0) and whether the absolute value of the vertical MVD component is greater than 1 (i.e., MVDyGR1) (S3550, S3560). If the absolute value of the vertical MVD component is greater than 0 and greater than 1, (absolute value-2) is encoded using the EG code having order 1 (S3570). The sign information is then encoded using bypass bins. If MVDyGR0 is true and MVDyGr1 is not true, only sign information is encoded (S3580). Table 1 below is a syntax for MVD coding.

TABLE 1

| | Descriptor |
|---|---|
| mvd_coding( x0, y0, refList ,cpIdx ) { | |
|   abs_mvd_greater0_flag[ 0 ] | ae(v) |
|   abs_mvd_greater0_flag[ 1 ] | ae(v) |
|   if( abs_mvd_greater0_flag[ 0 ] ) | |

TABLE 1-continued

| | Descriptor |
|---|---|
|     abs_mvd_greater1_flag[ 0 ] | ae(v) |
|   if( abs_mvd_greater0_flag[ 1 ] ) | |
|     abs_mvd_greater1_flag[ 1 ] | ae(v) |
|   if( abs_mvd_greater0_flag[ 0 ] ) { | |
|     if( abs_mvd_greater1_flag[ 0 ] ) | |
|       abs_mvd_minus2[ 0 ] | ae(v) |
|     mvd_sign_flag[ 0 ] | ae(v) |
|   } | |
|   if( abs_mvd_greater0_flag[ 1 ] ){ | |
|     if( abs_mvd_greater1_flag[ 1 ] ) | |
|       abs_mvd_minus2[ 1 ] | ae(v) |
|     mvd_sign_flag[ 1 ] | ae(v) |
|   } | |
| } | | abs_mvd_greater0_flag[compIdx] specifies whether the absolute value of a motion vector component difference is greater than 0.

abs_mvd_greater1_flag[compIdx] specifies whether the absolute value of a motion vector component difference is greater than 1. When abs_mvd_greater1_flag[compIdx] is not present, it is inferred to be equal to 0.

abs_mvd_minus2[compIdx] plus 2 specifies the absolute value of a motion vector component difference. When abs_mvd_minus2[compIdx] is not present, it is inferred to be equal to -1.

mvd_sign_flag[compIdx] specifies the sign of a motion vector component difference as follows:

If mvd_sign_flag[compIdx] is equal to 0, the corresponding motion vector component difference has a positive value.

Otherwise (mvd_sign_flag[compIdx] is equal to 1), the corresponding motion vector component difference has a negative value.

When mvd_sign_flag[compIdx] is not present, it is inferred to be equal to 0.

The motion vector difference IMvd[compIdx] for compIdx=0 . . . 1 is derived as follows:

$$\text{IMvd[compIdx]} = \text{abs\_mvd\_greater0\_flag[compIdx]} * (\text{abs\_mvd\_minus2[compIdx]} + 2) * (1 - 2 * \text{mvd\_sign\_flag[compIdx]})$$

Depending in the value of MotionModelIdc[x][y], motion vector differences are derived as follows:

If MotionModelIdc[x][y] is equal to 0, the variable MvdLX[x0][y0][compIdx], with X being 0 or 1, specifies the difference between a list X vector component to be used and its prediction. The array indices x0, y0 specify the location (x0, y0) of the top-left luma sample of the considered coding block relative to the top-left luma sample of the picture. The horizontal motion vector component difference is assigned compIdx=0 and the vertical motion vector component is assigned compIdx=1.

If refList is equal to 0, MvdL0[x0][y0][compIdx] is set equal to IMvd[compIdx] for compIdx=0 . . . 1.

Otherwise (refList is equal to 1), MvdL1[x0][y0][compIdx] is set equal to IMvd[compIdx] for compIdx=0 . . . 1.

Otherwise (MotionModelIdc[x][y] is not equal to 0), the variable MvdCpLX[x0][y0][cpIdx][compIdx], with X being 0 or 1, specifies the difference between a list X vector component to be used and its prediction. The array indices x0, y0 specify the location (x0, y0) of the top-left luma sample of the considered coding block relative to the top-left luma sample of the picture, the array index cpIdx specifies the control point index. The horizontal motion vector component difference is assigned compIdx=0 and the vertical motion vector component is assigned compIdx=1.

If refList is equal to 0, MvdCpL0[x0][y0][cpIdx][compIdx] is set equal to IMvd[compIdx] for compIdx=0 . . . 1.

Otherwise (refList is equal to 1), MvdCpL1[x0][y0][cpIdx][compIdx] is set equal to IMvd[compIdx] for compIdx=0 . . . 1.

Table 2 below illustrates binarization types and parameters of syntax elements for MVD coding, and Table 3 illustrates bin indexes of syntax elements for MVD coding.

TABLE 2

| Syntax structure | Syntax element | Binarization Process | Input parameters |
|---|---|---|---|
| mvd_coding( ) | abs_mvd_greater0_flag[ ] | FL | cMax = 1 |
| | abs_mvd_greater1_flag[ ] | FL | cMax = 1 |
| | abs_mvd_minus2[ ] | EG1 | — |
| | mvd_sign_flag[ ] | FL | cMax = 1 |

TABLE 3

| | binIdx | | | | | |
|---|---|---|---|---|---|---|
| Syntax element | 0 | 1 | 2 | 3 | 4 | >=5 |
| abs_mvd_greater0_flag[ ] | 0 | na | na | na | na | na |
| abs_mvd_greater1_flag[ ] | 0 | na | na | na | na | na |
| abs_mvd_minus2[ ] | bypass | bypass | bypass | bypass | bypass | bypass |
| mvd_sign_flag[ ] | bypass | na | na | na | na | na |

Statistical Information for MVD of IBC

Analysis of the statistics of MVD for IBC cases shows that general MVD and MVD of IBC have different characteristics. For the IBC case, it is identified that MVDx and MVDy have different characteristics. For example, as compared to MVDx, the values of MVDy have a relatively zero-centered characteristic.

Table 4 below is the statistics of MVD for IBC cases.

TABLE 4

| MVD Value | 0 | 1 | 2 | 3 | 4 | 5 | 6 | 7 | MVD Value > 7 |
|---|---|---|---|---|---|---|---|---|---|
| MVDx (%) | 9.5 | 8.5 | 8 | 5.8 | 4.4 | 3.8 | 4.7 | 4.3 | 51 |
| MVDy (%) | 32.4 | 9.6 | 7.1 | 7 | 3.5 | 3.5 | 3.4 | 2.6 | 30.9 |

FIGS. 36A and 36B illustrate examples of statistics of bin values for the x component and the y component of the MVD in IBC according to an embodiment of the disclosure.

For the IBC case, the data distribution between the x component and the y component is relatively less skewed and asymmetric, and the degree of binding to a specific value is less than that of general MVD. Due to this interpretation, the following embodiments are proposed.

Embodiment 1

In embodiments for MVD coding cases, for the x component and the y component, flags indicating whether the MVD is greater than 0 may be coded using different context modes. In other words, abs_mvd_greater0_flag[0] and abs_mvd_greater0_flag[1] may use different context models, where the x/y component means MVD in the x/y direction. Similarly, for the x component and the y component, flags indicating whether the MVD is greater than 1 may use different context models. In other words, abs_mvd_greater1_flag[0] and abs_mvd_greater1_flag[1] may use different context models. Table 5 below shows the assignment to syntax elements with context coded bins in a context increment (ctxInc).

TABLE 5

| | binIdx | | | | | |
|---|---|---|---|---|---|---|
| Syntax element | 0 | 1 | 2 | 3 | 4 | >=5 |
| ~~abs_mvd_greater0_flag[compIdx]~~ | ~~compIdx==0 ?~~ | na | na | na | na | na |
| ~~abs_mvd_greater1_flag[compIdx]~~ | ~~0 : 1~~ | | | | | |
| | ~~compIdx==0 ?~~ | na | na | na | na | na |
| | ~~0 : 1~~ | | | | | |
| abs_mvd_minus2[ ] | bypass | bypass | bypass | bypass | bypass | bypass |
| mvd_sign_flag[ ] | bypass | na | na | na | na | na |

Referring to Table 5, the bin index binIdx of the flag (abs_mvd_greater0_flag[compIdx]) indicating whether the MVD is greater than 0 is determined based on the index compIdx indicating the component. The bin index binIdx for the x component (compIdx=0) may be set to 0, and the bin index binIdx for the y component (compIdx=1) may be set to 1. Further, the bin index binIdx of the flag (abs_mvd_greater0_flag[compIdx]) indicating whether the MVD is greater than 1 is determined based on the index compIdx indicating the component. The bin index binIdx for the x component (compIdx=0) may be set to 0, and the bin index binIdx for the y component (compIdx=1) may be set to 1. In other words, the flag (abs_mvd_greater0_flag[0]) indicating whether the x component of the MVD is greater than 0 and the flag (abs_mvd_greater0_flag[1]) indicating whether the y component of the MVD is greater than 0 may be encoded/decoded based on different context models.

Embodiment 2

In an embodiment for MVD coding cases, different coding methods may be used in coding the absolute value of MVDx. In a specific case based on the above-described statistical distribution, the absolute value coding of MVDx may use different exponential Golomb parameters, such as 2 or 3, which means that abs_mvd_minus2[0] may be coded using different exponential Golomb parameters, such as 2 or 3. Similarly, for the remaining absolute value level of MVD y for the y component, other coding methods may be used. In particular, an exponential Golomb parameter, such as 2 or 3, may be used, which means that abs_mvd_minus2[1] may be coded with an exponential Golomb parameter, such as 2 or 3. For example, Table 6 below shows an example in which the exponential Golomb parameter 2 is used for abs_mvd_minus2[ ]. In Table 6, MVD size information (abs_mvd_minus2[ ]) indicating a value obtained by subtracting 2 from the absolute value of MVD may be encoded/decoded based on an exponential Golomb parameter (EG2) of order 2.

TABLE 6

| Syntax structure | Syntax element | Binarization Process | Input parameters |
|---|---|---|---|
| mvd_coding( ) | abs_mvd_greater0_flag[ ] | FL | cMax = 1 |
| | abs_mvd_greater1_flag[ ] | FL | cMax = 1 |
| | abs_mvd_minus2[ ] | EG2 | — |
| | mvd_sign_flag[ ] | FL | cMax = 1 |

Embodiment 3

In this embodiment, embodiment 1 and embodiment 2 described above may be used simultaneously. In other words, flags (abs_mvd_greater0_flag[0], abs_mvd_greater0_flag[1]) indicating whether the MVD is greater than 0 for the x component and the y component may use different context models. Flags (abs_mvd_greater1_flag [0], abs_mvd_greater1_flag[1]) indicating whether the MVD is greater than 1 for the x component and the y component may use different context models. For coding of the remaining absolute value level, different exponential Golomb parameters, such as 2 or 3, may be used, which means that abs_mvd_minus2[ ] may be coded using exponential Golomb parameters, such as 2 or 3.

Embodiment 4

FIG. 37 illustrates an example in which MVD coding is separately applied when general MVD coding and an IBC mode are applied according to an embodiment of the disclosure. In this embodiment, a case in which for the IBC case and normal MVD coding, separate MVD coding is performed is described.

If the IBC mode is applied to the current block, the flag indicating whether the MVDx component is greater than 0 and the flag indicating whether the MVDx component is greater than 1 are not used, and the entire MVDx may be coded using an exponential Golomb of order 1, 2, or 3. Table 7 below shows an example when a change is applied.

TABLE 7

| | Descriptor |
|---|---|
| mvd_coding_IBC( x0, y0, refList ,cpIdx ) { | |
| ~~abs_mvd_greater0_flag[ 0 ]~~ | ~~ae(v)~~ |
| abs_mvd_greater0_flag[ 1 ] | ae(v) |
| ~~if( abs_mvd_greater0_flag[ 0 ] )~~ | |
| ~~abs_mvd_greater1_flag[ 0 ]~~ | ~~ae(v)~~ |
| if( abs_mvd_greater0_flag[ 1 ] ) | |
| abs_mvd_greater1_flag[ 1 ] | ae(v) |
| ~~if( abs_mvd_greater0_flag[ 0 ] ) {~~ | |
| ~~if( abs_mvd_greater1_flag[ 0 ] )~~ | |
| ~~abs_mvd_minus2[ 0 ]~~ | ~~ae(v)~~ |
| ~~mvd_sign_flag[ 0 ]~~ | ~~ae(v)~~ |
| ~~}~~ | |
| abs_mvd[ 0 ] | ae(v) |
| if(abs_mvd[ 0 ]) { | |
| mvd_sign_flag[ 0 ] | ae(v) |
| } | |
| if( abs_mvd_greater0_flag[ 1 ] ) { | |
| if( abs_mvd_greater1_flag[ 1 ] ) | |
| abs_mvd_minus2[ 1 ] | ae(v) |
| mvd_sign_flag[ 1 ] | ae(v) |
| } | |
| } | |

In Table 7, the strikethrough indicates the syntax element deleted by application of the present embodiment as compared with a normal MVD coding syntax structure. abs_mvd [compIdx] represents the absolute value of the motion vector difference for the component compIdx. Table 8 shows binarization types and parameters of syntax elements for MVD coding reflecting abs_mvd[ ].

TABLE 8

| | | Binarization | |
|---|---|---|---|
| Syntax structure | Syntax element | Process | Input parameters |
| mvd_coding_ IBC( ) | abs_mvd_greater0_flag[ ] | FL | cMax = 1 |
| | abs_mvd_greater1_flag[ ] | FL | cMax = 1 |
| | abs_mvd_minus2[ ] | EG1 | — |
| | abs_mvd[ ] | EG2 | — |
| | mvd_sign_flag[ ] | FL | cMax = 1 |

Similarly, there may be no flag indicating whether the MVDy component is greater than 0 and 1, and the entire MVDy component may be coded using an exponential Golomb of order 1, 2, or 3.

Embodiment 5

In this embodiment, the entire MVDx or MVDy may be coded using an exponential Golomb of order 1, 2, or 3 without a flag indicating whether one of the MVD components is greater than 0 and a flag indicating whether the MVD component is greater than 1. For the other components of the MVD, there may be a flag indicating whether the corresponding MVD component is greater than 0 and a flag indicating whether the corresponding MVD component is greater than 1, and the remaining part may be coded using different exponential Golomb parameters. Table 9 is an example for this case.

TABLE 9

| Syntax structure | Syntax element | Binarization | |
|---|---|---|---|
| | | Process | Input parameters |
| mvd_coding_ IBC( ) | abs_mvd_greater0_flag[ ] | FL | cMax = 1 |
| | abs_mvd_greater1_flag[ ] | FL | cMax = 1 |
| | abs_mvd_minus2[ ] | EG2 | — |
| | abs_mvd[ ] | EG2 | — |
| | mvd_sign_flag[ ] | FL | cMax = 1 |

In one embodiment, for the IBC case, there may be separate MVD coding. With respect to the IBC case and the normal case, different context models may be used for a flag indicating whether the MVD component is greater than 0 and a flag indicating whether the MVD component is greater than 1.

Embodiment 6

For the coding of the MVD for the IBC case in this embodiment, an exponential Golomb value, such as 2 or 3, may be used to code remaining value (absolute value information, sign information) of the MVD. In the IBC case, different context models may be used for the x component and the y component, for a flag indicating whether the MVD component is greater than 0 and a flag indicating whether the MVD component is greater than 1. Tables 10 and 11 below show examples for the case according to the present embodiment.

TABLE 10

| Syntax structure | Syntax element | Binarization | |
|---|---|---|---|
| | | Process | Input parameters |
| mvd_coding_ IBC( ) | abs_mvd_greater0_flag[ ] | FL | cMax = 1 |
| | abs_mvd_greater1_flag[ ] | FL | cMax = 1 |
| | abs_mvd_minus2[ ] | EG2 | — |
| | mvd_sign_flag[ ] | FL | cMax = 1 |

TABLE 11

| Syntax element | binIdx | | | | |
|---|---|---|---|---|---|
| | 0 | 1 | 2 | 3 | 4 | >=5 |
| abs_mvd_greater0_flag[ compIdx ] | compIdx==0 ? 0 : 1 | na | na | na | na | na |
| abs_mvd_greater1_flag[compIdx ] | compIdx==0 ? 0 : 1 | na | na | na | n | a na |
| abs_mvd_minus2[ ] | bypass | bypass | bypass | bypass | bypass | bypass |

Methods for general multi-pass MVD coding are described through embodiments 7 to 10 below along with various examples. The MVD coding method proposed in the following embodiments may be applied to conventional MVD coding or may be applied to MVD coding of an IBC intra prediction-applied block.

Embodiment 7: General Multiple Pass MVD Coding

FIG. 38 is an example flowchart for multiple pass MVD coding according to an embodiment of the disclosure.

As illustrated in FIG. 38, first, the first flag MVDi_GT_L0 is coded to indicate whether the absolute value of MVDi is greater than L0. Here, i denotes the MVD direction and may represent one of the x-direction (horizontal direction) and the y-direction (vertical direction).

If the first flag (MVDi_GT_L0) is 0, it indicates that the absolute value of MVDi is not greater than L0. The absolute value of MVDi may be coded based on the fact that the possible range of the absolute value is between 0 and L0. If the first flag (MVDi_GT_L0) is 1, it means that the absolute value of MVDi is greater than L0, then the second flag (MVDi_GT_L1) for indicating whether the absolute value of MVDi is greater than L1 is coded.

If the second flag (MVDi_GT_L1) is 0, it indicates that the absolute value of MVDi is not greater than L1, and the absolute value of MVDi may be coded based on the fact that the possible range is (L0-L1] (greater than L0 and less than or equal to L1). If the second flag MVDi_GT_L1 is 1, this means that the absolute value of MVDi is greater than L1 and, if so, the third flag MVDi_GT_L2 for indicating whether the absolute value of MVDi is greater than L2 is coded.

In a similar scheme, the above-described procedure may be performed until the kth flag (MVDi_GT_Lk) is coded. If the kth flag (MVDi_GT_Lk) is 0, the absolute value of MVDi may be coded based on the fact that the possible range is (Lk−1-Lk] (greater than Lk−1 and less than or equal to Lk). If the kth flag (MVDi_GT_Lk)rk is 1, coding is performed on the MVD remaining level information (Code_RemainingLevel) in the MVD size information. Thereafter, when MVDi is greater than 0, MVD sign information (MVDi_Sign) indicating the sign of MVDi may be coded.

MVDi_GT_Lt may be coded as a bypass or a regular bin. When the regular bin is used, the context may be determined based on the MVD direction (e.g., the x-direction, the y-direction), the block size, and the like.

Further, if Lt−L(t−1) is smaller than 2, the value of MVDi may be immediately inferred without the need for coding the MVD size information (Code_Value_(Lt−L(t−1)). As a code for coding MVD size information (Code_Value_(Lt−L(t−1))), truncated binary, truncated unary, fixed length code (FLC), exponential Golomb and the like may be used. The bypass or regular bin may be used as well.

To code the MVD size information (Code_Value_(Lt−L(t−1))), exponential Golombs of different orders or fixed length codes (FLCs) of different lengths may be used. For example, for the coding of (Code_Value_(L2−L1)), a second-order exponential Golomb may be used, and for the coding of (Code_Value_(L3−L2)), a third-order exponential Golomb may be used. For coding of (Code_Value_(L2−L1)), a fixed length code of length 2 may be used, and for the coding of (Code_Value_(L3−L2)), a fixed length code of length 3 may be used.

Embodiment 8: Multiple Pass MVD Coding Till MVD_GT_15 Flag

In this embodiment, the flag MVDi_GT_0 may be transmitted to determine whether the absolute value of MVDi is greater than zero. The flag MVDi_GT_0 may be coded based on the context, and the context may be determined based on the direction i (e.g., x or y).

If the flag MVDi_GT_0 is 1, another flag MVDi_GT_1 is coded to determine whether the absolute value of MVDi is greater than 1. The flag MVDi_GT_1 may be coded based on the context, and the context may be determined based on the direction i (e.g., x or y).

If the flag MVDi_GT_1 is 1, another flag MVDi_GT_3 is coded to determine whether the absolute value of MVDi is greater than 3. The flag MVDi_GT_3 may be coded based on the context, and the context may be determined based on the direction i (e.g., x or y).

If the flag MVDi_GT_3 is 0, a flag for determining whether the absolute value of MVDi is 2 or 3 may be coded. If the flag MVDi_GT_3 is 1, another flag MVDi_GT_7 is coded to determine whether the absolute value of MVDi is greater than 7. The flag MVDi_GT_7 may be coded based on the context, and the context may be determined based on the direction i (e.g., x or y).

If the flag MVDi_GT_7 is 0, the FLC for determining which one of 4 to 7 is the absolute value of MVDi is used. If the flag MVDi_GT_7 is 1, another flag MVDi_GT_15 is coded to determine whether the absolute value of MVDi is greater than 15. The flag MVDi_GT_15 may be coded based on the context, and the context may be determined based on the direction i (e.g., x or y).

If the flag MVDi_GT_15 is 0, the FLC for determining which one of 8 to 15 is the absolute value of MVDi is used. If the flag MVDi_GT_15 is 1, the remaining level of the absolute value of MVDi (absolute value of MVDi minus 16) is coded using an exponential Golomb of order 4. If the absolute value of MVDi is greater than 0, MVD sign information (MVDi_Sign) indicating the sign of MVDi is coded. Table 12 below shows an example of a syntax structure for MVD coding according to the present embodiment. In Table 12, [0] denotes the x component, and [1] denotes the y component.

TABLE 12

| | Descriptor |
|---|---|
| mvd_coding( x0, y0, refList ,cpIdx ) { | |
|   mvd_gt_0[0] | ae(v) |
|   if(mvd_gt_0[0]) | |
|     mvd_gt_1[0] | ae(v) |
|   if(mvd_gt_1[0]) | |
|     mvd_gt_3[0] | ae(v) |
|   if(! mvd_gt_3[0]) | |
|     Code_Value(2) [0] | ae(v) |
|   else{ | |
|     mvd_gt_7[0] | ae(v) |
|     if(! mvd_gt_7[0]) | |
|       Code_Value(4) [0] | ae(v) |
|     else{ | |
|       mvd_gt_15[0] | ae(v) |
|       if(! mvd_gt_15[0]) | |
|         Code_Value(8) [0] | ae(v) |
|       else{ | |
|         Code_RemainingLevel_minus16[0] | ae(v) |
|       } | |
|     } | |
|   if(mvd_gt_0[0]) | |
|     mvd_sign[0] | ae(v) |
|   mvd_gt_0[1] | ae(v) |
|   if(mvd_gt_0[1]) | |
|     mvd_gt_1[1] | ae(v) |
|   if(mvd_gt_1[1]) | |
|     mvd_gt_3[1] | ae(v) |
|   if(! mvd_gt_3[1]) | |
|     Code_Value(2)[1] | ae(v) |
|   else{ | |
|     mvd_gt_7[1] | ae(v) |
|     if(! mvd_gt_7[1]) | |
|       Code_Value(4)[1] | ae(v) |
|     else{ | |
|       mvd_gt_15[1] | ae(v) |
|       if(! mvd_gt_15[11]) | |
|         Code_Value(8)[1] | ae(v) |
|       else{ | |
|         Code_RemainingLevel_minus16[1] | ae(v) |
|       } | |
|     } | |
|   if(mvd_gt_0[1]) | |
|     mvd_sign[1] | ae(v) |

Table 13 below shows the binarization process and input parameters for the syntax elements of Table 12.

TABLE 13

| | | Binarization | |
|---|---|---|---|
| Syntax structure | Syntax element | Process | Input parameters |
| mvd_coding( ) | mvd_gt_0[ ] | FL | cMax = 1 |
| | mvd_gt_1[ ] | FL | cMax = 1 |
| | mvd_gt_3[ ] | FL | cMax = 1 |
| | mvd_gt_7[ ] | FL | cMax = 1 |
| | mvd_gt_15[ ] | FL | cMax = 1 |
| | Code_Value(N)[ ] | FL | cMax = N − 1 |
| | Code_RemainingLevel_minus16[ ] | EG4 | — |
| | mvd_sign[ ] | FL | cMax = 1 |

According to Table 13, the size information (Code_Value (N)[ ]) of the MVD may be coded based on a fixed length (FL) code, and the input parameter for coordinating length coding is N−1. Here, N is a difference value between the determination reference value of the Mth stage and the determination reference value of the (M−1)th stage. (e.g., 2=3−1, 4=7−3, 8=15−7). In other words, it may be said that the size information for the MVD is coded based on a difference value between the determination reference value (second reference value) of the Mth stage and the determination reference value (first reference value) of the (M−1)th stage. In consideration of coding efficiency, each determination reference value may be set such that N becomes a power of 2 (2x). In other words, the second difference value may be set to be twice the first difference value. If the absolute value of the MVD is greater than the last reference value (e.g., 15), the absolute value of the MVD is determined through coding for the MVD remaining level information (Code_RemainingLevel_minus16) in the MVD size information. The MVD remaining level information (Code_RemainingLevel_minus16) may be coded based on the order 4 exponential Golomb (EG4). Table 14 below shows the bin index (Idx) (Assignment of ctxInc to syntax elements with context coded bins) of the syntax element according to the present embodiment.

TABLE 14

| Syntax element | binIdx | | | | | |
|---|---|---|---|---|---|---|
| | 0 | 1 | 2 | 3 | 4 | >=5 |
| mvd_gt_0[compIdx] | compIdx==0 ? 0 : 1 | na | na | na | na | na |
| mvd_gt_1[compIdx] | compIdx==0 ? 0 : 1 | na | na | na | na | na |
| mvd_gt_3 [compIdx] | compIdx==0 ? 0 : 1 | na | na | na | na | na |
| mvd_gt_7[compIdx] | compIdx==0 ? 0 : 1 | na | na | na | na | na |
| mvd_gt_15[compIdx] | compIdx==0 ? 0 : 1 | na | na | na | na | na |
| Code_Value(N)[ ] | bypass | bypass | bypass | bypass | bypass | bypass |
| Code_RemainingLevel_minus16[ ] | bypass | bypass | bypass | bypass | bypass | bypass |
| mvd_sign[ ] | bypass | na | na | na | na | na |

According to Table 14, the bin index (context) of the flag (mvd_gt_0, mvd_gt_1, mvd_gt_3, mvd_gt_7, mvd_gt_15) indicating whether the MVD is greater than the reference value may be coded based on the component (e.g., x-direction, y-direction) of the corresponding MVD.

Embodiment 9: Multiple Pass MVD Coding Till MVD_GT_31 Flag

In this embodiment, in addition to the flags mvd_gt_0 [compIdx] to mvd_gt_15[compIdx] indicating whether the absolute value of the MVD is greater than the reference value as in the method for embodiment 8, a flag mvd_gt_31 [compIdx] indicating whether the absolute value of the MVD is greater than 31 is used. When mvd_gt_31[compIdx] is 0, FLC is used to determine which one of 16 to 31 is the absolute value of MVDi. If the flag MVDi_GT_31 is 1, the remaining level of the absolute value of MVDi (absolute value of MVDi minus 32) is coded using an exponential Golomb of order 5. If the absolute value of MVDi is greater than 0, MVD sign information (MVDi_Sign) indicating the sign of MVDi is coded.

Table 15 below shows an example of a syntax structure for MVD coding according to the present embodiment. In Table 15, [0] denotes the x component, and [1] denotes the y component. Table 16 shows the binarization process and input parameters for the syntax elements according to the instant embodiment. Strikethrough lines in Tables 15 and 16 indicate deleted portions (or changed portions) as compared to the syntax structure of embodiment 8 (Table 12) for convenience of understanding.

TABLE 15

| | Descriptor |
|---|---|
| mvd_coding( x0, y0, refList ,cpIdx ) { | |
|   mvd_gt_0[0] | ae(v) |
|   if(mvd_gt_0[0]) | |
|     mvd_gt_1[0] | ae(v) |
|   if(mvd_gt_1[0]) | |
|     mvd_gt_3[0] | ae(v) |
|   if(! mvd_gt_3[0]) | |
|     Code_Value(2) [0] | ae(v) |
|   else{ | |
|     mvd_gt_7[0] | ae(v) |
|     if(! mvd_gt_7[0]) | |
|       Code_Value(4) [0] | ae(v) |
|     else{ | |
|       mvd_gt_15[0] | ae(v) |

TABLE 15-continued

| | Descriptor |
|---|---|
|       if(! mvd_gt_15[0]) | |
|         Code_Value(8) [0] | ae(v) |
|       else{ | |
|         ~~Code_RemainingLevel_minus16[0]~~ | ~~ae(v)~~ |
|         mvd_gt_31[0] | ae(v) |
|         if(! mvd_gt_31[0]) | |
|           Code_Value(16) [0] | ae(v) |
|         else{ | |
|           Code_RemainingLevel_minus32[0] | ae(v) |
|         } | |
|       } | |
|     } | |
|   } | |
|   if(mvd_gt_0[0]) | |
|     mvd_sign[0] | ae(v) |
|   mvd_gt_0[1] | ae(v) |
|   if(mvd_gt_0[1]) | |
|     mvd_gt_1[1] | ae(v) |
|   if(mvd_gt_1[1]) | |
|     mvd_gt_3[1] | ae(v) |
|   if(! mvd_gt_3[1]) | |
|     Code_Value(2)[1] | ae(v) |
|   else{ | |
|     mvd_gt_7[1] | ae(v) |
|     if(! mvd_gt_7[1]) | |
|       Code_Value(4)[1] | ae(v) |
|     else{ | |
|       mvd_gt_15[1] | ae(v) |
|       if(! mvd_gt_15[1]) | |
|         Code_Value(8)[1] | ae(v) |
|       else{ | |
|         ~~Code_RemainingLevel_minus16[1]~~ | ~~ae(v)~~ |
|         mvd_gt_31[1] | ae(v) |
|         if(! mvd_gt_31[1]) | |
|           Code_Value(16)[1] | ae(v) |
|         else{ | |
|           Code_RemainingLevel_minus32[1] | ae(v) |
|         } | |
|       } | |
|     } | |
|   } | |
|   if(mvd_gt_0[1]) | |
|     mvd_sign[1] | ae(v) |

TABLE 16

| Syntax structure | Syntax element | Binarization Process | Input parameters |
|---|---|---|---|
| mvd_coding( ) | mvd_gt_0[ ] | FL | cMax = 1 |
| | mvd_gt_1[ ] | FL | cMax = 1 |
| | mvd_gt_3[ ] | FL | cMax = 1 |
| | mvd_gt_7[ ] | FL | cMax = 1 |
| | mvd_gt_15[ ] | FL | cMax = 1 |
| | mvd_gt_31[ ] | FL | cMax = 1 |
| | Code_Value(N)[ ] | FL | cMax = N − 1 |
| | ~~Code_RemainingLevel_minus16[]~~ | ~~EG4~~ | — |
| | Code_RemainingLevel_minus32[ ] | EG5 | — |
| | mvd_sign[ ] | FL | cMax = 1 |

Embodiment 10: Multiple Pass MVD Coding Till MVD_GT_63 Flag

In this embodiment, in addition to the flags mvd_gt_0 [compIdx] to mvd_gt_31[compIdx] indicating whether the absolute value of the MVD is greater than the reference value as in the method for embodiment 9, a flag mvd_gt_63 [compIdx] indicating whether the absolute value of the MVD is greater than 63 is used. When mvd_gt_63[compIdx] is 0, FLC is used to determine which one of 32 to 63 is the absolute value of MVDi. If the flag MVDi_GT_63 is 1, the remaining level of the absolute value of MVDi (absolute value of MVDi minus 64) is coded using an exponential Golomb of order 6. If the absolute value of MVDi is greater than 0, MVD sign information (MVDi_Sign) indicating the sign of MVDi is coded.

Table 17 below shows an example of a syntax structure for MVD coding according to the present embodiment. In Table 17, [0] denotes the x component, and [1] denotes the y component. Table 18 shows the binarization process and input parameters for the syntax elements according to the instant embodiment. Strikethrough lines in Tables 17 and 18 indicate deleted portions (or changed portions) as compared to the syntax structure of embodiment 9 (Table 12) for convenience of understanding.

TABLE 17

| | |
|---|---|
| ~~Code_RemainingLevel_minus32[0]~~ | ~~ae(v)~~ |
| mvd_gt_63[0] | ae(v) |
| if(! mvd_gt_63[0]) | |
|   Code_Value(32) [0] | ae(v) |
| else{ | |
|   Code_RemainingLevel_minus64[0] | ae(v) |
| } | |
| ~~Code_RemainingLevel_minus32[1] ae(v)~~ | |
| mvd_gt_63[1] | ae(v) |
| if(! mvd_gt_63[1]) | |
|   Code_Value(32)[1] | ae(v) |
| else{ | |
|   Code_RemainingLevel_minus64[1] | ae(v) |
| } | |

TABLE 18

| | | |
|---|---|---|
| mvd_gt_63[ ] | FL | cMax = 1 |
| ~~Code_RemainingLevel_minus32[]~~ | ~~EG5~~ | — |
| Code_RemainingLevel_minus64[ ] | EG6 | — |

Bitstream

The encoded information (e.g., encoded video/image information) derived by the encoding device 100 based on the above-described embodiments of the disclosure may be output in the form of a bitstream. The encoded information may be transmitted or stored in network abstraction layer (NAL) units, in the form of a bitstream. The bitstream may be transmitted via the network or be stored in the non-transitory digital storage medium. Further, as described above, the bitstream is not directly transmitted from the encoding device 100 to the decoding device 200, but may be streamed/downloaded via an external server (e.g., a content streaming server). The network may include, e.g., a broadcast network and/or communication network, and the digital storage medium may include, e.g., USB, SD, CD, DVD, Blu-ray, HDD, SSD, or other various storage media.

FIG. 39 is an example flowchart for encoding MVD information in a video signal according to an embodiment of the disclosure. The operations of FIG. 39 may be performed by the inter prediction unit 180 of the encoding device 100 or the processor 510 of the video signal processing device 500.

In step S3910, the encoder determines the MVD based on the motion vector of the current block and the motion vector of the neighboring block. For example, the encoder may determine a motion vector (motion vector predictor) most similar to the motion vector of the current block from the MVP candidate list derived from motion information for neighboring blocks and determine the MVD based on the difference value between the motion vector predictor and the motion vector of the current block.

In step S3920, the encoder encodes the coding information for the MVD. Here, the coding information for the MVD includes a first flag (e.g., MVDi_GT_Lt−1) indicating whether the MVD for prediction of the current block is greater than a first value (e.g., Lt−1), a second flag (e.g., MVDi_GT_Lt) coded based on the first flag and indicating whether the MVD is greater than a second value (e.g., Lt), and size information for the MVD (Code_Value_(Lt−L(t−1))). In this case, the MVD size information may be coded based on the first difference value (Lt−L(t−1)) corresponding to the difference between the second value (e.g., Lt) and the first value (e.g., Lt−1). For example, as shown in Table 13, the MVD size information (Code_Value_(N)) may be encoded based on a fixed length code having cMax=N−1 as a parameter.

In an embodiment, if the MVD is greater than the second value, the encoder may encode the MVD size information based on an exponential Golomb code having an order of 2 or more. For example, if the second value corresponds to the last reference value (e.g., 15 in embodiment 8) and the absolute value of the MVD is greater than the second value (15), the encoder encodes the remaining level of the absolute value of MVDi (absolute value of MVDi minus 16) using an exponential Golomb code of order 4.

In an embodiment, if the MVD is greater than the second value, the encoder may encode a third flag indicating whether the MVD is greater than a third value. Here, the second difference value corresponding to the difference between the third value and the second value may be greater than the first difference value. For example, in a case where the first value is 1, the second value is 3, and the third value is 7, if the MVD is greater than the second value (3) (if mvd_gt_3[0] is 1), the encoder may encode the third flag (mvd_gt_7[0]) indicating whether the MVD is greater than the third value (7). In an embodiment, the second difference value (the difference between the third value and the second value) may be set to be equal to a value obtained by multiplying the first difference value (the difference between the second value and the first value) by 2. For example, reference values used in the process of encoding/decoding MVD size information may be set such that the difference becomes a power of 2, such as 1, 3, 7, 15, 31, or 63.

In one embodiment, the MVD may include a horizontal component and a vertical component. The horizontal component of the MVD and the vertical component of the MVD may be coded based on different context models. For example, as shown in Table 14, a bin index (binIdx) for encoding/decoding of flags mvd_gt_0, mvd_gt_1, mvd_gt_3, mvd_gt_7, and mvd_gt_15 may be determined based on an index (compIdx) indicating a component of the corresponding flag.

FIG. 40 is an example flowchart for decoding MVD information in a video signal according to an embodiment of the disclosure. The operations of FIG. 40 may be performed by the inter prediction unit 180 of the encoding device 100 or the processor 510 of the video signal processing device 500.

In step S4010, the decoder obtains a first flag (e.g., MVDi_GT_Lt−1) indicating whether the MVD for prediction of the current block is greater than a first value (e.g., Lt−1).

In step S4020, the decoder obtains a second flag (e.g., MVDi_GT_Lt) indicating whether the MVD is greater than a second value (e.g., Lt) based on the first flag.

In step S4030, the decoder decodes the MVD size information (Code_Value_(Lt−L(t−1))) based on the second flag. Here, if the MVD is less than or equal to the second value, the decoder decodes the MVD size information (Lt−L(t−1)) based on the first difference value corresponding to the difference between the second value (e.g., Lt) and the first value (e.g., Lt−1). For example, as shown in Table 13, the MVD size information (Code_Value_(N)) may be decoded based on a fixed length code having cMax=N−1 as a parameter.

In an embodiment, if the MVD is greater than the second value, the encoder may encode the MVD size information based on an exponential Golomb code having an order of 2 or more. For example, if the second value corresponds to the last reference value (e.g., 15 in embodiment 8) and the absolute value of the MVD is greater than the second value (15), the encoder encodes the remaining level of the absolute value of MVDi (absolute value of MVDi minus 16) using an exponential Golomb code of order 4.

In an embodiment, if the MVD is greater than the second value, the decoder may decode the third flag indicating whether the MVD is greater than the third value. Here, the second difference value corresponding to the difference between the third value and the second value may be greater than the first difference value. For example, in a case where the first value is 1, the second value is 3, and the third value is 7, if the MVD is greater than the second value (3) (if mvd_gt_3[0] is 1), the decoder may decode the third flag (mvd_gt_7[0]) indicating whether the MVD is greater than the third value (7). In an embodiment, the second difference value (the difference between the third value and the second value) may be set to be equal to a value obtained by multiplying the first difference value (the difference between the second value and the first value) by 2. For example, reference values used in the process of encoding/decoding MVD size information may be set such that the difference becomes a power of 2, such as 1, 3, 7, 15, 31, or 63.

In one embodiment, the MVD may include a horizontal component and a vertical component. The horizontal component of the MVD and the vertical component of the MVD may be coded based on different context models. For example, as shown in Table 14, a bin index (binIdx) for encoding/decoding of flags mvd_gt_0, mvd_gt_1, mvd_gt_3, mvd_gt_7, and mvd_gt_15 may be determined based on an index (compIdx) indicating a component of the corresponding flag.

As set forth above, the embodiments of the disclosure may be implemented and performed on a processor, microprocessor, controller, or chip. For example, the functional units shown in each figure may be implemented and performed on a processor, microprocessor, controller, or chip.

The video signal processing device 500 according to an embodiment of the disclosure may include a memory 520 for storing video signals and a processor 510 coupled to the memory 520.

For encoding of MVD information, the processor 510 may be configured to determine an MVD based on a motion vector of a current block and a motion vector of a neighboring block and encode coding information for the MVD. The coding information for the MVD may include a first flag indicating whether the MVD is greater than a first value, a second flag that is coded based on the first flag and indicates whether the MVD is greater than a second value, and MVD size information. When the MVD is less than or equal to the second value, the MVD size information may be coded based on a first difference value corresponding to a difference between the second value and the first value.

In an embodiment, the processor 510 may be configured to encode the MVD size information using a fixed length code (FLC) based on the first difference value.

In an embodiment, when the MVD is greater than the second value, the processor 510 may be configured to encode the MVD size information based on an exponential Golomb code having an order of two or more.

In one embodiment, the processor 510 may be configured to encode a third flag indicating whether the MVD is greater than a third value if the MVD is greater than the second value. The second difference value corresponding to the difference between the third value and the second value may be greater than the first difference value.

In an embodiment, the second difference value may be set to be equal to a value obtained by multiplying the first difference value by two.

In one embodiment, the MVD may include a horizontal component and a vertical component. The horizontal component of the MVD and the vertical component of the MVD may be coded based on different context models.

For encoding of the MVD information, the processor 510 is configured to obtain a first flag indicating whether the MVD for prediction of the current block is greater than a first value, obtain a second flag indicating whether the MVD is greater than a second value based on the first flag, and decode size information for the MVD based on the second flag. Here, if the MVD is less than or equal to the second value, the processor 510 is configured to decode the size information for the MVD based on a first difference value corresponding to a difference between the second value and the first value.

In an embodiment, the processor 510 may be configured to decode the MVD size information using a fixed length code (FLC) based on the first difference value.

In an embodiment, if the MVD is greater than the second value, the processor 510 may be configured to decode the MVD size information based on an exponential Golomb code having an order of two or more.

In one embodiment, the processor 510 is configured to encode a third flag indicating whether the MVD is greater than a third value if the MVD is greater than the second value. The second difference value corresponding to the difference between the third value and the second value may be greater than the first difference value.

In an embodiment, the second difference value may be set to be equal to a value obtained by multiplying the first difference value by two.

In one embodiment, the MVD may include a horizontal component and a vertical component. The horizontal component of the MVD and the vertical component of the MVD may be coded based on different context models.

In addition, a processing method to which the present disclosure is applied may be produced in the form of a program executed by the computer, and may be stored in a computer-readable recording medium. Multimedia data having a data structure according to the present disclosure may also be stored in the computer-readable recording medium. The computer-readable recording medium includes all types of storage devices and distribution storage devices storing computer-readable data. The computer-readable recording medium may include, for example, a Blu-ray disc (BD), a universal serial bus (USB), a ROM, a PROM, an EPROM, an EEPROM, a RAM, a CD-ROM, a magnetic tape, a floppy disk, and an optical data storage device. Further, the computer-readable recording medium includes media implemented in the form of a carrier wave (e.g., transmission over the Internet). Further, the bitstream generated by the encoding method may be stored in the computer-readable recording medium or transmitted through a wired/wireless communication network.

In addition, the embodiment of the present disclosure may be implemented as a computer program product by a program code, which may be performed on the computer by the embodiment of the present disclosure. The program code may be stored on a computer-readable carrier.

A non-transitory computer-readable medium according to an embodiment of the disclosure stores one or more instructions executed by one or more processors. The one or more instructions may controls the video signal processing device 500 (or encoding device 100) to determine an MVD based on a motion vector of a current block and a motion vector of a neighboring block for encoding of MVD information and encode coding information for the MVD. The coding information for the MVD may include a first flag indicating whether the MVD is greater than a first value, a second flag that is coded based on the first flag and indicates whether the MVD is greater than a second value, and MVD size information. When the MVD is less than or equal to the second value, the MVD size information may be coded based on a first difference value corresponding to a difference between the second value and the first value.

In an embodiment, the one or more instructions may control the video signal processing device 500 (or encoding device 100) to encode the MVD size information using a fixed length code (FLC) based on the first difference value.

In an embodiment, the one or more instructions may control the video signal processing device 500 (or encoding device 100) to encode the MVD size information based on an exponential Golomb code having an order of two or more if the MVD is greater than the second value.

In an embodiment, the one or more instructions may control the video signal processing device 500 (or encoding device 100) to encode a third flag indicating whether the MVD is greater than a third value if the MVD is greater than the second value. The second difference value corresponding to the difference between the third value and the second value may be greater than the first difference value.

In an embodiment, the second difference value may be set to be equal to a value obtained by multiplying the first difference value by two.

In one embodiment, the MVD may include a horizontal component and a vertical component. The horizontal component of the MVD and the vertical component of the MVD may be coded based on different context models.

In an embodiment, the one or more instructions control the video signal processing device 500 (or decoding device 100) to obtain a first flag indicating whether the MVD for prediction of the current block is greater than a first value for decoding MVD information, obtain a second flag indicating whether the MVD is greater than a second value based on the first flag, and decode size information for the MVD based on the second flag. Here, if the MVD is less than or equal to the second value, the one or more instructions control the video signal processing device 500 (or decoding device 100) to decode the size information for the MVD based on a first difference value corresponding to a difference between the second value and the first value.

In an embodiment, the one or more instructions controls the video signal processing device 500 (or decoding device 100) to decode the MVD size information using a fixed length code (FLC) based on the first difference value.

In an embodiment, the processor 510 controls the video signal processing device 500 (or encoding device 100) to decode the MVD size information based on an exponential Golomb code having an order of two or more if the MVD is greater than the second value.

In one embodiment, the processor 510 is configured to encode a third flag indicating whether the MVD is greater than a third value if the MVD is greater than the second value. The second difference value corresponding to the difference between the third value and the second value may be greater than the first difference value.

In an embodiment, the second difference value may be set to be equal to a value obtained by multiplying the first difference value by two.

In one embodiment, the MVD may include a horizontal component and a vertical component. The horizontal component of the MVD and the vertical component of the MVD may be coded based on different context models.

In addition, the decoder and the encoder to which the present disclosure may be included in a multimedia broadcasting transmitting and receiving device, a mobile communication terminal, a home cinema video device, a digital cinema video device, a surveillance camera, a video chat device, a real time communication device such as video communication, a mobile streaming device, storage media, a camcorder, a video on demand (VoD) service providing device, an (Over the top) OTT video device, an Internet streaming service providing devices, a 3 dimensional (3D) video device, a video telephone video device, a transportation means terminal (e.g., a vehicle terminal, an airplane terminal, a ship terminal, etc.), and a medical video device, etc., and may be used to process a video signal or a data signal. For example, the Over the top (OTT) video device may include a game console, a Blu-ray player, an Internet access TV, a home theater system, a smartphone, a tablet PC, a digital video recorder (DVR), and the like.

In the embodiments described above, the components and the features of the present disclosure are combined in a predetermined form. Each component or feature should be considered as an option unless otherwise expressly stated. Each component or feature may be implemented not to be associated with other components or features. Further, the embodiment of the present disclosure may be configured by associating some components and/or features. The order of the operations described in the embodiments of the present disclosure may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present disclosure may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present disclosure may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

In the present disclosure, the term "/" and "," should be interpreted to indicate "and/or." For instance, the expression "A/B" may mean "A and/or B" and "A, B" may mean "A and/or B". Further, "A/B/C" may mean "at least one of A, B, and/or C". Also, "A/B/C" may mean "at least one of A, B, and/or C".

Further, in the present disclosure, the term "or" should be interpreted to indicate "and/or". For instance, the expression "A or B" may comprise 1) only A, 2) only B, and/or 3) both A and B. In other words, the term "or" in the present disclosure should be interpreted to indicate "additionally or alternatively".

It is apparent to those skilled in the art that the present disclosure may be embodied in other specific forms without departing from essential characteristics of the present disclosure. Accordingly, the aforementioned detailed description should not be construed as restrictive in all terms and should be exemplarily considered. The scope of the present disclosure should be determined by rational construing of the appended claims and all modifications within an equivalent scope of the present disclosure are included in the scope of the present disclosure.

INDUSTRIAL APPLICABILITY

Hereinabove, the preferred embodiments of the present disclosure are disclosed for an illustrative purpose and hereinafter, modifications, changes, substitutions, or additions of various other embodiments will be made within the technical spirit and the technical scope of the present disclosure disclosed in the appended claims by those skilled in the art.

The invention claimed is:

1. A method for decoding motion vector difference (MVD) information for inter prediction in a video signal, the method comprising:
obtaining a first flag indicating whether an MVD for prediction of a current block is greater than a first value;
obtaining a second flag indicating whether the MVD is greater than a second value based on the first flag; and
decoding size information for the MVD based on the second flag,
wherein decoding the size information for the MVD includes:
decoding the size information for the MVD based on a first difference value corresponding to a difference between the second value and the first value based on the MVD being equal to or less than the second value, and
obtaining a third flag indicating whether the MVD is greater than a third value based on the MVD being greater than the second value, and
wherein a second difference value corresponding to a difference between the third value and the second value is greater than the first difference value.

2. The method of claim 1, wherein decoding the size information for the MVD includes decoding the size information for the MVD using a fixed length code (FLC) based on the first difference value.

3. The method of claim 1, wherein decoding the size information for the MVD includes decoding the size information for the MVD based on an exponential Golomb code having an order of two or more based on the MVD being greater than the second value.

4. The method of claim 1, wherein the second difference value is set to be equal to a value obtained by multiplying the first difference value by two.

5. The method of claim 1, wherein the MVD includes a horizontal component and a vertical component, and the horizontal component of the MVD and the vertical component of the MVD are coded based on different context models.

6. A method for encoding motion vector difference (MVD) information for inter prediction in a video signal, the method comprising:
determining an MVD based on a motion vector of a current block and a motion vector of a neighboring block; and
encoding coding information for the MVD,
wherein the coding information for the MVD includes a first flag indicating whether the MVD is greater than a first value, a second flag coded based on the first flag and indicating whether the MVD is greater than a second value, and size information for the MVD,
wherein the size information for the MVD is coded based on a first difference value corresponding to a difference between the second value and the first value based on the MVD being equal to or less than the second value,
wherein encoding the coding information for the MVD includes encoding a third flag indicating whether the MVD is greater than a third value based on the MVD being greater than the second value, and
wherein a second difference value corresponding to a difference between the third value and the second value is greater than the first difference value.

7. The method of claim 6, wherein encoding the coding information for the MVD includes encoding the size information for the MVD using a fixed length code (FLC) based on the first difference value.

8. The method of claim 6, wherein encoding the coding information for the MVD includes encoding the size information for the MVD based on an exponential Golomb code having an order of two or more based on the MVD being greater than the second value.

9. The method of claim 6, wherein the second difference value is set to be equal to a value obtained by multiplying the first difference value by two.

10. The method of claim 6, wherein the MVD includes a horizontal component and a vertical component, and the horizontal component of the MVD and the vertical component of the MVD are coded based on different context models.

11. A non-transitory computer-readable medium storing encoded picture information generated by performing the steps of:
- determining a motion vector difference (MVD) based on a motion vector of a current block and a motion vector of a neighboring block; and
- encoding coding information for the MVD,
- wherein the coding information for the MVD includes a first flag indicating whether the MVD is greater than a first value, a second flag coded based on the first flag and indicating whether the MVD is greater than a second value, and size information for the MVD,
- wherein the size information for the MVD is coded based on a first difference value corresponding to a difference between the second value and the first value based on the MVD being equal to or less than the second value,
- wherein encoding the coding information for the MVD includes encoding a third flag indicating whether the MVD is greater than a third value based on the MVD being greater than the second value, and
- wherein a second difference value corresponding to a difference between the third value and the second value is greater than the first difference value.

* * * * *